United States Patent [19]

Shilcrat

[11] Patent Number: 5,963,948
[45] Date of Patent: Oct. 5, 1999

[54] METHOD FOR GENERATING A PATH IN AN ARBITRARY PHYSICAL STRUCTURE

[76] Inventor: Esther Dina Shilcrat, 46 Hargrove Dr., Stony Brook, N.Y. 11790

[21] Appl. No.: 08/749,528

[22] Filed: Nov. 15, 1996

[51] Int. Cl.[6] .................................................... G06F 17/30
[52] U.S. Cl. ................................ 707/100; 707/3; 707/4; 707/1; 340/995; 701/200; 701/207; 701/209
[58] Field of Search .................................. 364/228, 282.1, 364/974.6, 242.94; 395/12, 200.52, 52; 345/326; 380/4; 707/100, 4, 1, 3; 340/995; 701/200, 207, 209

[56] References Cited

U.S. PATENT DOCUMENTS

| | | | |
|---|---|---|---|
| 4,866,661 | 9/1989 | De Prins | 364/900 |
| 4,992,940 | 2/1991 | Dworkin | 364/401 |
| 5,127,674 | 7/1992 | Lamphere et al. | 283/37 |
| 5,250,789 | 10/1993 | Johnsen | 235/383 |
| 5,465,291 | 11/1995 | Barrus et al. | 379/67 |
| 5,727,129 | 3/1998 | Barrett et al. | 395/12 |

*Primary Examiner*—Paul V. Kulik
*Assistant Examiner*—Jean M. Corrielus

[57] ABSTRACT

An item locating and path generating computer system creates personalized paths through structures by converting each of a set of items, objects, or locations of particular interest to a user to a corresponding set of destinations within the structure, and creating a path which includes each element in the set of destinations. The generated path may start at a structure entrance and end at a structure exit. The generated path may also reflect user desired characteristics such as least distance, least time, being at a specific point at a specific time, etc. In structures with multiple entrances or exits, multiple paths can be created and evaluated by above user criteria to find the best fit. The personalized paths can be stored, and automatically searched and queried in a variety of ways, such as aggregation. The invention includes a number of methods for creating a set of desired items, objects or locations of particular interest to a user. This includes storing elements of this set, along with a desired frequency or another condition (including price). The invention also converts between the units in which an object may be measured (as in, for example, a recipe) and the units in which that object actually occurs in the structure.

15 Claims, 41 Drawing Sheets

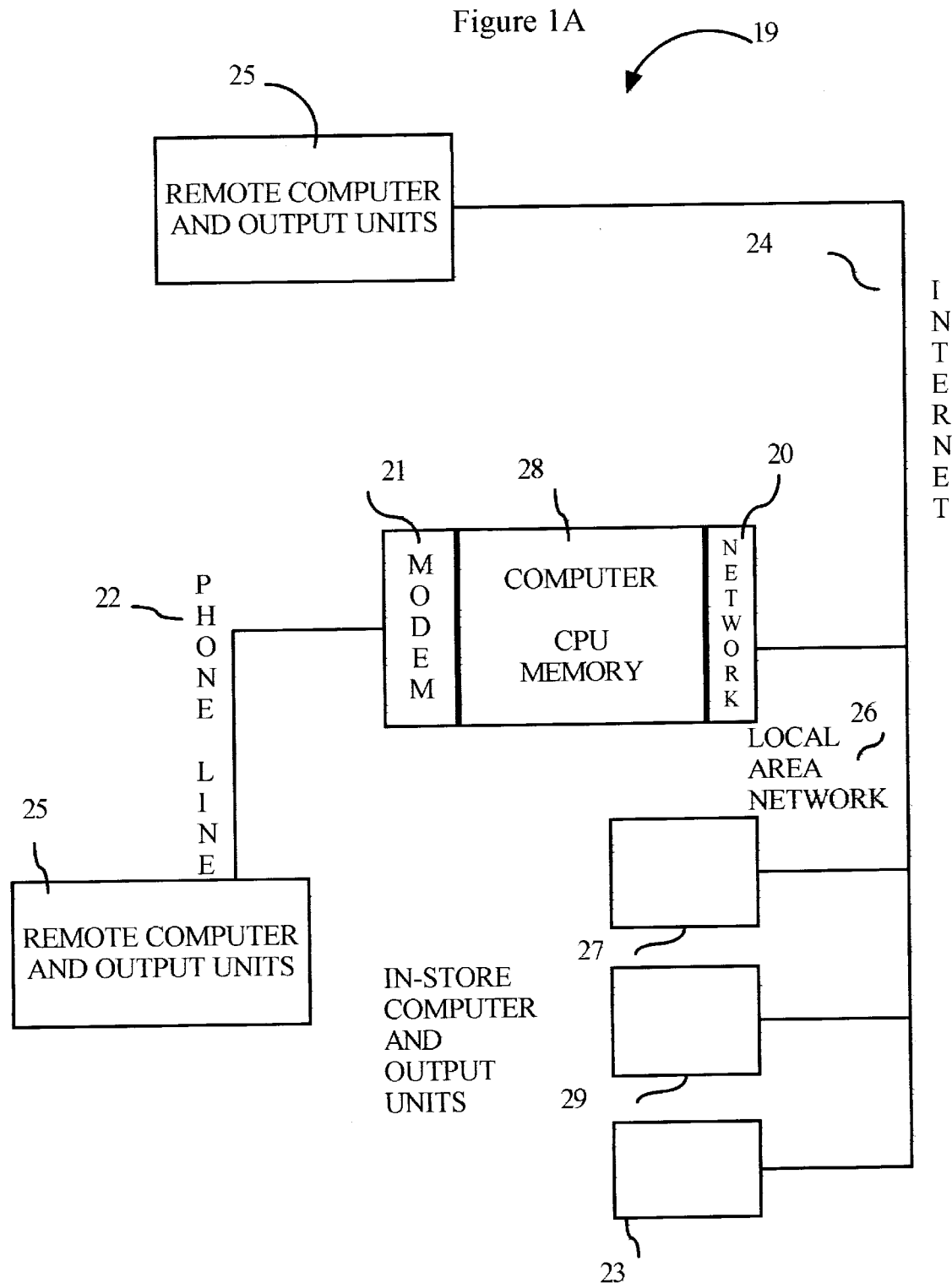

Figure 3: FRAGMENT OF CLASSIFICATION DATABASE

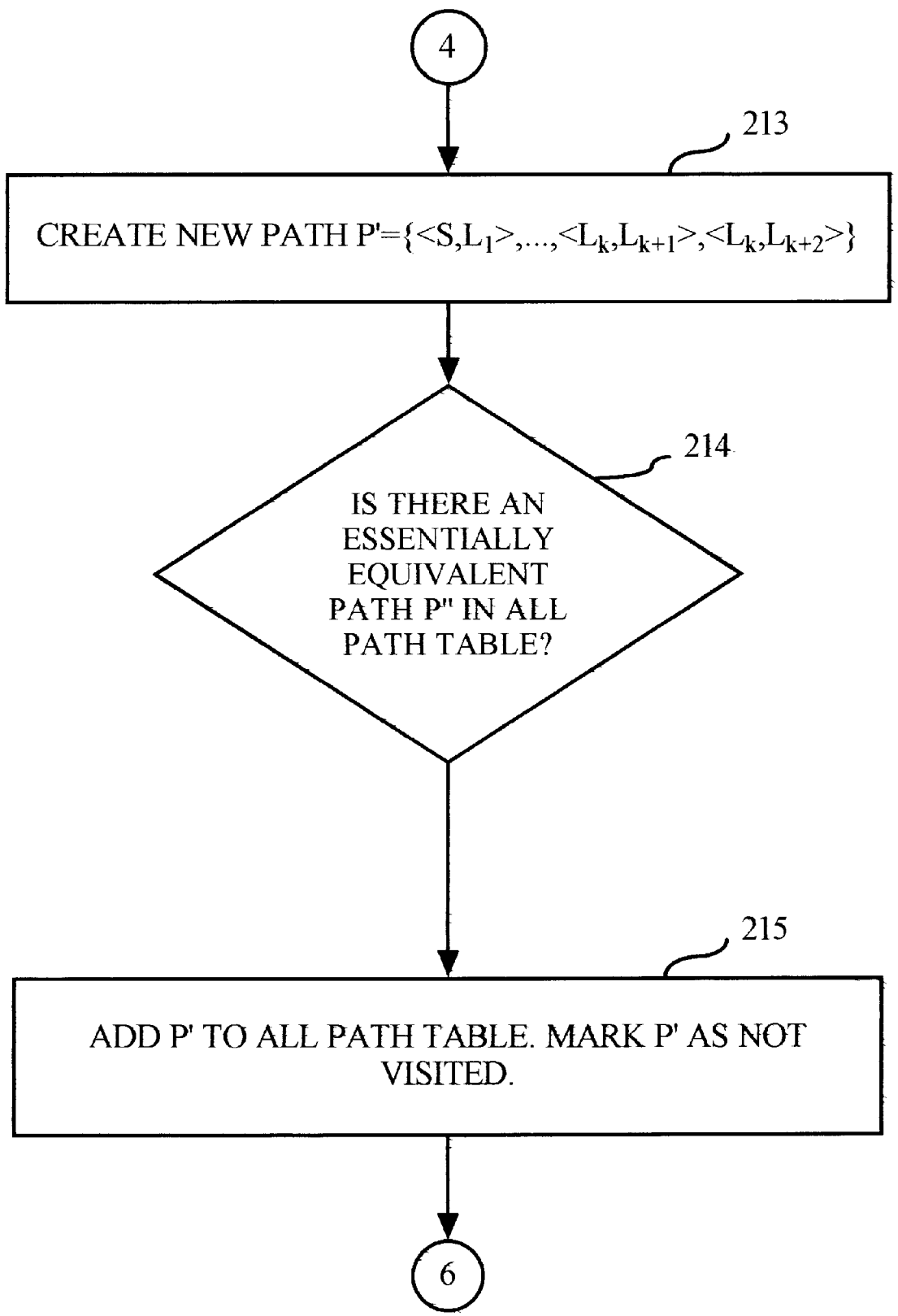

FIGURE 13G
838 ATTACH NODE AS CHILD OF ParentQuadrant NODE IN forestlist
840 COMPUTE TOTAL COST OF EVERY PATH IN EVERY TREE IN forestlist BY ADDING TOGETHER COST AT EACH NODE IN A PATH. Let MinPath BE THE PATH WITH MINIMUM COST. CONSTRUCT LODESTAR SEQUENCE Q FROM MinPath BY CONCATENATING SHORTEST PATHS AT EVERY NODE.

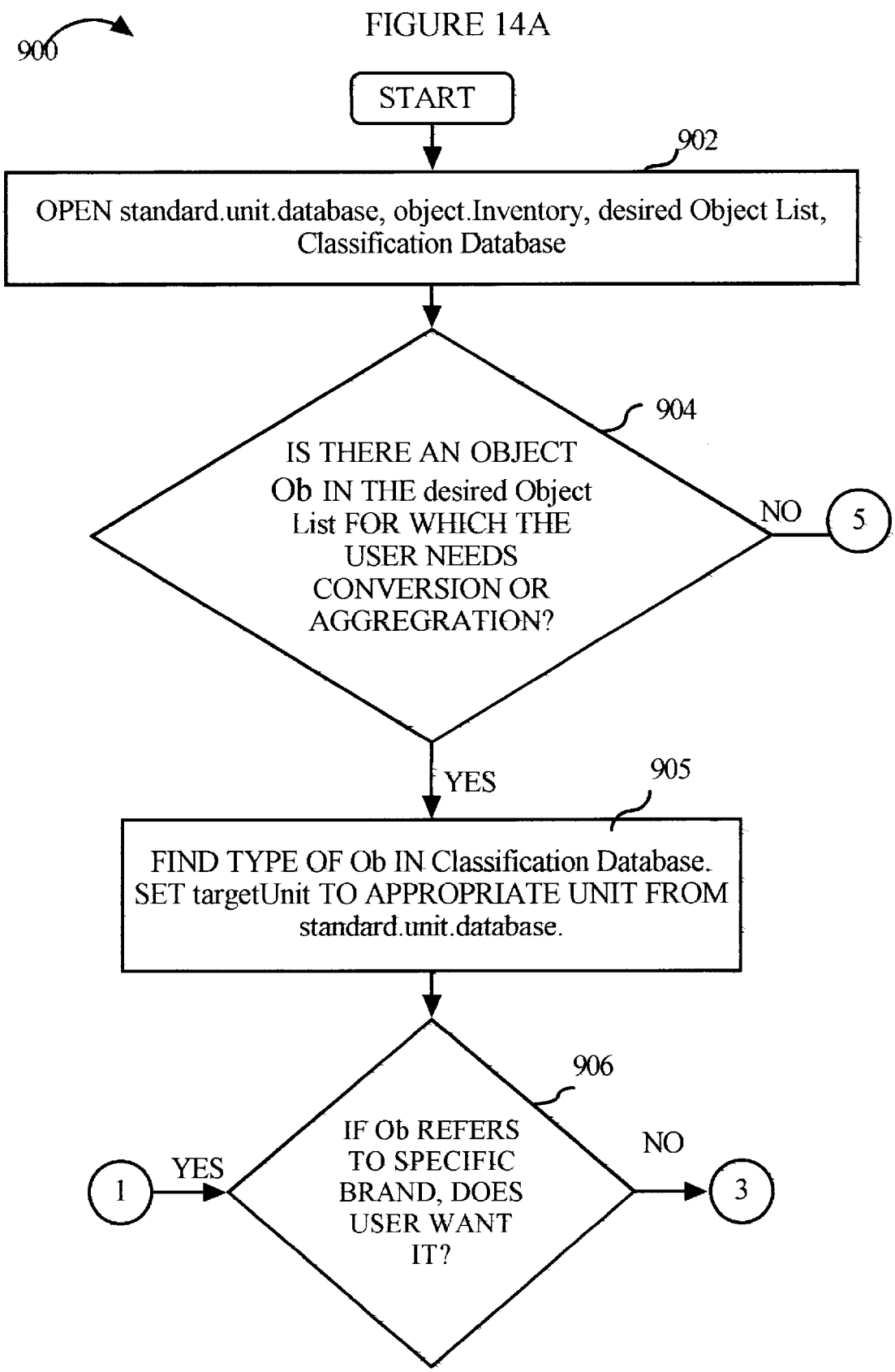

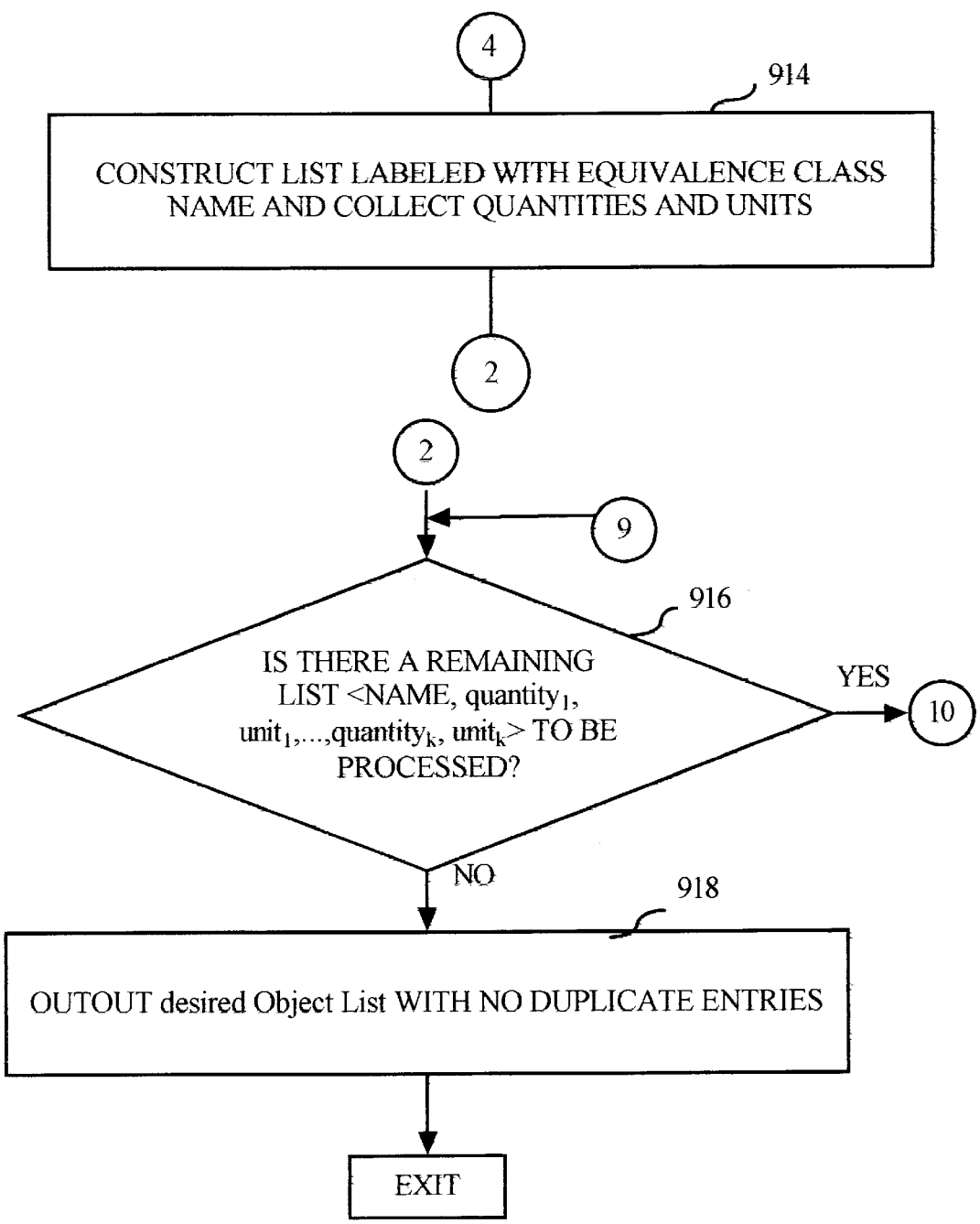

METHOD FOR GENERATING A PATH IN AN ARBITRARY PHYSICAL STRUCTURE

FIELD OF THE INVENTION

The present invention is directed to a device for producing a personalized, (pre-)planned, multi-node path through a complex physical or virtual area. The paths represent tours of the area, and can be designed to optimize some desired characteristics (e.g. time spent). The invention can accommodate a variety of complex areas; physical ones, such as stores, airports, conference centers, museums, as well as virtual ones, like the World Wide Web. Similarly, the nodes may represent a variety of activities: Collecting an item for purchase, eating a meal, the entrance to a gallery, boarding a plane, or browsing a Web site. A variety of aspects of a particular path can also be saved for future reference if desired, and presented to the user through many different views, including simple history information, as well as aggregate information such as: Total spent last month, number of trips to Chicago last year, total calories in food purchased last week. This device can also be easily presented in any of a chosen set of natural languages, if desired.

BACKGROUND OF THE INVENTION

This is the era of the mega: mega airports, mega stores, even mega conference centers. Mega-izing permits various efficiencies in terms of costs and administration, but it can make the navigation task of the human user/customer more difficult. In fact, even medium large stores are often considered difficult to navigate, or "tour," as we call it.

For example, simple grocery shopping can be a time consuming, and frustrating, experience. Few shoppers know where in the store every single item is, resulting in retracings, and waiting to ask store personnel for help. Store personnel are not themselves always able to keep track of things, and frequently either do not know the answer, or, worse, 'know' an incorrect answer. Outages, whether understandable or inexplicable, leave the shopper wondering what to do next. People wanting to read the nutrition analysis on the labels, or to do price comparisons, often find themselves in the way of other shoppers. In addition, in some cases, such as when shopping with young children, it is simply not feasible to stop to do either activity. And since sale items are not always known in advance, people find that they can't always take advantage of the sale, having planned their shopping without this information. This situation is often made more difficult by the super-store phenomena, where inventory may shift dramatically in a very short period of time. Further, some such stores are so large that they are almost overwhelming to the shopper (and, as we have noted, some of the personnel).

On the other hand, advances in computing technology, such as fast processing speeds, and large, cheap random access memory, make it possible to offer services that have not previously been feasible. This includes the prospect of planning an entire trip to a store, or museum or airport, from central processing areas (such as those located in the store or airport, travel agency, etc.) or even from the comfort of one's own home using the interent. It also allows employees to quickly discover where what a user wants is available, and how best to tell the user to get there.

Some of the recent advances in computing have translated into efforts to produce Internet based shopping. A common approach to Internet based shopping is that of the cybermall or electronic mall. For example, MarketplaceMCI (http://www.internetmci.com) displays different merchants and provides a user with a 'shopping basket' to hold their purchases. Others include the Internet Shopping Network (http://www.internet.net), Cybershop (http://www.homeshop.com), and Virtual Vineyards (http://www.retailinfo.com). CompuServe also planned to move its Electronic Mall to the Internet. All of the systems above feature displaying merchandise and allowing the user to order on-line. Some, like Cybershop, allow the user to query across stores in interesting ways, such as by price or product description. These approaches do not involve a user actually going to a store and hence provide no support for planning and optimizing a (physical) shopping trip.

Surfin' UTC (http://www.shoputc.com) is an on-line information site for a physical mall in San Diego. It includes a clickable map of the mall layout, with linked information to the stores and restaurants thus shown, and printable coupons. [Chain Store Age, Sep. 1995, Retailing on the Internet: Seeking Truth Beyond the Hype, pp 33–72]. The software does not assist the user in designing a customized map to help him garner specific desired purchases.

Individual stores also offer some Internet based services. For example, J.C. Penny offers scanned images, product, and pricing information, and accommodates order taking (http://www.jcpenny.com). Other stores are using the Internet as a means of advertising, vs. ordering and shopping. For example, Wal-Mart has a site (http://www.wal-mart.com) which shows information about the company and specials [Chain Store Age, September 1995, Retailing on the Internet: Seeking Truth Beyond the Hype, pp 33–72]. Kmart similarly offers a home page (http://www.kmart.com) showing some of the specials that are also printed in its circular [Chain Store Age, January 1996, Revenge of the Webmaster, p. 150]. None of these approaches help the user navigate through the store involved.

Onsale, Inc. offers a twist on Internet shopping—an Internet auction house, where users bid in order to purchase merchandise. The system is not entirely real time—for example, each auction has a preset ending time. [WebWeek, Vol. 2, Issue 8, Jun. 17, 1996, pp. 23, 26.] However, it too is a completely on-line system, in that there is no issue of a user physically going through any area.

Some Internet shopping products are focused on supermarket and grocery shopping. The Supermarket Shopping Network (http://www.mysupermarket.com) allows creation of shopping lists via menu driven item selection or recipes. However, units were not standardized nor were duplicate items appropriately aggregated. The resultant shopping list can then be emailed to one of the featured stores for collection and home delivery. [Chain Store Age, February 1996, More Than Just Ordering, p. 176]

PeaPod, Inc., (http://www.peapod.com) provide users with software that can be run on home PCs and allows a user to shop a specific store, Jewel, by using phone lines. Users choose items via a series of item menus, and the set of items is then collected by store personnel and delivered to them. Similarly, a Kroger store in Columbus, Ohio allows users to choose items via its World Wide Web site (http://www.foodcoop.com/kroger). Byerly's also allows user's to select items that will be delivered. (http://www.shopat.com/byerly's) [Chain Store Age, January 1996, Super Internet Tests, p. 150].

None of these supermarket based systems involve the customer physically perusing the store, and hence do not provide any navigation assistance. A K-mart store (Rt. 347, Lake Grove) has instituted a system of placing 8½by 11 inch physical maps of the store, labeled by department, and located next to a customer service call box. A store employee can be contacted using the call box and will then physically travel to the customer location and attempt to assist the customer. The store maps are generic and do not reflect the location of their placement. There is no information on the map as to exactly what items are sold at what locations, nor is there a way for the customer to obtain a customized map showing a tour that encompasses the locations of the specific items that he would like to buy.

Nordstrom offers a service of Personal Touch America, whereby customers can email queries and orders, which are then handled by "personal shoppers." It is their hope that the personal shopper will develop a helpful relationship with the customer over time. Another email approach is that of Ann Hemyng's Chocolate Factory, which shows pictures of candy and accepts email orders (http://mmink.cts.com/mmink/dossiers/choco.html). [Chain Store Age, September 1995, Retailing on the Internet: Seeking Truth Beyond the Hype, pp 33–72]. Once again, this service does not involve the user physically perusing the store and hence does not help the user do so.

None of the above electronic systems can satisfy the 'hands-on' aspects required of shopping, at least some of the time, such as, how does it look on, what does the material feel like, how does the produce look and feel. To get the answers to these and other questions, and simply because they enjoy it, shoppers will always physically go to the store, at least some of the time. Further, some activities, such as traveling and museum going, are inherently physically based in such a way that it seems impossible for any only symbolically based system to replace their main activities (e.g., get me to the gate I need).

It is an object of the present invention to provide a method for specifying a set of items or activities or destinations of interest which automatically generates and retains a multiplicity of sets of destinations wherein those items or activities can be acquired or pursued.

It is another object of the present invention to provide a method for ordering each of the so generated destination sets into a path, also referred to as a tour, and choosing the optimal one, based on a user-specified criteria, such as the shortest.

It is yet another object of the present invention to provide a method for attaching time based information to each of the so generated destination sets, and consequently to the corresponding paths, so that the path which conforms best to user-specified timing considerations, such as the one which will enable the user to take a lunch or coffee break at a given time, may be chosen.

It is a further object of the present invention to provide a method for reviewing and querying, with all of the facility of standard database technology, previously selected sets of items, activities, or destinations of interest, and/or prior destination sets, and/or prior paths.

It is another object of the present invention to provide a method for allowing several users at different sites to view, edit, or annotate either the set of items, activities, or destinations of interest, or prior destination sets, and/or prior paths, at the same time or at different times.

It is yet another object of the present invention to provide a method for allowing several users at different sites to leave messages for each other, at the same time or at different times.

It is a further object of the present invention to provide a method for presenting graphical and other information regarding a route of interest.

It is a yet further object of the present invention to provide a method for displaying objects en route to a specified, chosen object.

It is another object of the present invention to provide a method for restarting a tour after an unplanned detour.

SUMMARY OF THE INVENTION

These and other objects are achieved by the methods according to the present invention. The invention creates customized paths of physical and virtual structures, designed to highlight areas of interest specific to a particular user. An area of interest may be either a place where a desired item may be purchased, or where a service is available, such as food service, airline boarding service or exhibit viewing service, an http site (at which some World Wide Web pages are available), to name a few, or a general area such as one a user would like to browse or walk-through (e.g., children's clothing, or the U.S. history section of the bookstore). The invention also arranges the path by user choice around a set of optimizing parameters, the most obvious one being shortest distance. One set of such parameters can also be based on time factors, so that a desire to be in a specific place (e.g. cafe) at a specific time (e.g., lunchtime at 1 pm) can be accommodated. The invention maintains records of a user's previous history and can provide information and aggregation thereof Further, the invention can, where relevant, segregate self-serve items from items to be collected and packed by store employees. The latter can be delivered or picked up, as desired. An example of this is when the customer has a store employee pick up all canned and dry goods, and chooses only meat and produce personally. This component easily extends to having the entire order pre-packed, and possibly delivered.

Entitled The Navimate, the invention transforms user desired goods and services to a customized path of the structure, be it airport, store, shopping mall or other complex. This customized path includes and highlights all the user's noted areas of interest (this path may take the form of a set of addresses in the case of a virtual structure, such as an ordered list of Web sites). Further, it can be modified 'on-line' should the user lose their way, or need to make a detour (e.g. trip to bathroom) via the "get back on track" feature. We refer to these routes as Quick-trips, since they are designed to get the user where they want to go in the minimum time, and can further be optimized along a set of parameters.

Navimate can create personalized tours of a variety of structures because such tours essentially have the same characteristics. Tours typically involve acquiring items and arriving at specified destinations. The primary activity varies—in an airport, getting to the gate is primary, while in a store, locating a specific object of interest is. However, in general, these activities can be viewed in a somewhat interchangeable way—a located object is essentially equivalent to a desired location, and most airport travelers in fact make some purchases. Again, as above, it also does not matter if the location is a physical or virtual one. Hence, a tour of any such structure involves the same issues.

Features of the System

User is helped to choose items or destinations of interest, yielding an interest set. This help can extend from very simple approaches to on-line consultation with an expert. (An intermediate approach is that of 'in-a-bag', below.)

Multiple users may participate in creating the interest set.

Interest set can be chosen either immediately before the tour, or at an 'off-line' time.

Interest set can be added to on a pre-set basis, such as time frequency (e.g., every month) or other factors (e.g., every evening flight).

Parts of the interest set can be segregated for automatic collection.

A tour of the structure which covers the interest set is automatically generated, and can be tailored to a variety of desired characteristics (shortest, least time, etc.).

The tour can be stated in a variety of ways, such as in terms of markings and signage, distance measures, etc.

The tour can be marked as 'now' or 'later.' In the former case, the tour will begin relatively soon. In the latter, the tour can be marked as 'tentative,' all information saved, and the tour re-run closer to when the user will do it, to incorporate any changes.

Prices for items for purchase on the tour can be optionally displayed, guaranteed, or guaranteed within a certain time frame. Relevant coupons and rebates can be automatically found and electronically applied.

Some forms of communication with the user during their time in the structure are available (e.g. a kind of email).

User's individual past history is available either as a means of speeding current decision making or to automate it totally (i.e., do as I last did, or show me only clothing in colors from my color wheel).

A variety of user's personal tour preferences will be available for a similar purpose (e.g., like to stop for coffee).

A get back on track feature is available for users who made unexpected detours.

Arbitrary operations on elements in the interest set can be performed (e.g., total cost, total fat calories, day by day breakdown of how to store/unfreeze items etc.).

Arbitrary information about elements in the interest set can be presented, in a variety of formats (e.g., video, text).

Another feature of interest is 'Show me the Way.' This feature helps the user orient themselves physically in little known structures by presenting images of the path they must travel therein. For example, an air traveler could look at the path they will walk from one gate to the next while still on the first leg of their journey. Then, when they disembark, they will be able to quickly recognize their path.

Another important feature is that of standard commodity management. In most structures, there are some objects which are desired at a predictable rate. For example, a user can predict that they need a gallon of milk a week, a quart of oil a month, or a 10-pack of paper towels a month. Or the user knows that they always want to stop for coffee at the museum, or stop to buy a magazine in the airport. Personalized sets of such standard items can be maintained and used to automatically remind the user of things they may need to buy/do. Users can also specify brands of staples, even if they do not specify the exact size of the item. Thus, a user can indicate that ketchup must be Brand W, and determine the size to buy dynamically. Users can also list brands NOT to buy. 'Generic' can also be used, either as a kind to buy, or kind not to buy.

It is also possible to interface the entire system to related kinds of useful product information, such as might be provided by the manufacturer, or by consumer based organizations.

In-A-Bag Formulations

Another aid to users are 'in-a-bag' formulation, which is a compendium of different objects which together serve some specified purpose. For example, the store may put together a list of items a beginning gardener would need and call it "Beginning Gardening-In-a-bag." This could be expanded to include pages of information about gardening, terms, how to care for the tools, etc. Together, this forms both a kind of shopping list, as well as a kind of specialized, on-line encyclopedia.

The most common type of 'in-a-bag' is a food recipe, where a variety of ingredients together compose a specific dish. Thus, the invention can interface to a menu planner, with a set of recipes which leads to a part of a shopping list. The invention includes algorithmic ways to convert from the units mentioned in the recipe to units relevant to the specific store's stock on hand (e.g. the recipe's 4 tablespoons of butter gets converted to ounces, a standard measure for selling butter, and then into a 8 oz. package, which is the smallest the store both sells and has in stock). Again, these recipes can be interfaced to a kind of encyclopedia wherein techniques are discussed, illustrated and demonstrated via video, for example.

In either case, expert human help can also be made available via teleconferencing at pre-set times, remote hook-ups or via email. Note that the "in-a bag" system is a quick and efficient way provide truly expert advice to a customer that is often beyond the knowledge of the personnel on hand at the time of the quick-trip. National chain stores may hire a number of experts, and over time, the customer can determine which one best fits his/her own predilections, and choose accordingly. Also, this feature can be expanded by email correspondence, including an estimated answer time (e.g., the answer will be available in one hour, one day, etc.).

BRIEF DESCRIPTION OF THE DRAWINGS

These and other features of the present invention will become apparent from the following detailed description, in conjunction with the following drawings, wherein:

FIGS. 1A and 1B are diagrams illustrating hardware configurations for a preferred embodiment of the present invention;

FIGS. 6A through 6F are a flow chart of a basic all paths for lodestar only structures with a single entrance and exit process according to one embodiment of the present invention;

FIGS. 13A through 3H are a flow chart of a find shortest equivalent lodestar path process according to one embodiment of the present invention;

FIGS. 14A through 14F are a flow chart of a unit conversion and aggregation process according to one embodiment of the present invention.

DETAILED DESCRIPTION OF A PREFERRED EMBODIMENT

1. Preferred Hardware and Software Configuration

Figure 1B:
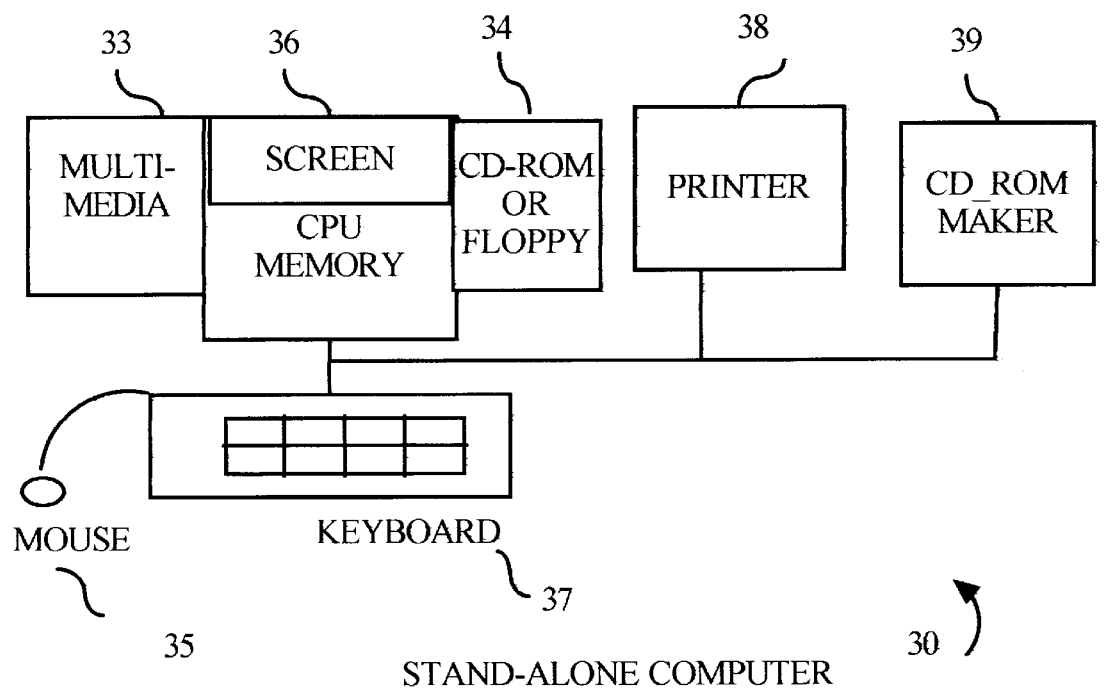

FIGS. 1A and 1B show illustrative hardware configurations 19 30 for a preferred embodiment of the present invention. The present invention may, for example, be used on stand-alone computers 30 or on a computer connected to a network 20. The network may take the form of a local area network such as a Ethernet network 26 or a wide area network such as Internet 24, or incorporate phone lines 22 connected to a computer through a modem 21. A stand-alone computer 30 would receive database information on CD-ROMs or other storage media (e.g., floppy) 34 and display customer trip information on its video screen 36. This information could also be printed out on a printer 38 or presented as a multi-media object on a CD-ROM maker 39 or other storage media (e.g., floppy) 34.

A network connected computer 28 could connect to a display terminals 23, computers 27 and output devices (printer, CD-ROM maker, etc.) 29 within a store over a local area network 26, and to remote computers and output devices 25 over the Internet 24 or over modems 21 or other communication devices. A computer may have a central processing unit (CPU) and memory, keyboard 37, mouse 35 and multi-media hardware 33. Network-connected computers 28 may have standard networking interfaces (e.g., ATM, Ethernet, modems) 20, 21.

Figure 2:
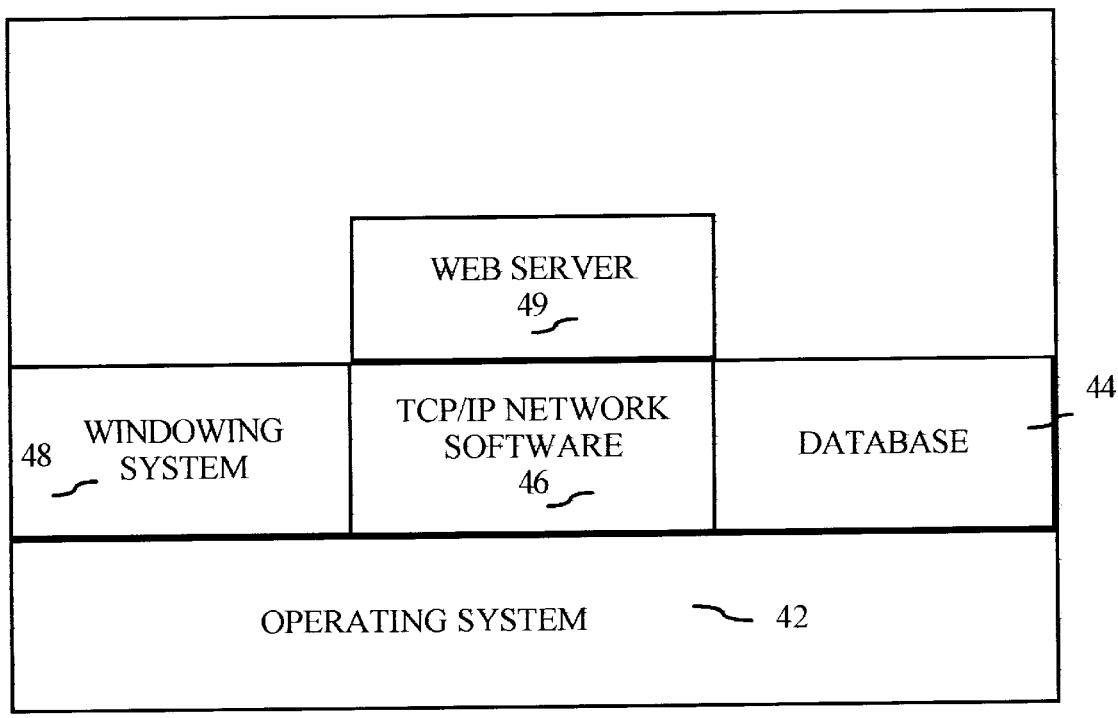
FIG. 2 is a diagram illustrating a software configuration for a preferred embodiment of the present invention.

FIG. 2 shows an illustrative software configuration 40 for a preferred embodiment of the present invention. Each computer 28 may be equipped with an operating system (such as Windows 95) 42, a windowing system (such as MS-Window) 48, network software (such as TCP/IP, modem drivers) 46, database software (such as MS-ACCESS, Sybase) 44, and Web servers 49. On a stand-alone computer 30, the network software 46 and web server 49 would not be required. Navimate system 45 resides on top of this software.

2. Implementation Method

The implementation method preferably has two parts: Creating a Set of Destinations and Creating a Quick-Trip Tour. In the first part, we describe algorithms by which to present objects of potential interest to the user, to collect the set of objects of actual user interest, and to convert from this set to a covering set of structure locations. In the second part, we describe algorithms which create all the different possible paths through a structure, including complete ones (i.e., the tour starts at an entrance point and ends at an exit point). By definition, one of these trips will contain any chosen set of locations, whether that location set represents a complete trip for the user, or information as to how to go to a specific location after an unscheduled detour was made (which we call "getting back on track"), or the set of locations on the way to a specific desired object (which we call on-the-way). In addition, we discuss how to characterize the trips in terms of shortest, least time, and other possible user-desired attributes.

2.1 Creating a Set of Destinations 2.1.1 Terminology and Required Files

The creating set of destinations algorithm provides a powerful user-interface that allows a user to query, store and organize information about the facility of interest. Users may only have a rough idea of the category of interest to them (e.g., area where I can change and feed my baby, restaurant with vegetarian food, housewares) or a precise description (e.g., Brand W Tomato Ketchup 8 oz., Baby changing facility on floor 2 of Store M). In the former case, the system will help find suitable specific destinations or create a range of destinations that the user can tour to satisfy their needs. In the latter case, the system will enumerate the specific destinations where the needed product or activity can be found, and help the user in selecting an alternative if, for some reason, the specific product or facility is unavailable.

In the following, we will use the standard term OBJECT to refer to a product, destination, or activity of interest to a user. An object may therefore be an item to purchase or consume, a location to visit, or a service to acquire. Each object will have associated with it a unique Object Identifier (OID).

We describe these databases: Classification Database, Structure.News, Object.News Database, User.History Database, User.Profile Database, User.Wishlist Database, User.Staplelist Database, Inabag.List Database.

2.1.1.1 Classification Database

The set of objects potentially available to a user in the structure must be organized in an intelligent and systematic way so as to support flexible and quick interaction with the user. This information is maintained in a Classification Database. The database will initially be designed by the facility managers and system integrators and will be extensible. A simple visual interface will be made available so that users can also add information to the classification database. In this way, users can develop a personalized and specialized component of the Classification Database reflecting their own experience and preferences. Classification Databases used for the same type of structure (e.g., grocery store, airport, conference) will generally be organized similarly.

The Classification Database represents all the (accessible) objects in a structure via a directed acyclic graph (DAG) of object categories, relationships between the object categories, and individual OIDs within a category. Each category is also itself an object and hence also assigned an OID. It is possible to assign OIDs in an algorithmically derived way, so that, for example, each leaf object OID can reflect the (possibly multiple) sub-category in which it participates.

Figure 3:
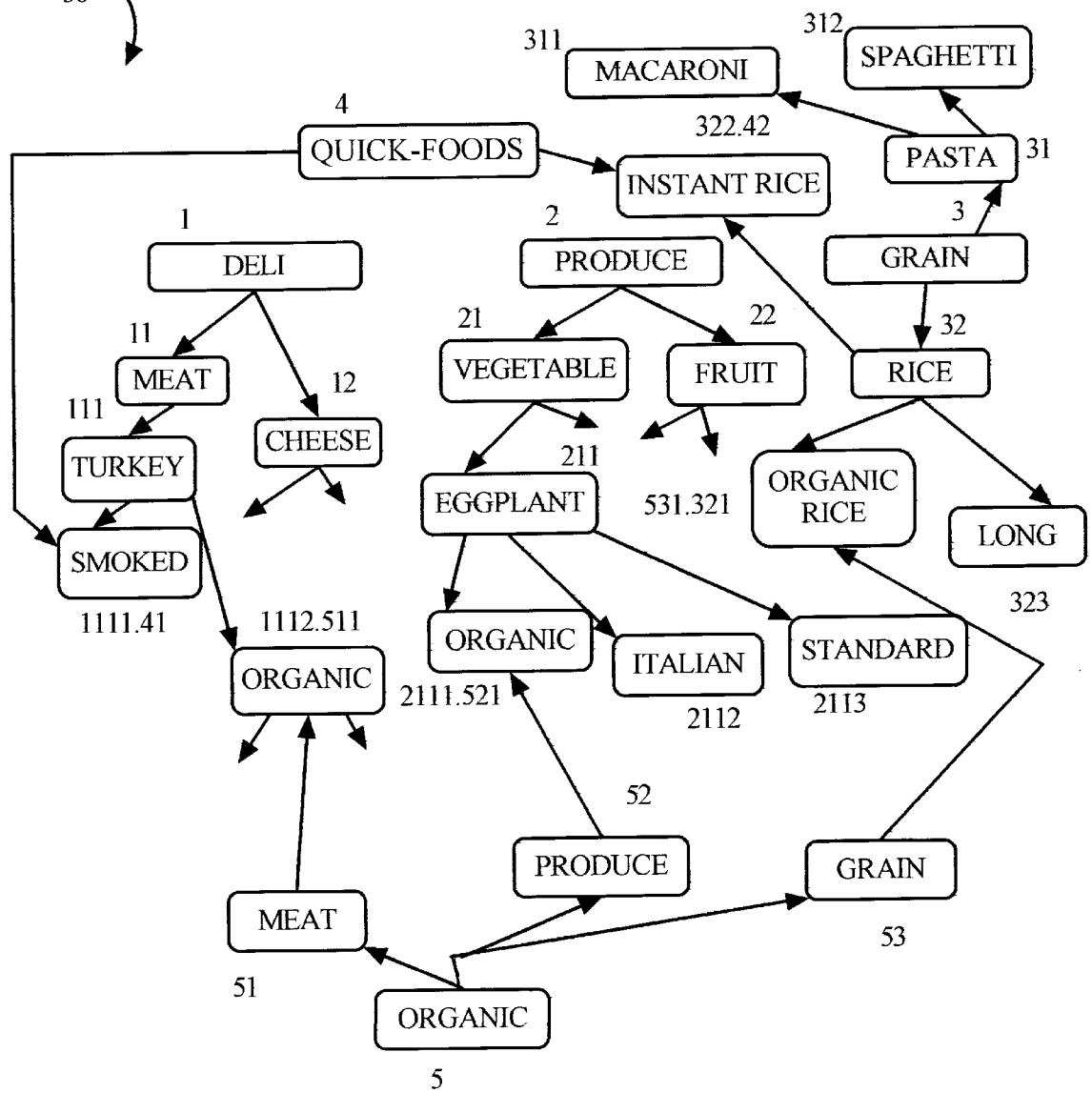
FIG. 3 is a diagram illustrating a fragment of a classification database system according to the present invention.

For an example, we show part of a classification database 50 of a grocery store in FIG. 3. There are five main categories shown: Quick-Foods, Deli, Produce, Grain and Organic. Category Grain has sub-categories Pasta and Rices. Category Rices has sub-categories Instant, Organic and Long-grain Rice. Instant rice also belongs to the category instant foods; in general, an object may have arbitrarily many ancestors (multiple-inheritance). As we noted, each object in the database has an individual object OID. For an example, in the case of a grocery store, the OIDs of the leaf nodes (those without children) may be simply the item UPCs (Universal Product Code), or the UPCs with additional components which reflect the item's place in the DAG.

In the case of an airport, categories might include terminal, floor, and wing. Individual objects could include gates and items available for sale at the stores, kiosks, etc. within the airport. Another important category in this case would be Flight Information, so that the user's flight and gate information is available. This may be accomplished by taking a view of databases standard to the travel industry.

2.1.1.2 Structure.News Database

New information about the structure is maintained in structure.News (e.g., weekly specials, sales by particular stores, new wing, construction information). Entries in this file have the format:

<starting date, ending date, category, multi-media description>.

A wide-range of different category types may be designed by the structure managers, including such categories as Sales, Specials, New Facilities, Improvements, etc. A multi-media description that may be comprised of text, graphics, audio and video provides an appropriate description of each item. Example 1 is a sample structure.News database for a mall:

EXAMPLE 1

<Sep-1-96, no-end-date, New Facilities, multi-media description of New Food Court>
<no-start-date, no-end-date, Specials, multi-media description of Tuesday and Wednesday Evening Promotions>
<Nov-1-96, Jan-1-97, Seasonal Stores, multi-media description of vendors selling winter-oriented goods in Mall aisles>

2.1.1.3 Object.News Database

Object.news maintains information specific to an object (e.g., product changes, activity updates, product rebates). Entries in this file have this format:

<starting date, ending date, object OID, multi-media description, pointers to other manufacturers' or vendors' database(s) describing the information>.

Pointers may take the form of a link to a local or remote database, a URL to a web-page; etc. Example 2 is a sample object.News database for a chain store:

EXAMPLE 2

<Sep-1-96, no-end-date, 019912, Good-Cuppa Introduces New Coffee Ice Cream (multi-media description), pointer to manufacturer database>
<Jan-1-96, March-12-96, 231200, YumYum Foods Coupon Offer on 8 oz. EZ-Eat Baby Food (multi-media description), pointer to manufacturer database>
<Nov-1-96, no-end-date, 0911100, GoodWash offers 128 oz Detergent (multi-media description), pointer to manufacturer database>

The structure.News and object.News files address the fact that people organize their trips to stores, museums, malls based on specials and special events. For example, for some people, cosmetic promotions are the initial incentive for a trip to a mall. Similarly, customers come to book stores specifically in response to notices of book signings. Customers wait for sales before going clothes shopping. A further elaboration for on-line customers is to get email generated automatically when objects of interest appear in these databases.

2.1.1.4 User.History Database

User.History describes the objects the user has previously visited or acquired. Entries in this file have this format:

<user id, structure id, date and time visited or purchased, object name, object OID, optional price and quantity field, optional included_in_object_list field, optional was_object_actually_acquired field, user comment field>.

Example 3 is a sample user.History database for user mishra's visits to John F. Kennedy airport in Queens, New York City:

EXAMPLE 3

<mishra, JFK Airport, Sep-1-96 at 3 pm, SuperSonic Airlines Lounge, 319912, NULL, TRUE, TRUE, has good phone hookup for computers>
<mishra, JFK Airport, Sep-1-96 at 4.30 pm, WingDing Restaurant in Concourse A, 092871, NULL, FALSE, TRUE, Never Eat here again>
<mishra, JFK Airport, Sep-1-96, Singh's Newstand Next to Gate 37A, 2310, NULL, FALSE, TRUE, Good collection of European newspapers>

The optional fields are set only if additional information about the user's activities are available from the structure or from the user. The included_in_object_list field indicates whether the object was included in the user's desired object list (defined below) when the user visited the facility. The was_object_actually_purchased indicates whether the user, after including the object in the desired object list, actually made the purchase or visit.

2.1.1.5 User.Profile Database

User.Profile lists object names and OIDs that the user always wishes to visit or acquire at this facility. It can also list object names and OIDs that the user never wishes to visit or acquire at this facility. It also includes preferences describing whether or not the user wishes the creating set algorithm to automatically prune the displayed information based on any of the user.History, user.StapleList or user.Wishlist (described below).

The user.Profile database contains a series of preference flags and information. This includes personal tour information, which is a list of places the user wishes to be scheduled into the tour (in order to browse for example) even if the user did not explicitly choose an item from this place (e.g., browse children's clothes, stop at museum restaurant). The personal tour information can be a list of department names, or a list of objects or object categories, each of which is mapped into its respective OID in our system.

The user.Profile database can also include a list of department names and or categories that this user never wishes to see displayed. For example, an apartment dweller may choose not to have any information on lawn products presented. A single person may choose not to have any information on children's products presented. This list takes the form of department names or categories that are to be ignored. This list can be derived from the customer's history, and/or by direct input from the customer.

There are two different kinds of information stored in the user.Profile database: objects of interest to the user, and the user's program interaction preferences. Accordingly, there are two possible formats for the database entries. We show first the object of interest entry format, and then the program interaction preference format:

1) <user name, structure id, date of entry, object name, object OID, instructions>
2) <user name, structure id, PREFERENCE, list of user's program interaction preferences>

The instructions list may include such possibilities as a day of the week, meaning which day of the week the user is interested in the object, or, not a day of the week (NOT FRIDAY), to indicate that the user is not interested in this week day. This allows the user to reflect that they do not enjoy visiting the museum's cafe on Fridays, when it always seems crowded, for example. Other possibilities are ALWAYS, NEVER, ONLYON combined with a DATE RANGE (e.g., Sep-1-96 to Jan-1-97), or DURING, combined with a TIME RANGE (e.g., 10:00 a.m. to 1:00 p.m.).

Example 4 is a sample user.Profile database for user esther's visits to the Metropolitan Museum in New York City:

EXAMPLE 4

<esther, Metropolitan Museum, Modern American Painting, 231001, ALWAYS>

<esther, Metropolitan Museum, All sculpture, 21091, NEVER>

<esther, Metropolitan Museum, Vermeer Special Show, 331001, ONLYON Sep-1-96 to Dec-1-96>

<esther, Metropolitan Museum, Gift Shop, 771021, ALWAYS>

<esther, Metropolitan Museum, PREFERENCE, ALWAYS PRUNE WITH ALL FILES>

2.1.1.6 User.Wishlist Database

User.WishList constitutes a list of objects of interest to the user (generally, on a per-structure basis), that the user has accumulated over a period of time, and can, for example, express items that they would like to buy if the "price is right." Entries in this file have this format:

<user id, structure id, date of entry, object description, optional price range and suggested quantity field, user comment field>.

The wishlist is especially helpful in structures which frequently change their inventory, because the user gets notified that what they want is available, vs. having to seek it out. It is also helpful when the user does not want to spend time looking at specials, and prefers to get notified when specific items of interest go on sale.

Example 5 is a sample user.WishList database for user esther's visits to Priced-Right Stores in Lake Grove, Suffolk County:

EXAMPLE 5

<esther, priced-right, Oct-10-96, Walnut Oil, below $4.50quart, can make nice cake>

<esther, priced-right, Oct-13-96, Couch, under $500, get delivery info>

<esther, priced-right, Nov1-96, Diapers Size 4, under $20 for a 100, Store T has $20 per 100>

<esther, priced-right, Oct-12-96, Some Rice, NULL, white or brown>

While the goal of a wish list is to allow the user to express items which are desired in some contingent way, and be automatically notified when the contingency is met, the wish list can also work in an unconditional way. For example, the last tuple above, with a NULL condition, will the effect of always notifying the user (and/or placing on the list) to buy rice. While this is really more the job of the staple list, it is worth noting that the wish list can also do this job, should the user 'misplace' his/her information.

2.1.1.7 User.Staplelist Database

User.StapleList lists objects that the user wishes to visit or acquire when visiting this structure, on an optional predicted frequency. Entries are of the form:

<customer id, structure Id, object OID, optional item quantity, optional frequency, comment>.

The frequency field can take the form of ALWAYS, daily, weekly, bi-weekly, monthly etc., and refers to the frequency with which the user wishes to visit or acquire the object.

Example 6 is a sample user.StapleList database for user prateek's visits to Store K Stores in Lake Grove, Suffolk County:

EXAMPLE 6

<prateek, Store K, (Brand G Size 3 4-Pack) 012100, 1, monthly, substitute with Brand Y>

<prateek, Store K, (AA Batteries 4-pack) 901102, 2, monthly, NULL>

<prateek, Store K, (Toilet Paper 16-pack) 6412, 1, monthly, 2 8-packs are OK>

<prateek, Store K, (Paper Towels 8-pack) 60412, 1, monthly, 2 4-packs are OK>

The user.StapleList Database can thus be used to represent information regarding the customer's standard purchases, such as flour and sugar in a grocery store setting, or film, batteries or light bulbs in a discount store setting. This information is accompanied by a frequency, such as weekly, bi-weekly, monthly, beginning-of-summer, etc. Observe that the staple list does not need an exact description of an item (e.g., Mona Lisa at the Louvre) but can instead refer to a type of item instead (15th century Italian Painting). For another example, a user may wish to staple 9 inch paper plates, but not a specific pattern (indeed, since patterns are both seasonal and holiday variant, it might be better not to target a specific one). If the user does want an exact item (Brand X 40 watt light bulbs only), then the corresponding Item UPC will naturally be used in the object OID field. Additionally, this database can be organized as a collection of sub-databases, with headings such as: Food staples, Spring Cleaning staples, O'Hare Airport, JFK Airport (with the assumption of a national or international airport system, to save traveler's from registering at each airport), Building A of Airport X, Building B of Airport X (frequent flyers may develop very specific requests in specific airports), or with user chosen headings such as: Children's Party staples, Xmas Party staples, etc.

The user.StapleList Database may also be used as the basis of a Staple Reminder System. In the Staple Reminder System, a customer can choose to be automatically reminded of all objects which he/she has not acquired or visited within the frequency specified in the Customer Staple Database, or all quantities of such items (e.g. bought 24 oz of oil within a month but staples are for 32 oz of oil). Further, users may indicate that a specific purchase is not to be counted as a staple (for e.g., they may be buying for a special event, not for everyday consumption). The staple reminder system could also be interfaced with an e-mail system, so as to generate an e-mail reminder to the user.

2.1.1.8 Inabag.List Database

The inaBag.List provides a general form of recipe for a range of structures and situations. These may take the form of a food recipe in a grocery store, a museum tour that typically fits into a half-day visit, a sequence of destinations at an airport that would allow a traveler to feed and diaper a baby before boarding a flight. The general format of the database is:

<structure id, inaBag item name, sequence of object names and OIDs, time estimate, cost estimate, comments>.

Example 7 is a sample inaBag.List database for a major airport:

EXAMPLE 7

<airport, Diaper Baby and Feed Baby and Self in Concourse C, {Bathroom with Baby Facilities, 090001, Lounge with Full Service Restaurant, 89121}, 30 minutes, NULL, NULL>

<airport, Shower Shop and Dine in Concourse D. {Bathroom with Shower, 87612, Concourse D shopping Mall, 76612, Self-Service Restaurant, 1211}, 45 minutes, NULL, shopping mall includes liquor store, newstand>

<airport, 6-Hour Layover At Airport, {Left Luggage facility, 987, Cash Machine, 12, Mishra Limousine Service at Baggage Claim, 198721, Downtown Shopping Area, 12111, Return to Terminal 3, 121, Left Luggage facility, 987}, 6 hours, $30, costs are for limo service and one luggage locker only>

Many other variations can be represented by 'in-a-bag' formulations. For example, the store may put together a list of items a beginning gardener would need and call it "Beginning Gardening-In-a-bag." This could be expanded to include pages of information about gardening, terms, how to care for the tools, etc., representing a kind of specialized, on-line encyclopedia. Such a system allows the store to quickly and efficiently provide truly expert advice to a customer that is beyond the knowledge of the in-store personnel at the time of the shop. Chain stores may hire a number of experts, and over time, the customer can determine which one best fits his/her own predilections, and choose accordingly. Also, this feature can be expanded by email correspondence, including an estimated answer time (e.g., your answer will be available in 1 hour, 1 day, etc.). Remote hook-ups can also provide for more immediate question and answer sessions, if desired.

2.1.1.9 Overview of Creating Set Algorithm

The creating set algorithm will allow users to interact directly with a presentation of the the Classification Database in order to make their object selections. This can be done either by presenting the entire Database, or by 'filtering' the database through the customer history by showing only those paths in the DAG of the structure's Classification Catalog that the user's user.Profile, user.History, user.StapleList and user.WishList files actually traverse. Thus, for example, a customer who buys pasta, but never beans, could have this history automatically reflected, via pruning, in the presentation of the items in the store.

Pruning processes can reflect desired items which have not yet been purchased ( as included in the user.WishList or user.Profile list), which ensures that these categories or objects continue to be presented.

Because the Classification Database is defined in terms of objects and object categories, either level of information can be the basis of a user query. For example, a user may wish to see how much pasta they bought last month (vs. how much of each of the five different kinds they bought), or how many diapers, not caring about which brand. For another example, the Classification Database can provide information on object categories such as departments (e.g., Bakery, Deli, Housewares, Ladies Clothing, etc.). Altogether, the information in this database can be used to create a personalized, on-line Record/Inventory of activities and purchases, either on a leaf object level (e.g., in an airport, gate; in a store, a particular item) or category object level (e.g., in an airport, duty free area; in a store, a type of item, such as diapers). Such personalized record keeping can be maintained for an arbitrary period of time, allowing users to query for the last week, month, year, and so on.

The overall goal of the creating set algorithm is twofold: (1) using the files described above and interaction with the user create a Desired Object List, and (2) report the desired object list back to the consumer and after verification that it is complete, generate a list of corresponding destinations.

The desired Object List represents the items that the customer wishes to visit, do, see, or buy on the current trip, and is a set of 6 tuples:
<structure id, customer id, object selection date, object OID, (optional) object price and quantity, Comment>.

Each Object List the user creates is saved and integrated with the user.History list so that the individual's shopping history is available, and can be used to answer questions users would like to ask, such as: What did I buy last week, or N weeks ago? What areas did I visit in Newark airport? As explained above, the user.History list also contains information on whether objects from the list were actually acquired or visited and whether an object was acquired or visited without being on the list.

2.1.1.10 Object.Description Database

The object.Description database is a pair associating an object, via its OID, to a record containing a description of that product. We envision that description to have optionally many components, including a text string describing the object, or a pointer to a file containing a set of pictures of the object. For example, in the case of food products this could be a picture of the nutrition information as shown on the actual product. Another example is the use of audio and/or video clips to describe a wing of a museum or airport. Linkages to databases provided by the manufacturer or originator of an object may also appear here, or other on-line information such as encyclopedias and even newsgroups. Thus, the product description is of an arbitrary multi-media nature, yielding a database of the following form:
<structure id, object Name, object OID, id of record of arbitrary multi-media description, optional pointers to other databases>.

The object name and OID must correspond to that maintained by the classification database. Example 8 is an example of an object description database at a chain store:

EXAMPLE 8

<Store K, Women's Clothing, 0921112, pictures and overview of Women's Section, NULL>
<Store K, Girls ActiveWear, 7812, pictures and overview of Girls ActiveWear Section, NULL>
<Store K, Popular Designer Casuals, 8912, pictures of different products in this product range, pointer to Popular Designer Web Page>
<Store K, Normal Kamali Brand XXXX Sizes 2–16, 981, pictures of different products in this product range, pointer to Popular Designer Web Page>
<Store K, Mens Wear, 19700, pictures and overview of Men's wear section, NULL>
<Store K, Goodundy Cotton Underwear Sizes S–XL, 3012, pictures and overview of Goodundy Underwear, pointer to database of Goodundy products>

2.1.1.11 Object.Inventory Database

The object.Inventory database provides inventory information. Entries in this file have this format:
<object OID, optional item price, beginning date of availability, ending date of availability, current availability (date and # of items), expected availability>.

For a chain store the inventory database could describe, for each different product type, how many units, and at what price, are currently available or will be available. The entries for department OIDs could describe timings and other details: Pharmacy is open between 6 a.m. and 12 p.m., Deli between 9 a.m. and 6 p.m. etc. In a museum or airport, the database could describe gates, concourses, lounges, bathrooms, wings, and exhibits, together with timing and ticketing information.

Example 9 is an example of an object inventory database at a chain store:

EXAMPLE 9

<0121, 3.25, always, always, Oct2-96 310, NULL>
<981, 10.75, Sep-1-96, always, Sep-23-96 7, NULL>
<101, NULL, Nov-1-96, Jan-31-97, NULL, Nov-15-96>

2.1.1.12 Model And Databases For Structure Navigation 2.1.1.12.1 Terms

We need a way to describe the structure to the user in units that are easily nutured and small enough to be easily searched. We call the former "lodestars" and the latter "navigable display units" and we explain each below. (Note that in the case of physical structures, these are likely to be distinct, but in virtual ones, such as Web pages, these may be one and the same).

Navigable Display Units

By "distinct location" we mean an area that is at least in some way separate and also is small enough for a customer to scan quickly. For example, in many grocery stores, the typical unit of interest to store personnel is the Stock Keeping Unit (SKU), generally, an entire shelf of an aisle. However, an SKU is often too long for a customer to scan quickly. Generally, these have to be divided, either logically (first half, second half) or via actual markings (e.g., SKU painted in 3 different colors, to divide it in thirds). Thus, in a sense, we need to express the atomic physical units which can be unambiguously identified and to which people can be sent with relatively simple instruction. Further, the different SKUD have to be grouped hierarchically into their respective physical units (e.g., aisles) so that their physical relationships can be deduced and can be used as the basis for an efficient tour. And in terms of a tour, it does not matter how many of the shelves within a part of an aisle are relevant to the customer, what matters is that he/she has to go to the front of aisle one, on the left. This is an example of the granularity of the information that will be used to create the tour.

We coin the term 'navigable display unit' (NDU) to capture the notion of 'smallest user recognizable display area.' Each NDU can reflect the hierarchic structure of the facility it describes, such as N1=(Terminal A, Mens Bathroom, after gate 22, before gate 23) in an airport, or N2=(Aisle 1, First Third, Left facing exit, $3^{rd}$ Shelf) in a chain store. It is important to be able to deduce a kind of proximity relationship between two NDUs. NDU names may be chosen to facilitate this (e.g., N3=(Aisle 1, Second Third, Left facing exit, $2^{nd}$ Shelf) follows N2 and refers to a location above it) or an explicit database may be used to encode the relationship between NDUs.

Exactly which piece of a structure should correspond to a navigable display unit is a question of both judgment and of the size of the underlying physical structures. Creation of NDUs for a structure would be carried out by the structure manager and would be revised based on user-experience and feedback. Many sub-parts of larger structures directly correspond to an NDU: Gates in a airport; display cases in a museum; in a chain store some of the endcaps and gondolas are small enough to be a single NDU.

Lodestars

To complete the task of helping the customer find their objects of interest, the structure must have either implicit or explicit orientor objects at regular or at least sufficient intervals. We refer to these objects as lodestars. Generally, these will be explicit, physical, and distinctly named objects, with perhaps the most well-known example being the aisle signs and department names in a chain or grocery store. These are generally clearly visible and assign a unique name to each aisle. They also offer the benefit of predictability (e.g., aisle 2 is next to aisle 1). However, even in this case, the concepts of 'front' and 'back' must be either obvious or clearly marked (aisle middle would generally be obvious). In a museum, floors, wings and specific collections can serve a similar purpose. These orientor objects can also serve as a means for representing the structure symbolically in a computer file.

In structures where the layout does not lend itself to the use of such regular and suggestive orienting objects, we propose the use of our Lodestar System. In this system, a series of clearly visible and mutually distinguishable marking objects, lodestars, is placed in the structure to serve as orientation points for the customer. One example is the use of colored, numbered floor markers or ceilng hangings. The colors can be single (red, blue, etc.), pairs (red-green, yellow-blue, etc.) and the numbering system may also reflect the alphabet (e.g., B12). The idea is to stepping stone 'tile' the structure in as predictable a manner as possible with the lodestars. One such tiling, for example, would be to tile the entire perimeter in red, starting from A1, B1 . . . Z1, A2, etc. Then tile each major walk way in a different color, numbering in a similar manner. This is just one example of how tiling might work. Ceiling hangings may also be introduced to serve as orienting objects in a similar fashion in certain situations.

Even in structures such as grocery stores that have natural orienting objects such as aisles, it may be helpful to introduce additional explicit lodestars. For example, with extremely long freezer sections, the shopper will find it useful to see large (colored) numbers on distinct doors. Also, new customers who are not familiar with the store will benefit from a (colored) lodestar system such as the above, as they are not familiar with where the deli, bakery, etc., are. Once the explicit or implicit lodestars have been chosen for the entire structure they also serve as a means to represent the structure symbolically.

2.1.1.12.2 Files

We need several relations involving the symbolic description and the "physical" one. These relations are represented by the following databases.

Object.Location Database

The object.Location Database expresses the relation between an object's symbolic location description, expressed as a lodestar, and its "physical location" expressed on the NDU level . Note that objects sometimes have multiple corresponding positions.

The object.Location Database is a set of pairs, (OID, NDU). Not every OID would have a NDU associated with it, and some OIDs would have more than one NDU associated with them. Mostly, we would anticipate that the object with NDUs would correspond to leaf nodes in the classification database or nodes that were very close to the leaf node. This corresponds to the idea that a product (e.g., corned beef) or service (e.g., Madras Vegetarian Restaurant) typically has a fixed location, and that location of a class of products (e.g., Meat Section) and services (e.g., Fast Food) is based on the location of the set of products and services that make up the entire class. However, some categories (e.g., Deli) may be compact enough to be described by a few entries in the object location database. This pair thus represents the information of what object is located on which part of which navigable display unit, or what service is available at which navigable display unit. Since an item/service may be in more than one place in the structure, a single OID may participate in more than one such pair.

Example 10 displays part of a object.Location database for a chain store. Note that one object is in two locations (OID 1111):

EXAMPLE 10

<1870, (Aisle1, Second Third, Left facing exit, $2^{nd}$ Shelf)>
<1870, (Aisle1, Last Third, Left facing exit, $2^{nd}$ Shelf)>

<1111, (Aisle1, Second Third, Left facing exit, $3^{rd}$ Shelf)>
<1111, (Central Display Area, Facing Exit, Left Quadrant)>
<971-a, (Aisle1, Last Third, Left facing exit, $3^{rd}$ Shelf)>
<971-b, (Gourmet-Refrigerator1, $1^{st}$ Shelf)>
<971-c, (Central Display Area, Facing Exit, Left Quadrant)>
<2412, (Aisle3, First Third, Left facing exit, $1^{st}$ Shelf)>
<2190, (Central Display Area, Facing Entrance, Left Quadrant)>
<8, (Central Display Area, Facing Exit, Right Quadrant)>

Structure.Layout Database

The structure.Layout Database relates NDUs to lodestars, and is a set of triples:
<Navigable Display Unit, Lodestar Id, Distance OR Direction>

If a Navigable Display Unit is close to a set of lodestars, there would be one pair for each set member. The third component, Distance OR Direction, which we will call an ORIENTATION HINT, is an optional way to give an even finer grain of instruction. For example, this field can be used to indicate that an NDU is approximately a foot and a half to the right of a given lodestar, or so many feet south of one. This information can then also be provided to the customer. In some cases, the exact relationship may be very obvious and this field can then be left blank.

Example 11 shows part of a structure.Layout database. Here, the aisles themselves are used as lodestars (e.g., A1, A3) as is the large and obvious central display area of the store (CDA). Notice that this means that many NDUs may be mapped to a single lodestar, as we see below, where all the NDUs with A1 in them get mapped to the lodestar Aisle1.

EXAMPLE 11

<(Aisle1, Second Third, Left facing exit, $2^{nd}$ Shelf), A1-mid, NULL>
<(Aisle1, Second Third, Left facing exit, $3^{rd}$ Shelf), A1-mid, NULL>
<(Aisle1, Last Third, Left facing exit, $2^{nd}$ Shelf), A1-last, NULL>
<(Aisle1, Last Third, Left facing exit, $3^{rd}$ Shelf), A1-last, NULL>
<(Aisle3, First Third, Left facing exit, $1^{st}$ Shelf), A3-first, NULL>
<(Central Display Area, Facing Entrance, Left Quadrant), CDA, Go Left facing Entrance>
<(Central Display Area, Facing Exit, Left Quadrant), CDA, Go Left facing Exit>
<(Central Display Area, Facing Exit, Right Quadrant), CDA, Go Right facing Exit>

Lodestar.Layout Database

The lodestar.Layout Database expresses the connectivity between the structure's lodestars, via storing a pair of lodestars if they are 'adjacent' to each other. What 'adjacency' entails depends on the structure. Some typical examples would include being next to each other, or visibility issues. For example, in a grocery store, it may be enough to remark that aisle 1 is adjacent to aisle 2. Depending on the set of lodestars chosen we may need a finer grain of detail, such as that aisle 1 front is adjacent to aisle 2 front, aisle 1 end is adjacent to aisle 2 end, and that in any given aisle, front is adjacent to middle and middle is adjacent to end. In a discount store, dot 1 may be considered adjacent to dot 2 only if a person can see dot 2 while standing on/near dot 1. Examples of lodestar.Layout databases are given in Section 2.2, on Creating a Quick-Trip Tour, FIG. 4 and Examples 14 and 15.

Lodestar.Instruction Database

The lodestar.Instruction Database contains information on how to navigate between (adjacent) pairs of lodestars. This information is generally anti-symmetric. For example, one turns right to get from A to B, but left to get from B to A. Therefore, both pieces of information may need to be represented.

The lodestar.Instruction Database may be either a triple or a quadruple, depending on the complexities of navigation. For example, due to the regular nature of the aisle layouts in many grocery stores (e.g., it is obvious that from aisle 1 front to get to aisle 2 front a left turn is needed), a triple generally suffices:
<Current Lodestar Id, Destination Lodestar Id, Direction Instruction>.

However, if following colored dots, for example, a move from Red 2 to Red 1 may be straight ahead, if the customer was on Red 3 to begin with, or may require a turn (left or right) if the customer was on Yellow 5 to begin with. Hence, a context is needed, but generally one prior lodestar would generally be enough (otherwise, a list of prior lodestars would be needed). In this case, the Lodestar instruction Database is a quadruple:
<Prior Lodestar Id, Current Lodestar Id, Destination Lodestar Id, Direction Instruction>.

Direction Instruction can be right/left turns, including an amount of turn (e.g., approximate degrees, such as 90 or 45, or descriptions like 'sharp' or 'wide'), or 'straight ahead,' etc. Note, too, that there exists a set of originator lodestars which have no prior lodestars, such as those at the entrance of the store. In such cases, "n/a" may be placed as the Prior Lodestar Id in the database.

Example 12 shows part of a lodestar.Instruction database for a museum. The museum lodestar.Layout is shown in Example 15 and FIG. 4:

EXAMPLE 12

<n.a, 1 (Entrance), 3 (Courtyard), Follow RED signs>
<n.a., 1 (Entrance), 2 (Ancient Roman), Follow YELLOW signs>
<3 (Courtyard/Snack-Bar) 6 (Gift Shop/Exit), Follow RED signs>
<3 (Courtyard/Snack-Bar), 5 (Restroom), Follow GREEN signs>
<6 (Gift Shop/Exit), 7 (Ancient Chinese), Continue beyond shop entrance and follow YELLOW signs>
<7 (Ancient Chinese), 6 (Gift Shop/Exit), Return to Gift Shop following PURPLE signs>
<6 (Gift Shop/Exit), 8 (Modern American), at shop exit turn right and follow RED sign>
<8 (Modern American), 9 (Modern European), At gallery entrance turn left and follow BLUE signs>
<9 (Modern European), 11 (Restaurant), At gallery exit turn right and follow RED signs>
<11 (Restaurant), 12 (Middle-East), At Rest Room Area follow BLUE signs>
<12 (Middle-East), 11 (Restaurant), follow RED signs to Restaurant>
<11 (Restaurant), 10 (Special Exhibitions/Exit), At restaurant entrance follow YELLOW signs>

2.1.2 Creating Set of Destinations Algorithms

The user may create a set of destinations remotely over phone-lines or using the Internet or within the structure itself by direct use of terminals connected over a local or wide area network to computers. In addition, structure personnel may use the system to guide themselves or users.

Some structures may require authentication in the form of a password, ticket number, etc. In the below we assume that the user has completed the authentication step which may be implemented using standard software and hardware tools. The exact technology used for interaction and display with the user will vary with the state-of-the-art in User Interface Design: This may include command line interfaces, menu system, graphical user interface, voice input and output, video input and output, input from mouse, trackball, movement of user eye, mouth, nose, hands, and legs.

Output of the algorithm is a Desired Object List and multiple sets of lodestars, with each lodestar optionally labeled with an orientation hint. The multiplicity of lodestar sets correspond to the fact that (1) the same object may be available at different NDUs, and (2) each NDU may be located near several lodestars.

FIGS. 5A through 5F are a flow chart 100 of a preferred method of creating a set of destinations. This preferred method comprises the following steps:

1. Following databases are opened: classification database, user.StapleList, structure.News, user.WishList, object.News, user.History, user.Profile, inaBag.List, object.Description, object.Inventory, object.Location, structure.Layout (step 102).
   1a. User may repeat any one of steps 2–7 in any sequence. When the user is done, user goes to step 9 (step 104).
2. user.Profile, user.WishList and user.History database are displayed to the user for review and editing (step 106).
3. structure.News and object.News are presented to the user for interaction and display to the user; the display may be filtered through any or all of user.Profile, user.WishList, or user.History. User may add, modify or delete objects in the user.WishList (step 108).
4. inaBag.List database is presented to the user. The display may be filtered through any or all of user.Profile, user.WishList, or user.History. User may add, modify or delete objects in the user.WishList (step 110).
5. user.StapleList is presented to the user. User may add, modify or delete objects in the user.WishList (step 112).
6. Classification database is presented. User can search classification database in a variety of ways: interaction with icons or picture, interaction with menus, direct string input of desired objects, search through the database for any object meeting certain criteria etc. The user can choose to interact only with a part of the database by filtering it through any or all of user.Profile, user.WishList, or user.History. User may add, modify or delete objects in the user.WishList (step 114).
7. An entry in user.WishList is checked against the object.Inventory database for availability. User may choose to interact with contents of object.Description database for more information about the object (steps 116, 118).
   7a. User may further refine entry (e.g., move towards leaf object in classification database) and add, modify or delete objects in the user.WishList (step 122).
   7b. User may select entry for inclusion in desired object list provided object is available in object.Inventory database. Other information such as number of units, price, selection date and user comments may also be included or pointed to in desired object list record. TotalPrice variable is incremented with the product of the number of units and the price per unit (step 120).
8. Goto Step 1a.
9. For each entry D in the desired object list we use the object OID as a key to lookup the associated NDU for the object in the object.Location database. If there is no entry for the OID and hence no associated NDU, goto step 10, otherwise goto step 11. When no entries D in the desired object list remain to be considered goto step 12 (steps 124, 126).
10. If this step is reached, the Desired object D will be for a non-leaf node. Hence D will (generally) represent a number of particular objects. We can send the user to all of them, or give the user assistance in creating a sub-set of interest via user interaction. Via consulting the classification database and the structure.Layout Database, we carry out the following sequence of steps (step 130):
    10a. Inform user that D is not a single object, and name the category of D.
    10b. Repeatedly offer user a menu of choices like:
      i) Show all sub-categories of D (if relevant).
      ii) Show all sub-objects of D (this can be done in a variety of ways, similar to those used to present the classification DAG to begin with).
      iii) Accept full category (relevant only at the beginning).
      iv) display a path of the structure with OID names and NDUs of all descendants (or, just sub-categories, or indicate visually, through different colors for example, relative concentrations of the NDUs throughout the store).
      v) Done selecting.
    10c. Based on user's selections, collect all relevant OIDs. If the user selected a (sub) category, collect the OIDs of all leaf nodes in the descend from that (sub) category. This is done for each (sub) category chosen by the user, and the results are added to the OIDs of any single objects that the user choose (if any) to create what we call the Chosen Descendant NDU set of D.
    10d. Goto step 9.
11. Using the OID of D as a key, collect all NDUs found in the object.Location database that are linked to D. We will call this the NDU set of D. Goto step 9 (step 128).
12. We now create a set of NDU paths for the user. Each NDU path is a set of NDUs which covers the NDUs corresponding to desired objects, and has whatever additional NDUs may be needed to form a 'tour' as desired by the user. An NDU path is constructed by either (1) taking one item from the NDU set of a desired object D and adding it to the tour or (2) taking the entire Chosen Descendant NDU set for D and adding it to the tour. Each NDU path corresponds to visiting or locating one location for each object desired by the user (step 132).
13. For each NDU path Nt, we create one or more lodestar sets, by looking up each NDU in Nt in the structure.Layout database. In this way we will generate a Lodestar set for each NDU path Nt. One complication is the fact that there maybe more than one lodestar associated with each NDU. If the structure.Layout database contains timing or distance (or other) specific information and the user wishes so, such information can be the basis for eliminating some of the lodeststars associated with a single NDU. Otherwise, we retain the multiple lodestars and create a set of sets of lodestars from the NDU path, each set corresponding to one choice of lodestar for an NDU. Each lodestar set corresponds to a set of locations in the structure of interest. Each lodestar may also be labeled with any orienting information found in the associated entry in the structure.Layout database (step 134).
14. Output desired object list and all lodestar sets and exit (step 136).

In Example 13, we explain the functioning of the creating set of destinations algorithm, focusing on Steps 9 to 14.

EXAMPLE 13

Let {[971, 1111, 2412]} be the desired object list when we first arrive at step 9. We trace the further steps for each OID in the list

OID 971:

Step 9: No entry for the OID in the object.Location database.

Step 10: Suppose OID 971 had 3 (leaf) children in the classification database, yielding the OID set {917-a, 917-b, 917-c}.

These represent the OIDs for regular pasta, fresh pasta, and gourmet dry pasta. As it happens, the user does not wish to narrow the list now, but prefers to examine all on the shelf Step 11: From the object.Location database we find the Descendant NDU set to be:

{(Aisle 1, Last Third, Left facing exit, $3^{rd}$ Shelf), (Gourmet-Refrigerator1, $1^{st}$ Shelf), (Central Display Area, Facing Exit, Left Quadrant)}.

OID 1111:

Step 9: This is a leaf node.

Step 11: The NDU set is {(Aisle1, Second Third, Left facing exit, $3^{rd}$ Shelf), (Central Display Area, Facing Exit, Left Quadrant)}. Notice that this is a redundant set, in the sense that the same item appears twice in the store (perhaps once as a special display). Hence, we will send user to one or the other location.

OID 2412: Step 9: A leaf OID.

Step 11: The NDU set is {(Aisle3, First Third Left facing exit, $1^{st}$ Shelf)}.

We have exhausted the desired object list and can move to step 12.

In step 12, we order the NDUs found, and create two NDU paths, one for each of the 'redundant' NDUs generated by OID 1111. Each NDU path may give rise to one or more lodestar sets.

NDU path #1: {(Aisle1, Last Third, Left facing exit, $3^{rd}$ Shelf),
(Gourmet-Refrigerator1, 1st Shelf),
(Central Display Area, Facing Exit, Left Quadrant),
(Aisle3, First Third, Left facing exit, $1^{st}$ Shelf)}

NDU path #2: {(Aisle1, Last Third, Left facing exit, $3^{rd}$ Shelf),
(Gourmet-Refrigerator1, $1^{st}$ Shelf),
(Central Display Area, Facing Exit, Left Quadrant),
(Aisle1, Second Third, Left facing exit, $3^{rd}$ Shelf),
(Aisle3, First Third, Left facing exit, $1^{st}$ Shelf)}

In step 13, we collect the lodestars associated with each NDU in the structure.Layout database. In this example, we use lodestar names such as Aisle1, Aisle3, Fridge1 and CentralDisplayHanging which have an obvious meaning. Other lodestars such as Aisle1andAisle2Connector refer to the junction of the rear of Aisle1 and Aisle3 and which may be explicitly marked within the store. Each NDU may have one or more lodestars associated with it; in this example we show NDU (Central Display Area, Facing Exit, Left Quadrant) with two associated lodestars.

Suppose we have the following relationship between lodestars and NDUs.

| NDU | Lodestars |
| --- | --- |
| (Aisle1, Last Third, Left facing exit, $3^{rd}$ Shelf) | {Aisle1andAisle2Connector} |
| (Gourmet-Refrigerator1, $1^{st}$ Shelf) | {Fridge1} |
| (Aisle1, Second Third, Left facing exit, $3^{rd}$ Shelf) | {Aisle1} |
| (Central Display Area, Facing Exit, Left Quadrant) | {CentralDisplayHanging, ServiceDesk} |
| (Aisle3, First Third, Left facing exit, $1^{st}$ Shelf) | {Aisle3} |

In Step 13, we would obtain four lodestar sets, with two each derived from the NDU paths:

Lodestar Set #1: {Aisle1andAisle2Connector,Fridge1, ServiceDesk, Aisle3}

Lodestar Set #2: {Aisle1andAisle2Connector,Fridge1, CentralDisplayHanging,Aisle3}

Lodestar Set #3: {Aisle1andAisle2Connector,Fridge1, ServiceDesk, Aisle3, Aisle1}

Lodestar Set #4: {Aisle1andAisle2Connector,Fridge1, CentralDisplayHanging, Aisle3, Aisle1}

2.2 Creating Quick-Trip Tours of Structures

In this section we describe the datastructures and algorithms needed to create a personalized tour of a structure (Quick-Trip). This task devolves into two sub-tasks. The first is to compute (all) the possible (complete or partial) paths through the structure. This generally time consuming task can be done statically, and stored. This sub-task itself breaks into two cases, to accommodate large structures where even the pre-computation aspect may not be enough to save response time needed to search unwieldy tables on-line (the quadrants case). And even these sub-tasks must be further broken down to reflect structures having only 1 entrance, and 1 exit vs. structures with more than one entrance or more than one exit. The second sub-task is to map the user's actually desired lodestar set, DL, onto the 'shortest' path in the statically created tables. This of course can only be done in response to a user's specific request.

2.2.1 Creating Structure Paths

Below we describe algorithms to determine the 'best' way to traverse a structure while doing various tasks of interest. However, as we do not statically know what objects will be of interest, and we wish to take some advantage of pre-computation, we must essentially describe and store all possible ways of going through the structure. We also can choose to reject "inefficient" paths, such as those that contain unnecessary traversals or loops.

Generally, even a basic traversal involves two stages: 1) action/procurement/collection and 2) purchase/exit. This idea proves useful to get us started, but in the actual algorithm, we obtain a savings by combining these stages at the last minute. Note that even in the case of a store, while 'purchase' itself can be an on-going process via a portable bar code scanner loaned to the customer, leaving the store (exit) will always be a necessary task. And, for another example, while 'final purchase' may have no role in a airport navigation system, exit does.

2.2.1.1 Lodestar only structures

In a lodestar only structure, the lodestar set is enough to describe navigation quickly and accurately.

2.2.1.1.1 One entrance, One exit

The simplest kind of structure for which to design a tour solution is based on a structure with one entrance and one exit. Many stores are in fact designed in this manner. In this case, we always know where the customer starts and where they will end. Thus, in what follows, we develop a family of algorithms beginning with the simplest case of a single starting point, which generally corresponds to the entrance, and a single ending point, which corresponds to the exit area. We will then extend our algorithm to the more general case where there are multiple entrances and exits.

In the following algorithms, we will make frequent reference to the 'cost' of a path or refer to the 'shortest' path. In its simplest form, 'cost' just refers to the total number of steps in a path and the shortest path is one with the least number of such steps. With no significant change to our algorithm, cost of a path could also be interpreted in a variety of ways, such as, the total distance covered by a path, or access charges. Finally, as we will explain, in concluding this section, cost can also be interpreted as incorporating a temporal aspect: the path with least cost is one which takes least time to traverse. Any combination of the above also constitutes a reasonable notion of cost.

Basic All Path Algorithm

The Basic All Path Algorithm takes as input a Lodestar Adjacency Matrix M. Such matrices are well-known graph representations. We also have a start lodestar S and an exit lodestar E. The output of the algorithm is the All Path Table with four columns, shown below. Note that it is a simple matter to add a fifth column, for cost, weight, length, or another such attribute, and to accordingly expand the algorithm to account for this measure, in well known ways.

| Length of path | unique nodes in path | # of unique nodes in path | path |
| --- | --- | --- | --- |

The algorithm is in two parts: in the first, we enumerate all possible 'wanderings' through the structure and then conclude each such wandering into a complete tour by determining a path to the exit lodestar E. (Note that the algorithm used in the 'wandering' step is the one which will also be used to create the kind of partial paths need in the getting back on track and on-the-way features.) One complication in the algorithm is that we need to allow limited repeat node visits, which reflect that customers sometimes do have to go up and down an aisle/area. For example, some stores are specifically designed with a central area that is connected to everything else, and hence is easy to go through. Also, that is the way shopping trips naturally are. However, we can bound the number of times we repeatedly pass through a lodestar by the connectivity of the lodestar: if a lodestar L1 is directly connected to N other lodestars, we allow at most N entry (or exit) occurrences of L1 in any path. An entry occurrence of a lodestar L in a path is an occurrence of L as the initial lodestar in any edge in the path. The connectivity of a lodestar L can be easily determined via standard algorithms from the Lodestar Adjacency Matrix and is written Connectivity(L).

A further complication in the algorithm is that it is easy to generate very many essentially equivalent paths. In order to avoid doing so, we will check to see if paths are essentially equivalent and if so keep the shortest such path. Two paths P1 and P2 are essentially equivalent if (1) the first lodestar in each path is the same, (2) the last lodestar in each path is the same, and (3) the set of lodestars in each path is the same. If we restrict consideration to complete tours, in structures with only one entrance, (1) is constant. In structures with more than one entrance, or if partial tours are of interest, (1) will differ. FIGS. 6A through 6F are a flow chart 200 of a preferred method for a basic all paths process. This preferred method comprises the following steps:

Basic All Path Algorithm

1. Enumerate all 1 Step paths in a structure, beginning at the entrance S. Add all of these paths to the All Path Table and mark them as not visited (Step 202).

2. Let P={<S,L1>,<L2,L3>, . . . ,<Lk,Lk+1>} be a path in the All Path Table which is marked not visited (Step 204).

For every edge <Lk+1,Lk+2> in M, if the number of entry occurrences of Lk+2 in P is less than Connectivity(Lk+2), create a new path P' of the form {<S,L1>,<L2,L3>, . . . , <Lk,Lk+1>,<Lk+1,Lk+2>}(Steps 206, 208, 210, 211, 212, 213). Check if there is already an essentially equivalent path P'' in the All Path Table; if so, check to see which path is the shortest and replace P'' in the All Path Table by the shorter of the two paths. If there is no existing essentially equivalent path, then add P' to the All Path Table and mark it as not visited (Steps 214, 215, 216).

3. When all such edges are exhausted, mark P as visited and return to Step 2, provided another path P marked as not visited can still be found in the All Path Table (Step 218).

4. For each path P in the All Path Table, such that P does not end at the exit lodestar E (Step 220), we extend P to P' by adding the shortest path from the last lodestar in P to the exit lodestar E. We accomplish this by running the well-known shortest path algorithm [The Design and Analysis of Computer Algorithms, Aho, Hopcroft and Ullman, p.200]. We are interested in the path so computed from the final lodestar in P to the exit E (Step 222).

Check if there is already an essentially equivalent path P'' in the All Path Table(Step 224); if so, check to see which path is the shortest and replace P'' in the All Path Table by the shorter of the two paths P', P'' (Step 226). If there is no essentially equivalent path, then add P' to the All Path Table (Step 228).

EXAMPLE 14

Figure 7:
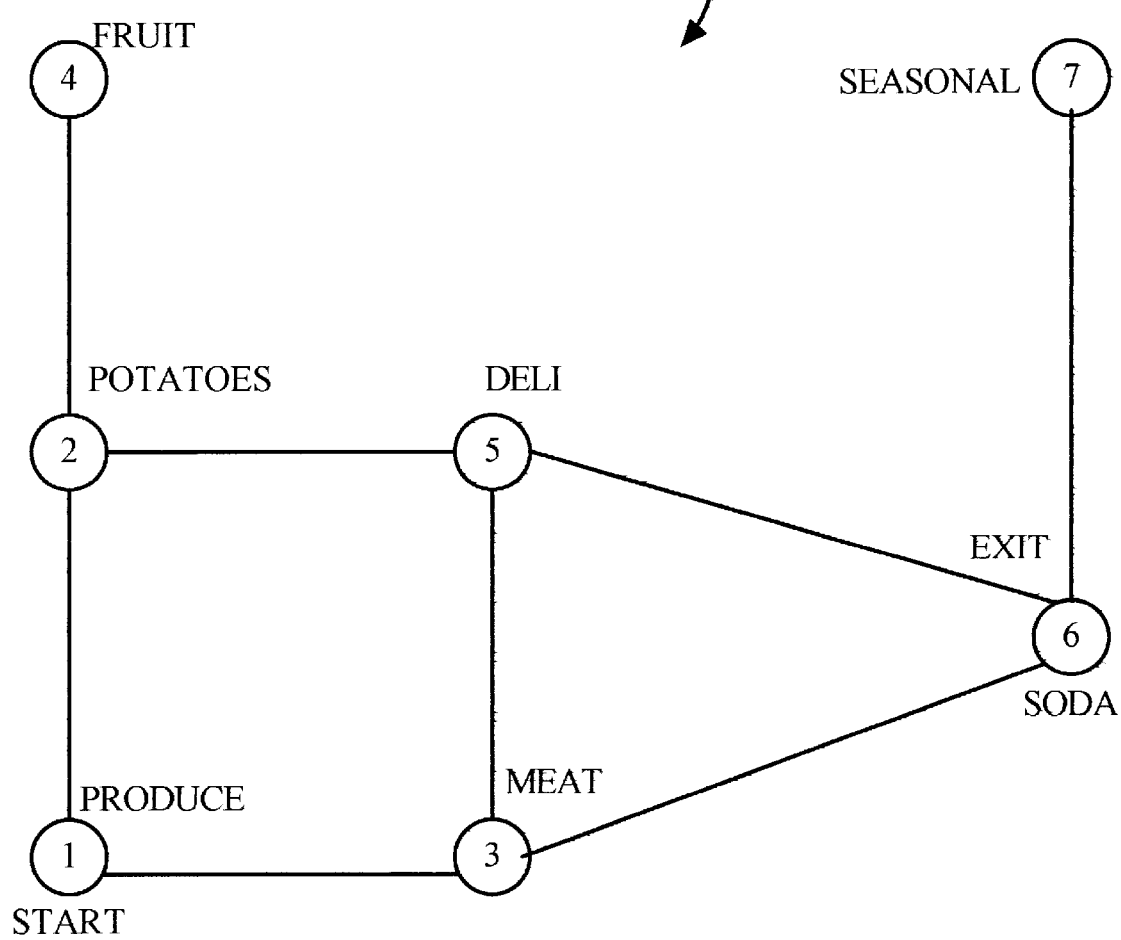
FIG. 7 is a diagram illustrating an a graphical view of a lodestar.Layout database for an example grocery store system according to the present invention.

FIG. 7 shows the layout of a structure 270 with seven lodestars. The Lodestar Adjacency Matrix M is:

0110000
1001000
1000110
0100100
0011010
0010101
0000010

The start lodestar is 1, the exit lodestar is 6. The Basic all path algorithm will report 16 paths through the structure (we omit the length and unique nodes fields):

| Path # | Path |
| --- | --- |
| 1 | 1 2 1 3 6 |
| 2 | 1 3 6 |
| 3 | 1 3 5 6 |
| 4 | 1 2 4 5 6 5 |
| 5 | 1 2 4 2 1 3 6 |
| 6 | 1 3 5 4 5 6 |
| 7 | 1 3 6 7 6 |
| 8 | 1 2 1 3 5 6 |
| 9 | 1 2 4 5 3 6 |
| 10 | 1 3 5 6 7 6 |
| 11 | 1 2 1 3 6 7 6 |
| 12 | 1 2 4 5 6 7 6 |
| 13 | 1 2 1 3 5 6 7 6 |
| 14 | 1 2 4 5 3 6 7 6 |
| 15 | 1 3 5 4 5 6 7 6 |
| 16 | 1 2 4 2 1 3 6 7 6 |

2.2.1.1.2 Multiple Entrance And Exit:

Many lodestar only structure could have multiple entrances and exits. A modified version of the above algorithm accounts for the most general possibility, that of the client/user coming in one entrance and leaving through a distinct exit. The main difference is that we need a set of sets of tables. For example, we need a set of tables for entrance A. Each tableshows the shortest paths, beginning at A, and ending at some specific exit. There is one such table for each exit in the structure. There is one such set for each structure entrance. A special sub-case of likely interest is entering and exiting via the same place. This reflects a common scenario of a person parking near a specific entrance and wanting to leave via that door.

Muliple Entrance And Exit Algorithm

Figure 8:
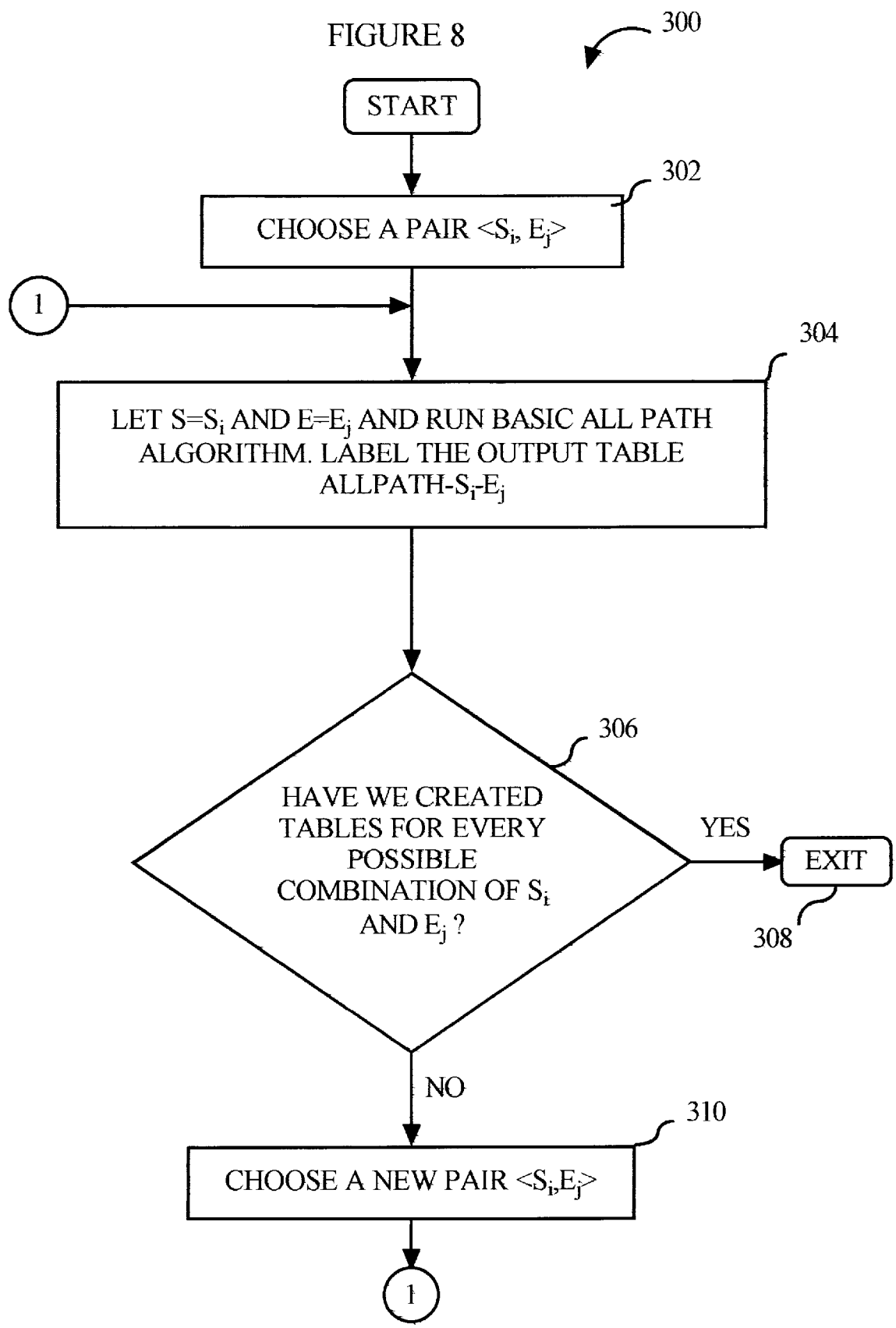
FIG. 8 is a flow chart of a multiple entrance and exit structure path, for lodestar only structures, process according to one embodiment of the present invention.

FIG. 8 is a flow chart of a preferred method 300 of multiple entrance and exit path creation for lodestar only structures. This preferred method comprises the following steps:

ALGORITHM INPUTS: Lodestar Adjacency matrix M, a set of starting lodestars S={S1, . . . ,Sn} and a set of exit lodestars E={E1, . . . ,En}.

ALGORITHM OUTPUTS: For each pair of start and exit lodestars <Si,Ej>, we generate an All Path Table, written allpath-Si-Ej.

ALGORITHM

1. For all pairs <Si,Ej> carry out the following steps (Step 302, 310).
2. Set the start and exit variables in the BASIC ALL PATH algorithm to Si and Ej respectively. Run the Basic all path algorithm using Si, Ej and M as inputs and create the All Path Table allpath-Si-Ej (Step 304).
3. If we have created tables allpath-Si-Ej for every possible combination of Si and Ej (Step 306), exit (Step 308).

Instead of running the Basic All Path Algorithm once, we run it |S|x|E| times. Each time we run it, we create another short paths tables, properly labeled by exact entrance and exit. Notice that based on the information generated by running this algorithm, we can (1) tell a user the best route that includes his desired lodestars given that he started at a specific point and needs to end at another specified point; (2) the best route if the ending is open; (3) the best route if the start is open, and (4) the best route if both start and end are open. Let DL=set of Desired Lodestars. For (1), we just need to lookup a single table allpath-Si-Ej and find the shortest route containing DL. For (2), an Si is given, and we list the best route from each table allpath-Si-Ek, for all possible endings Ek, and choose the best route from them, where each route contained DL. For (3), an Ej is given, and we list the best route from each table allpath-Si-Ej, for all possible starting lodestars Si, and choose the best route from them, where each route contained DL. For (4), we search all tables allpath-Si-Ej for all possible pairs <Si,Ej>, list the best route in each table and then choose the best routes from all of these routes, where each route contained DL. Regardless of how the final path choice is made, we refer to the chosen path as SHORT-PATH.

Further, as we noted above, this algorithm can be used to create the kind of partial paths needed in the getting back on track and on-the-way features. The difference between such a partial path and a complete path is that the former may start at any node, not necessarily an entrance, and may end at any node, not necessarily an exit. If partial paths are desired, both the starting and exits lodestar sets should be assigned, in turn, each node in the full set of nodes. The algorithm will then find all partial paths through the store. For convenience sake, it may be helpful to label the resultant tables partialpath-Si-Ej vs. allpath-Si-Ej.

2.2.2.1 The Quadrants Case

Many buildings or structures will have too many lodestars to make it tractable/useful to record and retrieve information on merely the lodestar level. Further, some buildings are organized in hierarchical ways, and it is efficient to mimic that hierarchy. For example, airports are divided into terminals, floors, wings, etc. Museums are divided into wings, floors, sections, etc. For this reason, we introduce the concept of a (virtual) quadrant grid, into which the lodestars of the structure can be divided. These are the principles which should guide this division:

1. Each lodestar should belong to one and only one quadrant. The quadrant to which lodestar L belongs is written QuadrantOf(L).
2. All lodestars within a quandrant should be easily navigable. That is, the task to get the customer to a specific lodestar once they are in a quadrant should be relatively easy.
3. The quadrants should cover the entire structure; i.e., every lodestar should belong to some quadrant.

We envision that most structures would have relatively few quadrants, under 50. This would result in very manageable data structures to traverse when the customer is in the structure. Notice that regularly laid out aisles, as in many large supermarkets, may be used to form a natural and obvious quadrant grid. A further advantage of this approach is that even in structures that change frequently, at any given time only a small number of quadrants are likely to be involved, and re-computation can thus be focused in these areas. In the absence of quadrants, the path tables for the entire structure may end up being recomputed for the sake of only one lodestar introduction or deletion, for example.

Further, the quadrant abstraction allows us to create a kind of 'hybrid' algorithm which will reduce both computation costs and on-line computation time. We can reduce table creation time by doing it in two steps—first, the coarse one of quadrants, then the finer one within a quadrant. Since these are essentially exponential operations, a 'divide and conquer' approach on the number of nodes can have a big payoff. This means we will first find a quadrant path, and then 'refine' that to a lodestar path. We can reduce table lookup time because the path tables have been kept small. Further, some parallel processing is possible, as we can retrieve lodestar information from all relevant quadrants in parallel once the quadrant path is found. Note too that the algorithms we give can easily be extended to arbitrary generalization layers if needed—for example, we can use the exact same technique if the structure is so large that quadrants have to be grouped into wings, etc.

The connectivity between quadrants is maintained the Quadrant Adjacency Matrix QM. Using QM and the Basic All Path Algorithm we pre-compute, in a bottom up fashion, all paths between quadrants, and also all paths within a quadrant. The second computation is carried out again using the Basic All Path Algorithm restricted to the lodestars occurring in the quadrant. This yields all paths within a quadrant. Both of the first two steps can be done statically. The final step, carried out only when a set of desired lodestars has been derived by interaction with a user, involves 'stitching together' the lodestar paths within the quadrants as needed to cover the lodestar set and reporting an optimal such path. This step is the dynamic one.

Hence, we now have two sets of all paths: between quadrants, and within quadrants. The lodestar paths within a quadrant must be pre-computed with respect to all the possible different starting and ending points within the quadrant. For example, there may be a number of lodestar edges between two quadrants, so we have to create a number of lodestar paths to reflect this multiplicity. Further, there are a number of ways to 'go through' a quadrant. For example, if a quadrant Q is connected to two other quadrants, Q1 and Q2, we will compute all paths through Q starting at its Q1 border and ending with its Q2 border, starting with its Q1 border and ending with its Q1 border, and similarly for starting at Q2 border. This leads to a set of parameterized all paths tables per quadrant. Then, for example, if our quadrant path is Q3-Q5-Q7 we will use the Q5 tables, which show the lodestars that start in Q3 and end in Q7. This is essentially what we were doing in the multiple entrance and exit case, except that we have to do it for each quadrant, instead of once per the entire structure.

2.2.2.1 Notation And Data Structures Needed For Generating A Quadrant Tour

It is convenient to maintain a set of Boundary Edge Sets to describe the lodestars that connect the quadrants. If quadrant Q1 connects to three other quadrants Q5, Q9 and Q10, there will be three sets of boundary edge sets for that quadrant, written Q1-Q5, Q1-Q9 and Q1-Q10. These boundary edge sets help us determine quickly which lodestars serve as entrances/exits to the quandrant provided we know the origin or destination quadrant. The exact role depends only on whether you are already in the quadrant, in which case it is an exit, or you are going to the quadrant, in which case it is an entrance. Notice that these sets are generally symmetric: Q1-Q5 is the same as Q5-Q1.

Boundary Edge Sets are written <Qj-Qi> where Qj, Qi are adjacent quadrants, and consist of all edges <L1, L2> in M, where QuadrantOf(L1)=Qj and QuadrantOf(L2)=Qi.

We will also need tocreate and use the Quadrant All Path Tables written

QuadrantAllPath-Qi-Qj, where Qi is the quadrant with a starting lodestar and Qj is the quadrant with the ending lodestar. QuadrantAllPath-Qi-Qj lists all the routes, in terms of quadrants, between quadrants beginning at Qi and ending at Qj. Computation of this table is a straightforward application of Basic All Path and Multiple Entrance And Exit algorithms using the Quadrant Adjacency Matrix, entrance quadrant(s), and exit quadrant(s) as input. Since we use the Quadrant Adjacency Matrix, the result is a path in terms of quadrants (not lodestars) as desired. If an entrance or exit naturally falls within a quadrant we consider it a starting or exit quadrant, respectively. Sometimes, it is necessary to consider entrances or exits themselves as independent quadrants (for example, where an entrance leads immediately to many quadrants). We can handle these cases by adding an additional quadrant with a single lodestar (representing the entrance or exit) to the Lodestar and Quadrant Adjacency Matrix.

2.2.2.2 Quadrant All Path Table Algorithms

These tables are used to determine how to get from one quadrant to another in the structure. In a sense, each quadrant is acting as an equivalence class for all the lodestars within it. As in the lodestar only structure, there are two cases: Single entrance and exit, and Multiple entrance and exit. Both cases are relatively easy to describe in terms of the lodestar only structure algorithms, which have been discussed above. Note that in the quadrant case, the use of a cost or weight column may be considered very important, as the characteristics of quadrants are likely to be quite different, and this column can reflect that quickly.

Single Entrance And Exit

Use Basic All Path Algorithm, using as input Quadrant Matrix, Qenter, and Qexit. The resultant table is called QuadrantAllPath-Qenter-Qexit and lists all the routes, in terms of quadrants, which start at Qenter and end at Qexit.

Multiple Entrance And Exit

Use Multiple Entrance and Exit algorithm, using as input Quadrant Matrix and a set of starting quadrants and a set of ending quadrants. A set of QuadrantAllPath-Qenter-Qexit tables will be produced, where the Qenter will take on all starting quadrant names and the Qexit will take on all ending quadrant names. Note that the difference between the basic and the multiple case is exactly parallel for quadrant paths and for lodestar paths (above).

2.2.2.3 All Path Table Within Quadrants Table Algorithms

Once we know the 'coarse' information of which quadrants, and in which order, we need to traverse to move through the structure, we need the 'fine' information of exactly how to move, in terms of the identifiable lodestars in the structure, through each quadrant in the coarse path. Thus, the final set of tables we require are all lodestar paths within a quadrant. Generally, there will be both multiple way to enter a quadrant as well as multiple ways to leave it. Thus, once again, the resultant tables will be parameterized by entrance and exit points. The All Path Table Within Quadrants is written Qk: Lp-Lm meaning that we enter quadrant Qk from lodestar Lp and exit through lodestar Lm.

We can compute Qk: Lp-Lm by the straightforward use of the Basic All Path and Multiple Entrance And Exit algorithms. We restrict the input lodestars to those of the Lodestar Adjacency Matrix that belong to Qk. We will need to compute one table Qk: Lp-Lm for all lodestars pairs <Lp,Lm> where both Lp and Lm belong to Qk and each also belongs to some edge in boundary edge set Qk-Qj or Qj-Qk for any Qj. For the special case of our added start and exit quadrants, we treat the start and exit lodestars as though they were connected by an edge to some other quadrant. For example, if Q1 is a starting quadrant and L1 and L2 are starting lodestars and Q1 connects to Q2 and Q3 via lodestars L10 and L11, then we will compute all path tables Q1: L1-L10, Q1: L1-L11, Q1: L2-L10, Q1: L2-L11.

All Path Table Within Quadrants Algorithm

Figure 9:
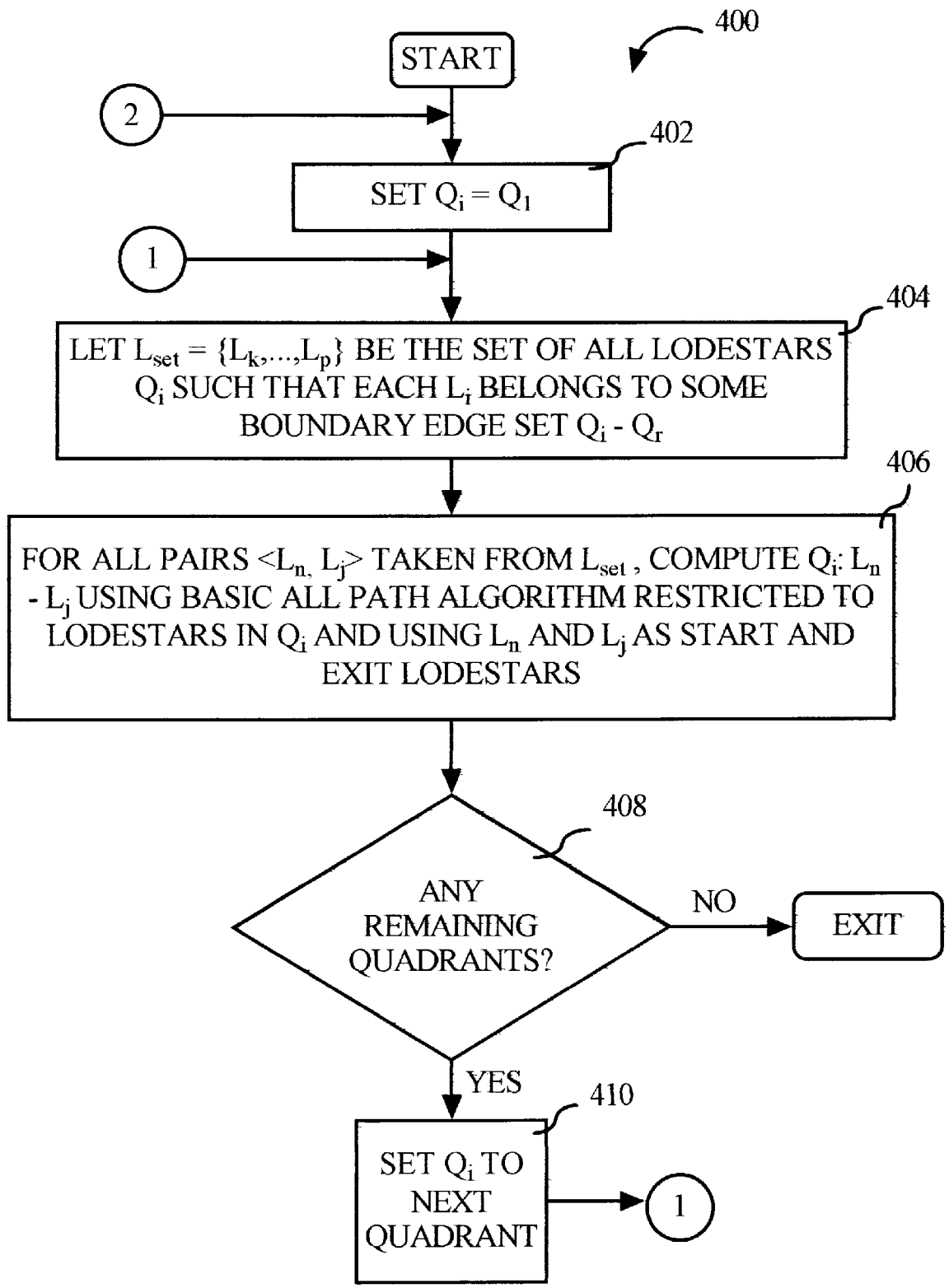
FIG. 9 is a flow chart of an all path table within quadrant process according to one embodiment of the present invention.

FIG. 9 is a flow chart 400 of a preferred method of a finding all path tables within a quadrant process. This preferred method comprises the following steps:

1. For all quadrants Qi carry out the following steps (Steps 402, 410).
2. Let Lset={Lk, . . . ,Lp} be the set of all lodestars within Qi such that each element of Lset belongs to some boundary edge set Qi-Qr or Qr-Qi (for some Qr) (Step 404).
3. For all pairs <Lh, Lj> where Lh and Lj are taken from Lset, compute Qi: Lh-Lj by the use of the Basic All Path algorithm restricted to lodestars occurring in Qi and using Lh and Lj as entrance and exit respectively (Step 406).
4. If there no more quadrants to consider, then we are done and we exit.

This completes the discussion of the static structures used to construct a tour of a structure, museum, airport or mall. The algorithms that construct a specific tour in response to a specific user request are described below.

2.3 Constructing A User's Traversal For A Given Lodestar Set

As above, we devolve into a lodestar only structure case and a quadrant case. We discuss the former first, as there we need only to look up the appropriate table of all paths through the structure. However, should an item have a couple of NDUs associated with it, for example, if it is stocked in more than one area, there probably is more than one associated NDU path. In such a case, we can choose the one desired by the user, or one based on other desirable criteria.

The algorithms given below can be used to accomplish this goal. One way to do this is to create a multiplicity of sets of desired lodestars, so that each possible different combination of lodestars that correspond to the desired items is realized. The cost of each (distinct) set can be looked up, and one of the shorter ones chosen. In the quadrant case, it may prove more efficient to convert each distinct set to its corresponding quadrant path, and chose the 'cheapest' quadrant path.

One further detail, in either case, is that a desired lodestar may occur more than once in a tour. For example, done particularly the lodestar may be very centrally located and hence makes for shorter trips. In such a case, we may wish lodestar to determine on which occurrence to do the activity or acquire the items associated with the lodestar. To determine this, we will also describe, below, a Determine-Ordering algorithm.

2.3.1 Lodestar Only Structure Algorithm
2.3.1.1 Single Entrance and Exit

This is the case to use either if there is a single entrance and exit or if, in a multi-entrance case, the entrance and exit are pre-determined and hence known. It is worth noting that this may be true fairly often, as users tend to use the airport entrance nearest to their terminal, and so on.

Figure 10A:
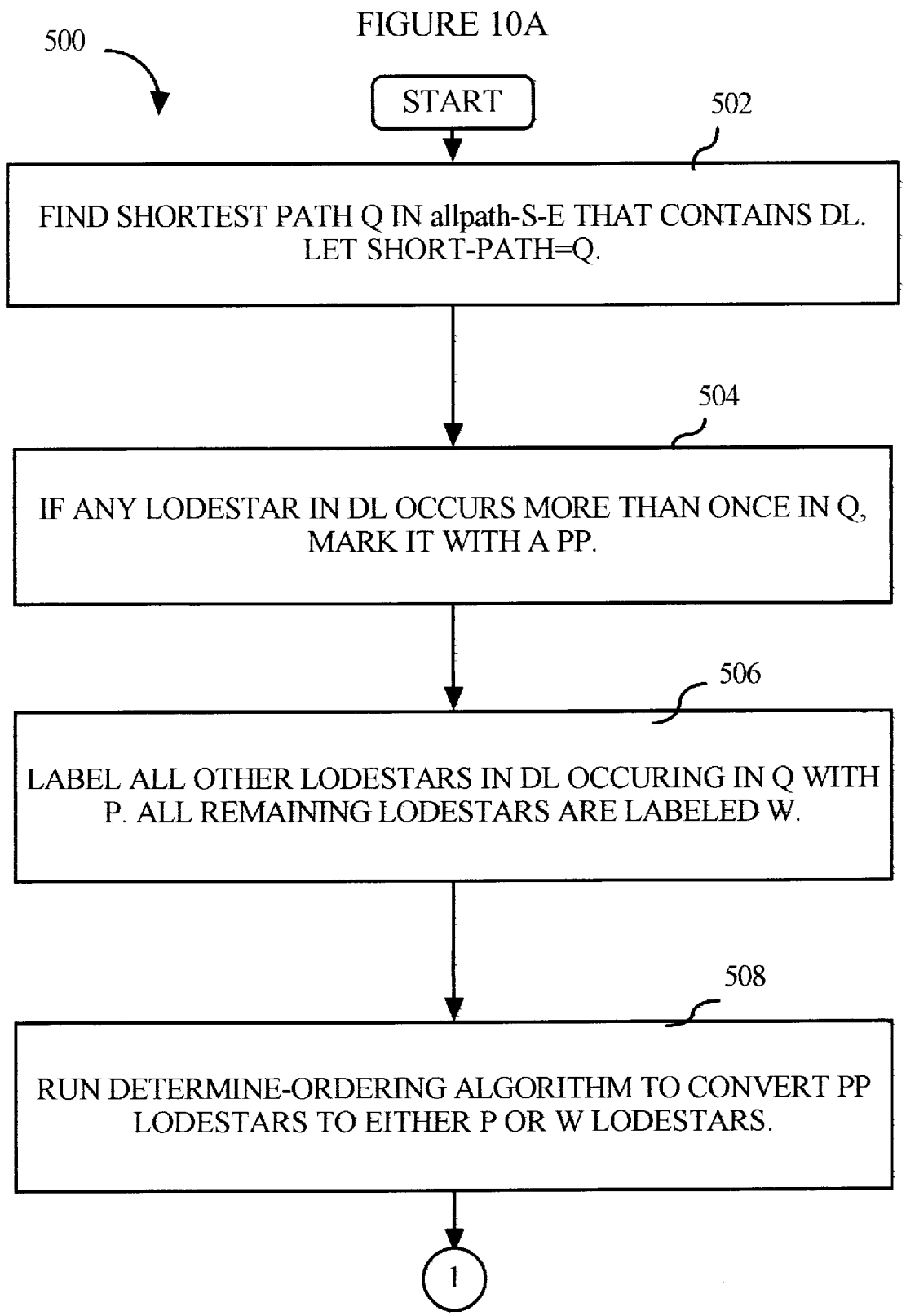
FIGS. 10A and 10B are a flow chart of a constructing a user traversal of lodestar only structure for a given lodestar set process according to one embodiment of the present invention.
Figure 10B:
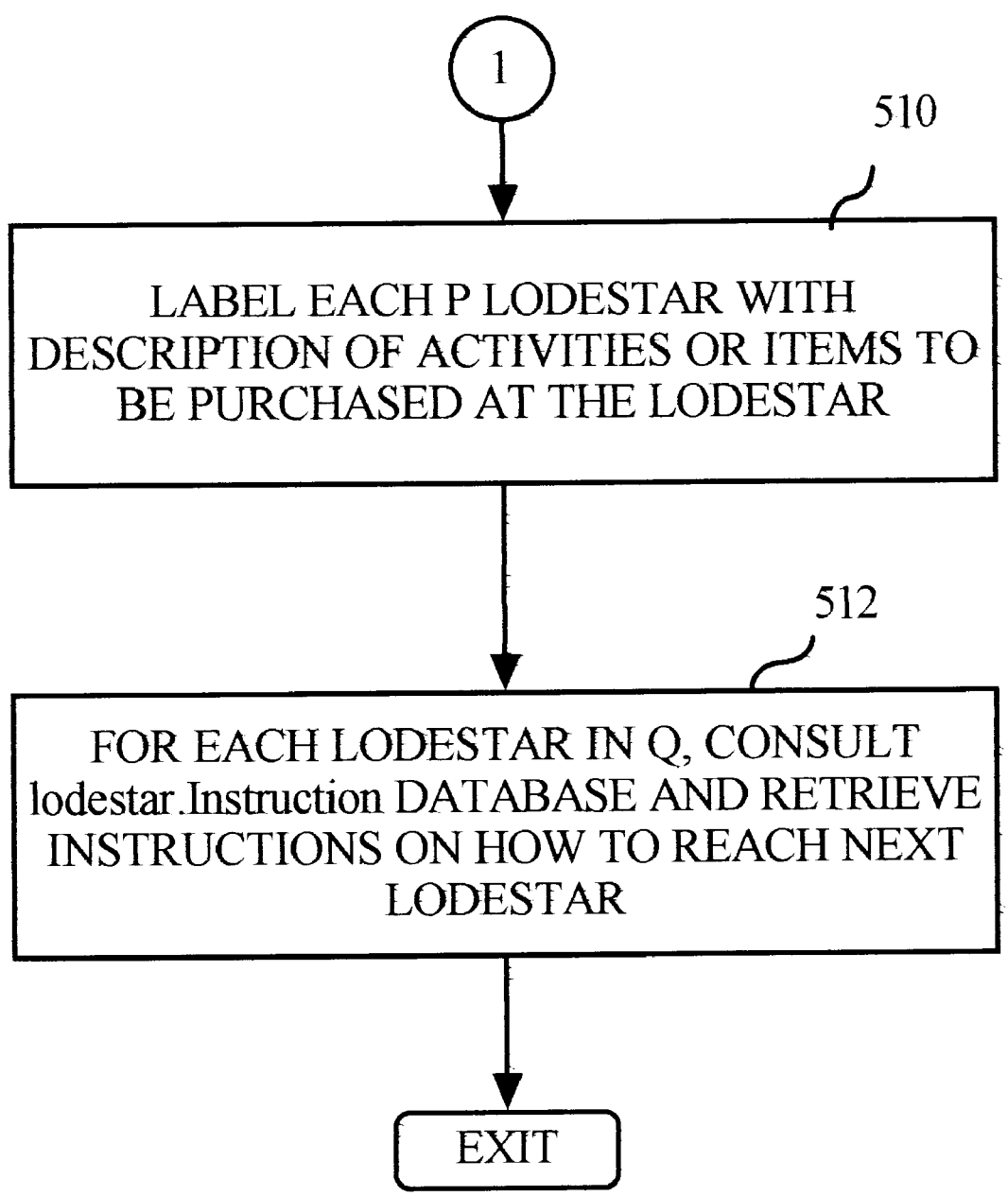

FIGS. 10A and 10B are a flow chart 500 of a preferred method of a constructing traversal for a given lodestar set for a lodestar only structure process. This preferred method comprises the following steps:

INPUT:
Desired set of lodestars DL (optionally including reason and/or object why they are desired), starting and ending lodestars S and E.

OUTPUT:
Tour of the structure from the start S to the end lodestar E. Each lodestar is labeled either with a P (for Purpose/Purchase) or W (for Walkthrough). Each P lodestar is also labeled with a description of the specific purpose of the stop, such as the desired activity or the set of items to be purchased at the lodestar. With each lodestar we also, if desired, specify instructions on how to reach the next lodestar.

ALGORITHM

1. Find shortest path Q in allpath-S-E that contains DL, called SHORT-PATH (Step 502).
2. If any lodestar in DL occurs more than once in Q, mark it with a PP (Step 504).
3. Label all other lodestars in DL occurring in Q as P lodestars. All lodestars in Q that do not occur in DL are labeled with W (Step 506).
4. Run determine-ordering algorithm to convert PP lodestars to either P lodestars or W lodestars (Step 508).
5. Label each P lodestar with description of activities or items to be purchased at the lodestar (Step 510).
6. For each lodestar in the path Q, consult lodestar.Instruction Database and retrieve instructions on how to reach next lodestar (Steps 512).

2.3.1.2 Multiple Entrance and Exit

The multiple case is again simply a matter of running the single case multiple times, resetting S and E appropriately. If S is known, and E is open, set E to each of the possible exits in turn, and run the algorithm each time. If E is known and S isn't, set S to each possible entrance and run the algorithm each time. If neither S nor E is known, set both to each possible one, and run the algorithm with each possible pair.

2.3.2 Algorithm For Facility With Quadrants

First, we must find the shortest quadrant path. This is relatively easy. Then we must find the shortest corresponding lodestar path. Once again, we break into the cases of knowing the start and exit, vs. having a choice on these points.

2.3.2.1 Single entrance and exit

Figure 12A:
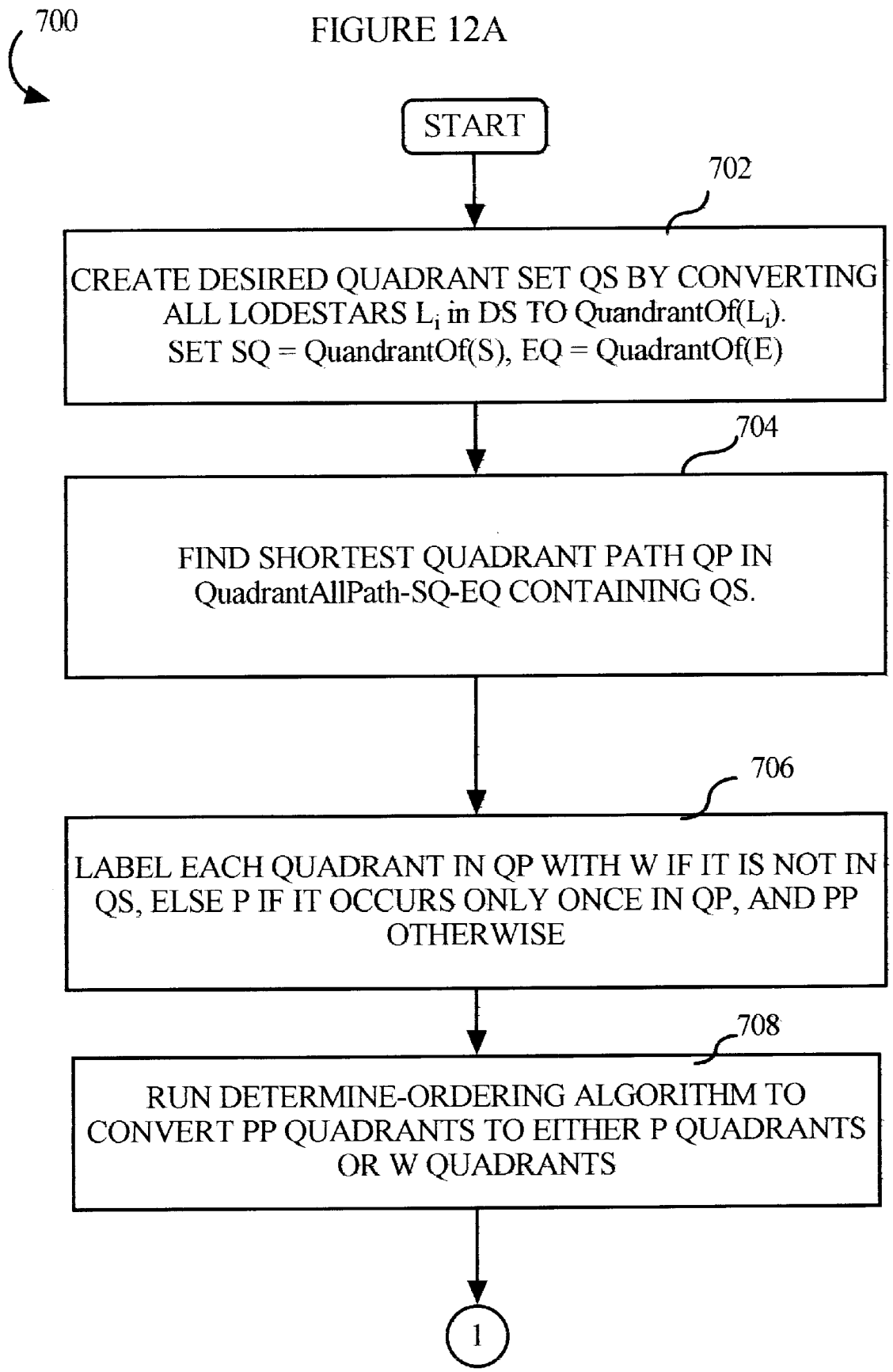
FIGS. 12A and 12B are a flow chart of a find shortest quadrant path process according to one embodiment of the present invention.
Figure 12B:
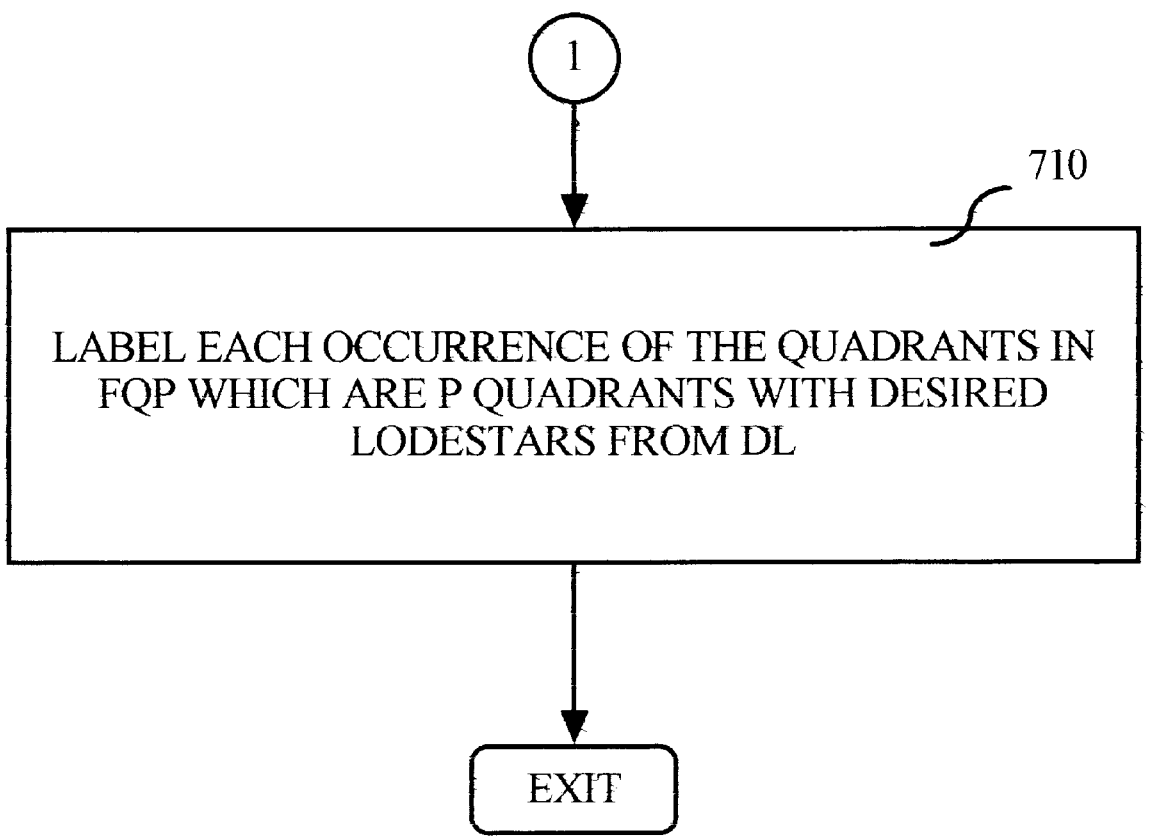
Figure 13A:
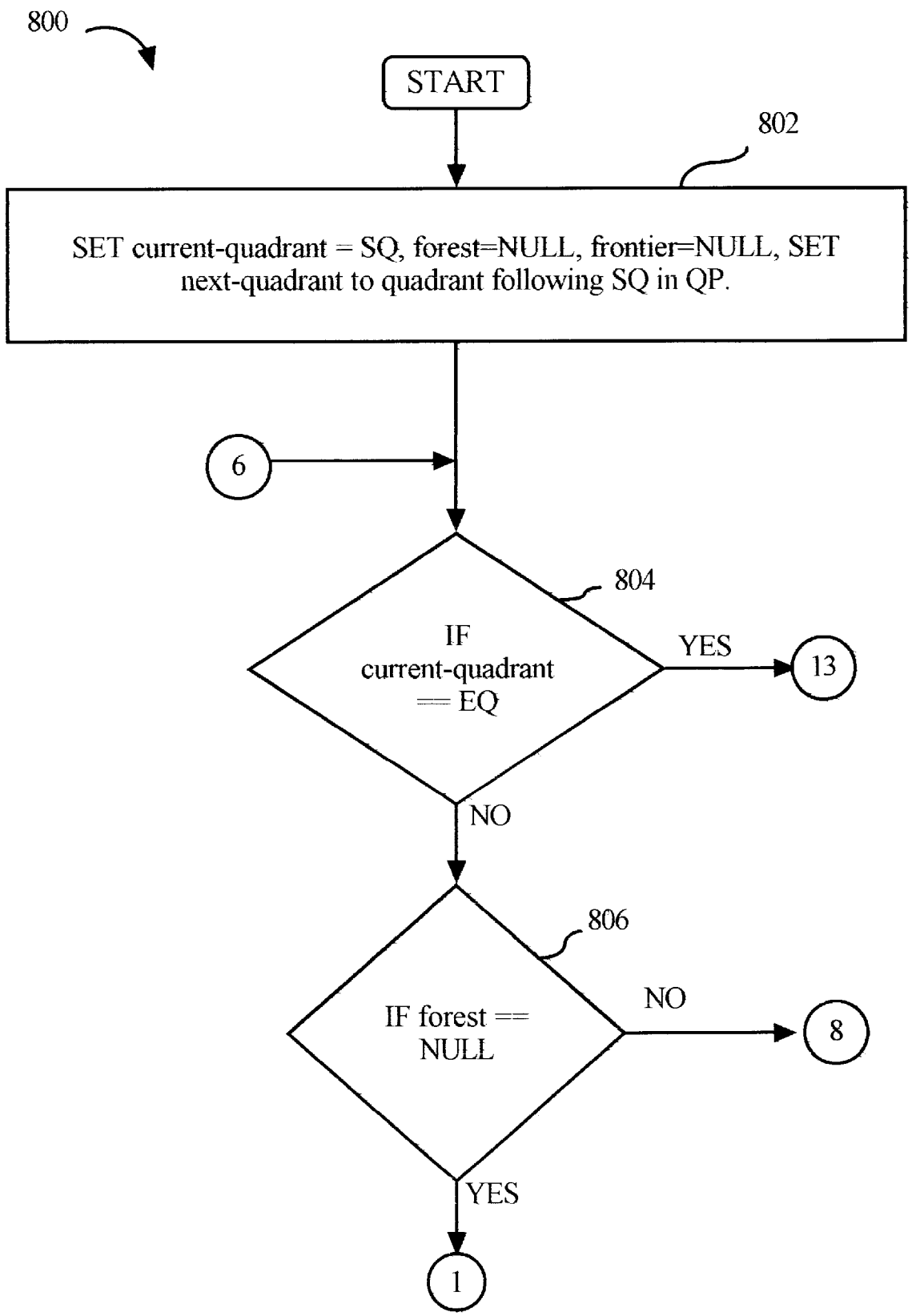
Figure 13B:
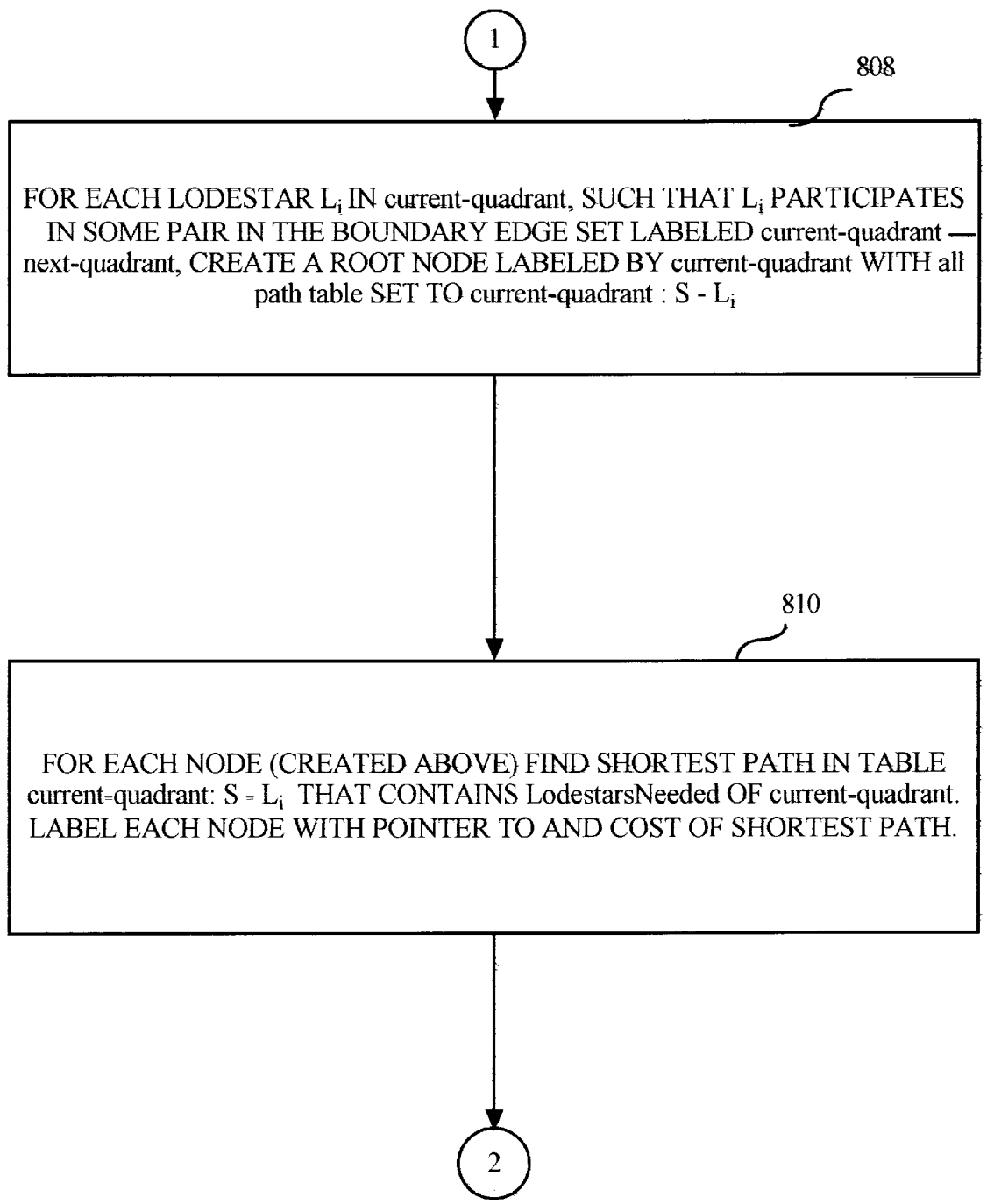
Figure 13C:
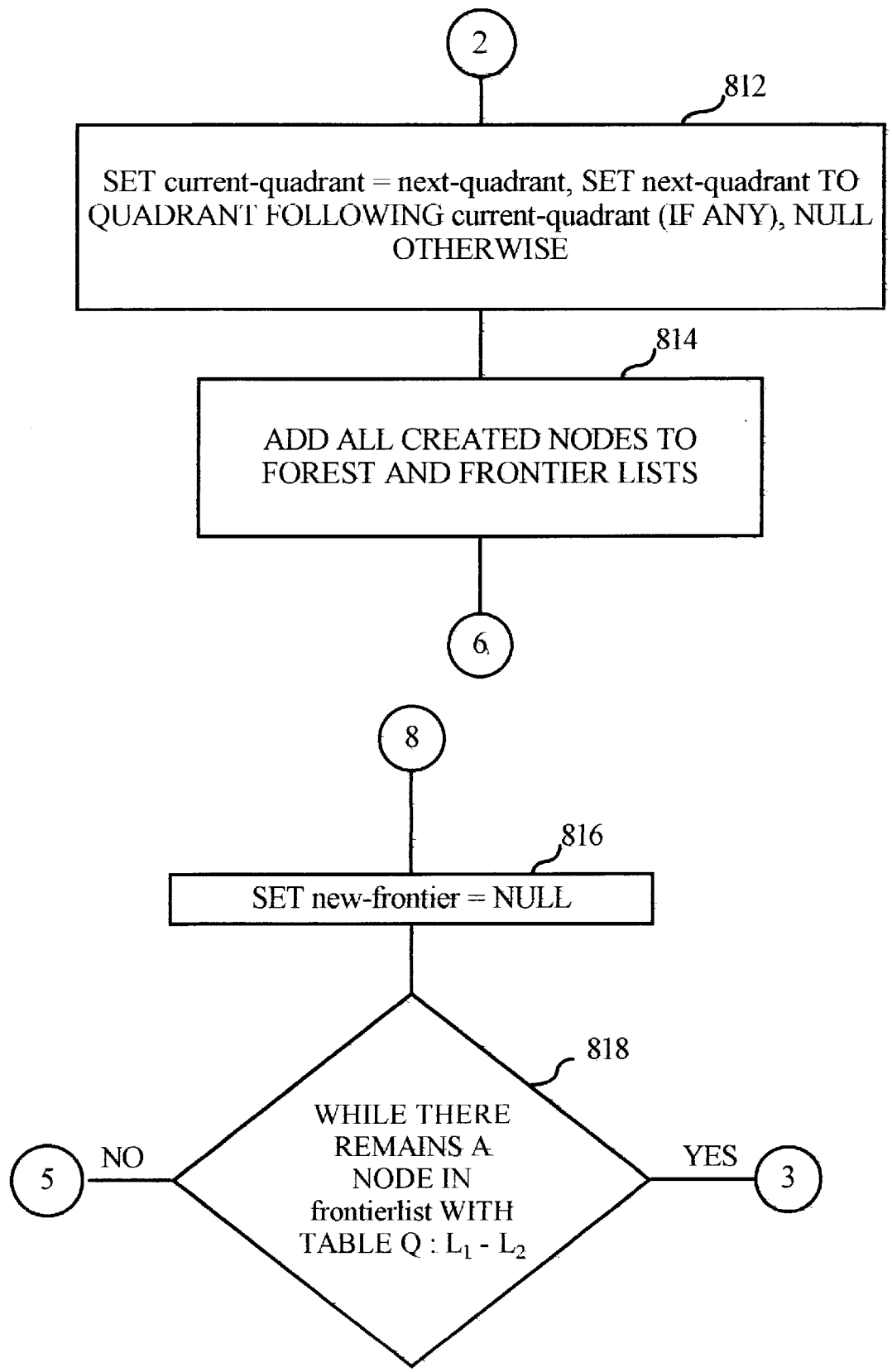
Figure 13D:
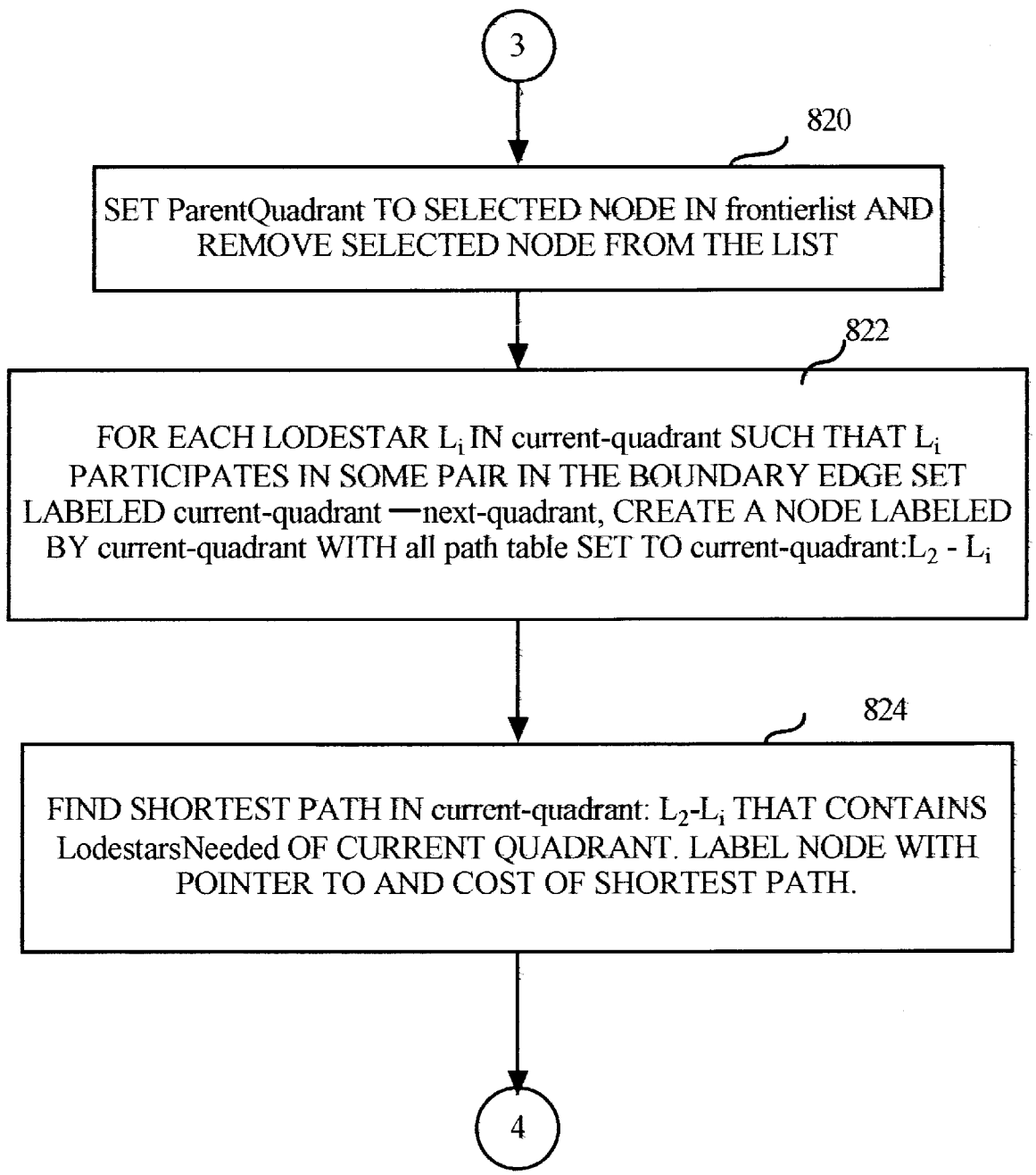
Figure 13E:
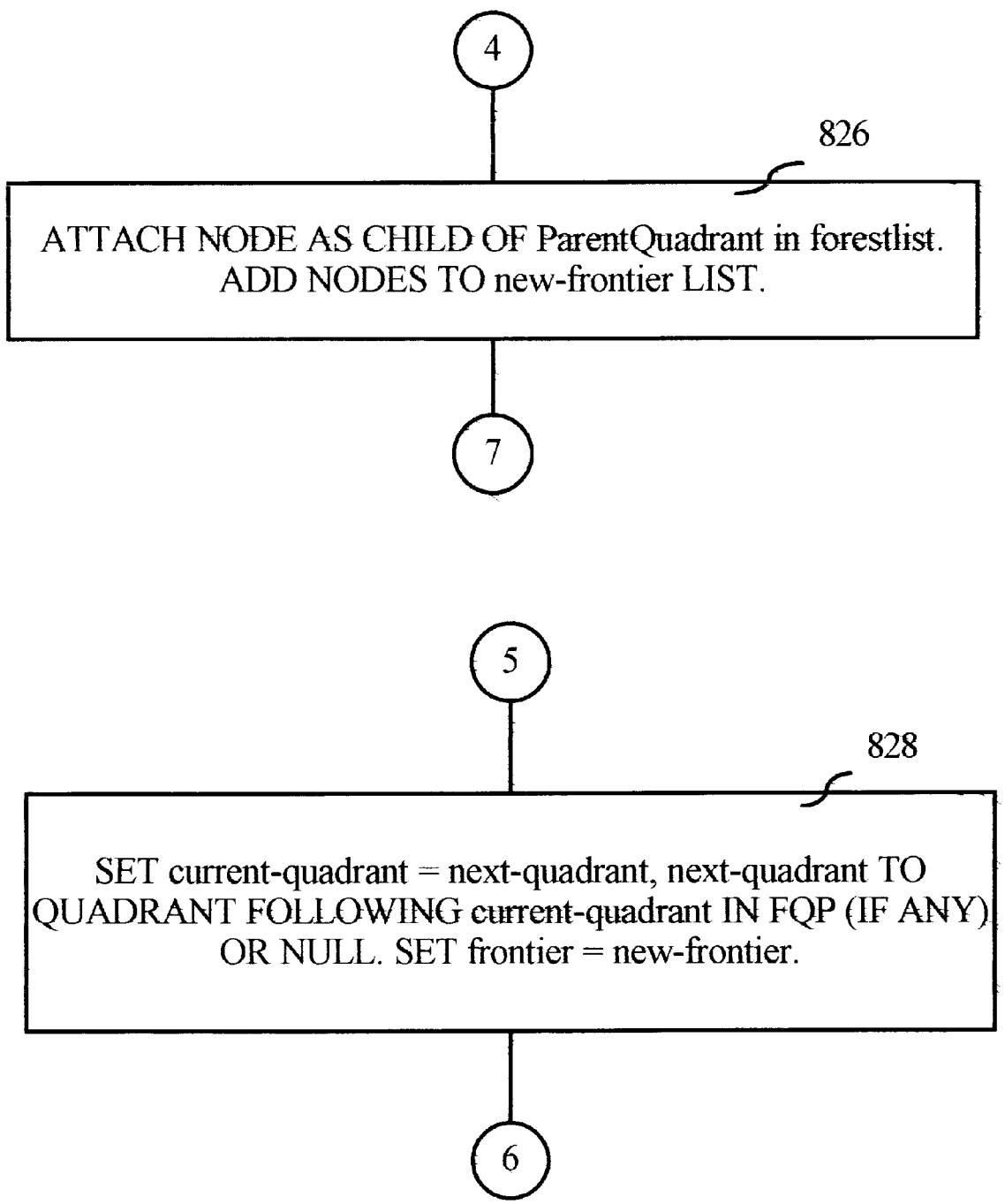
Figure 13F:
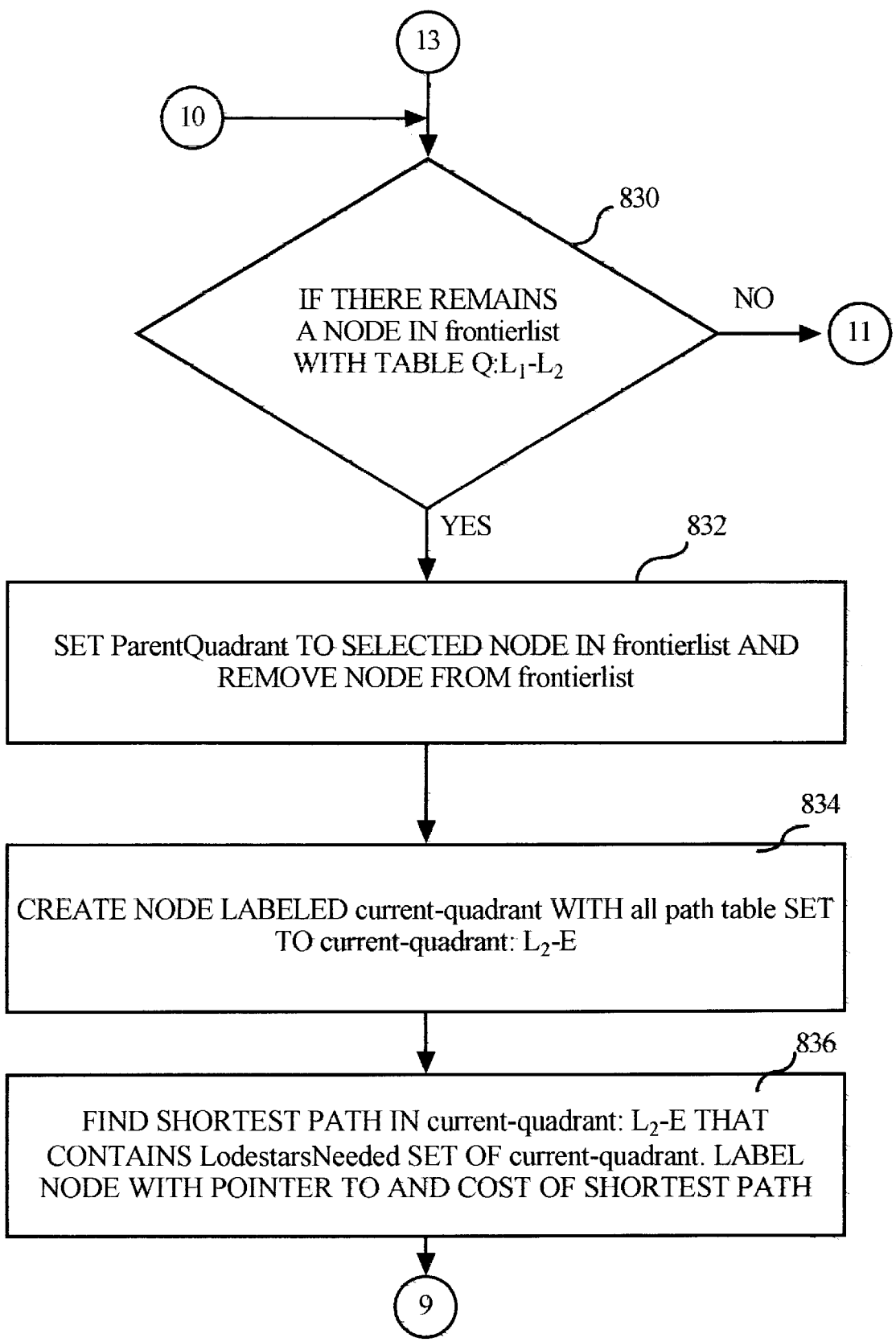
Figure 13H:
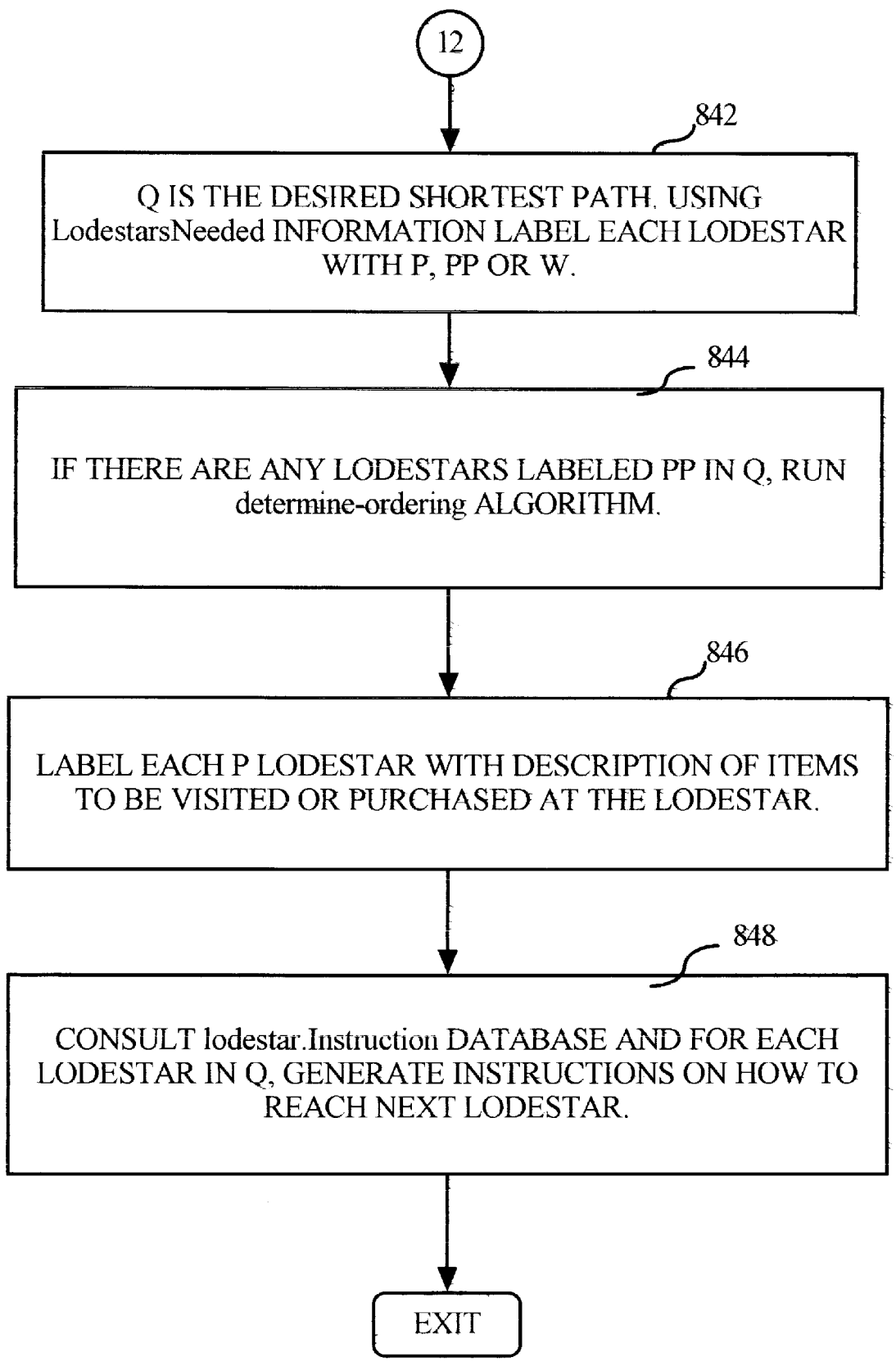
Figure 14B:
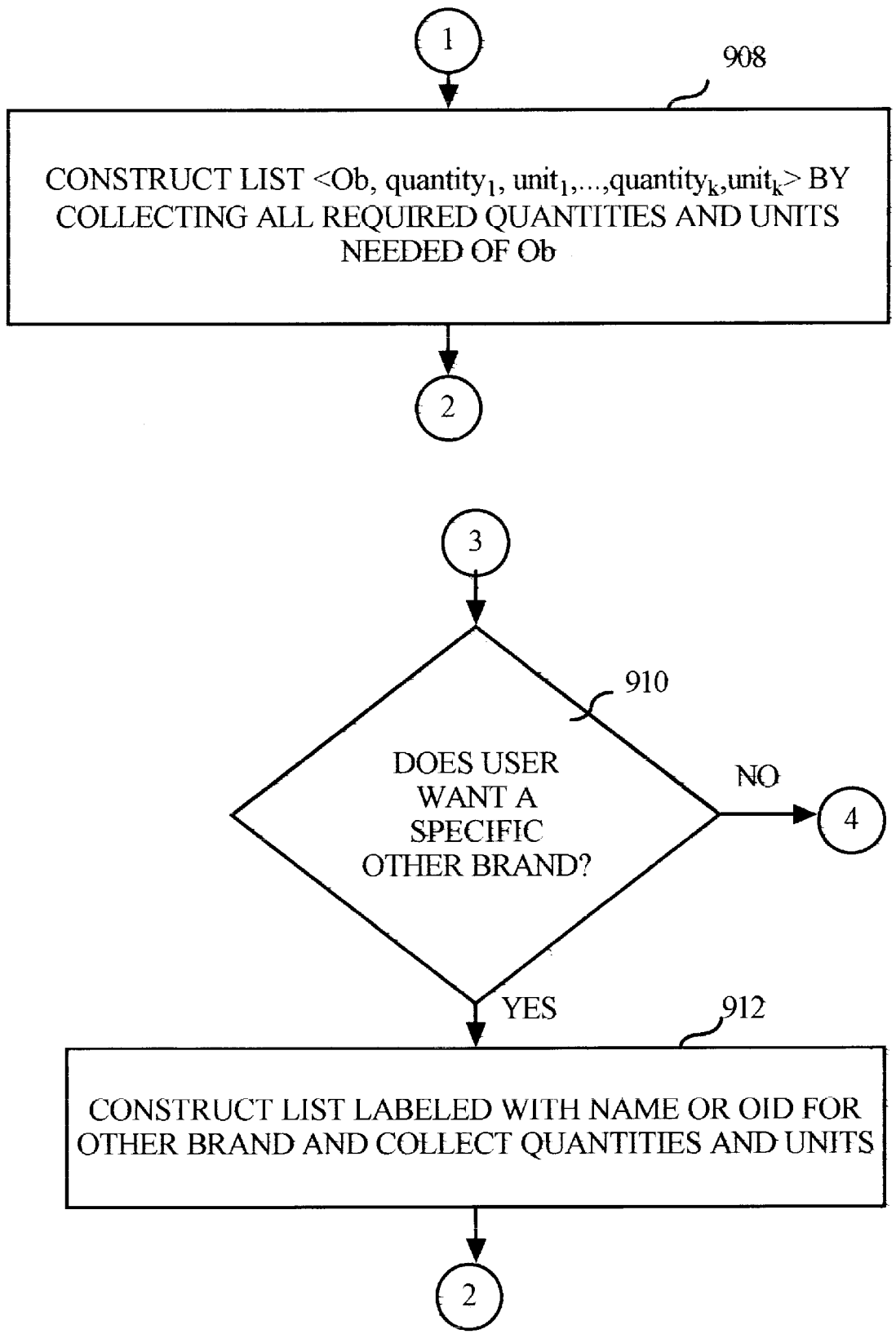
Figure 14D:
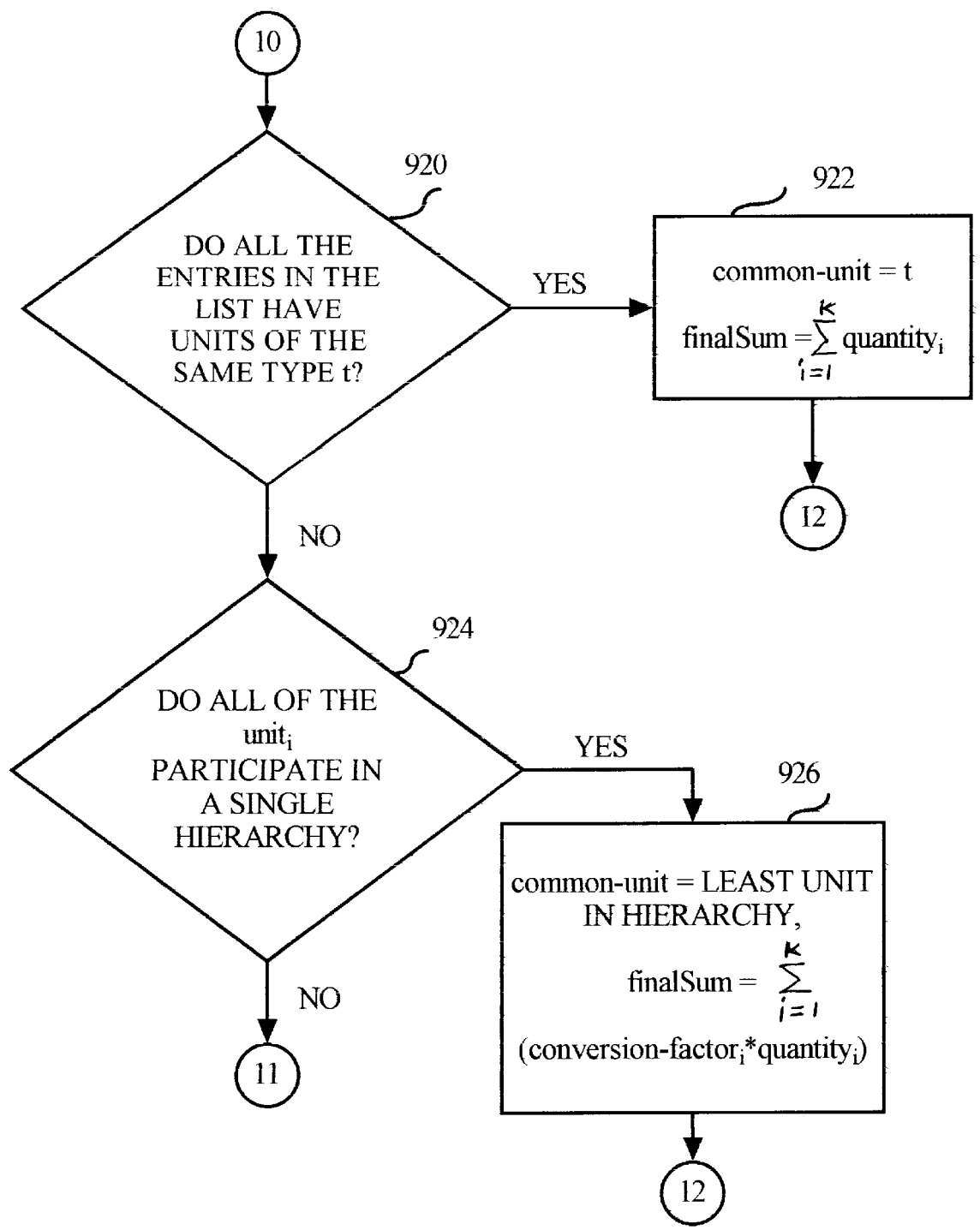
Figure 14E:
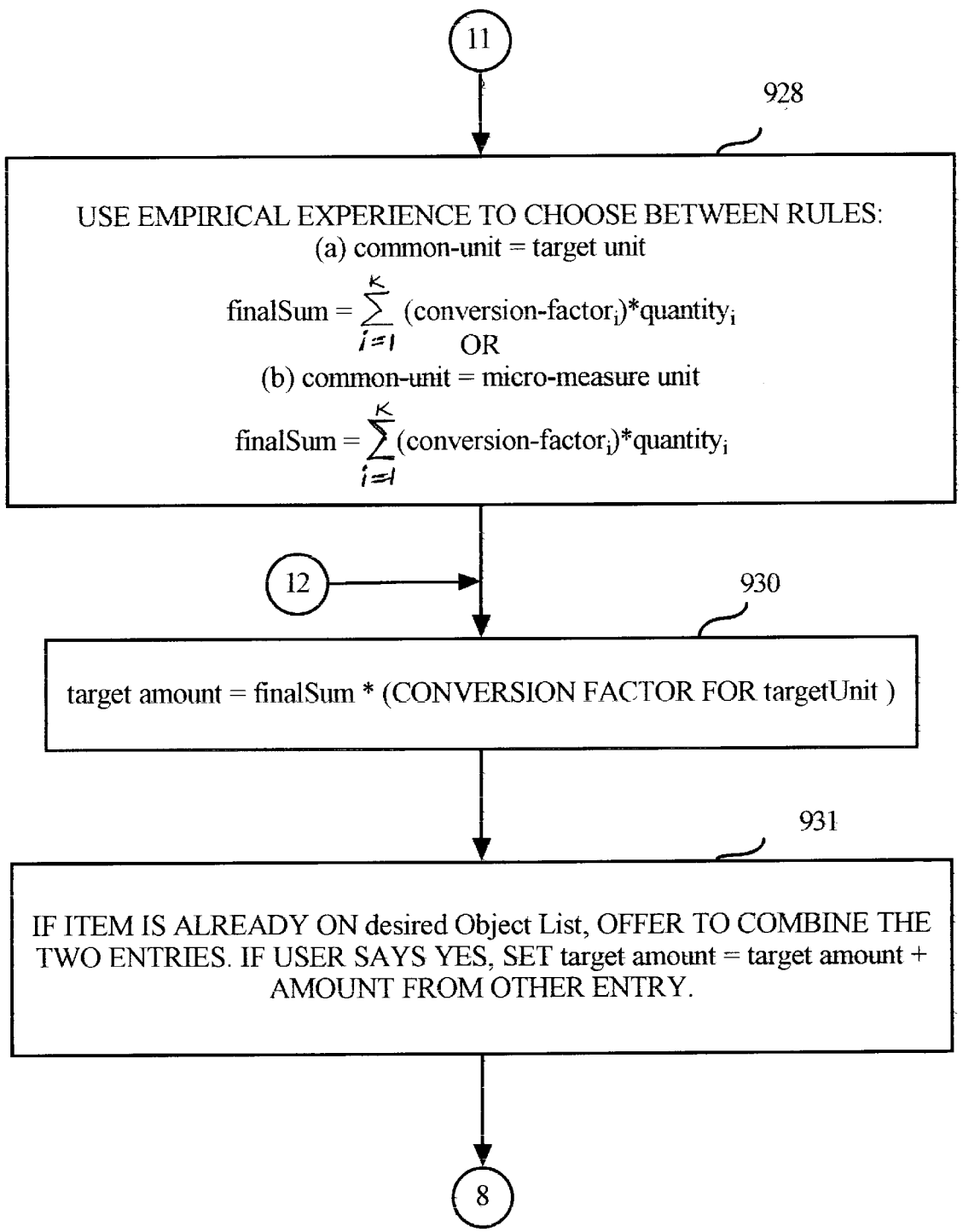
Figure 14F:
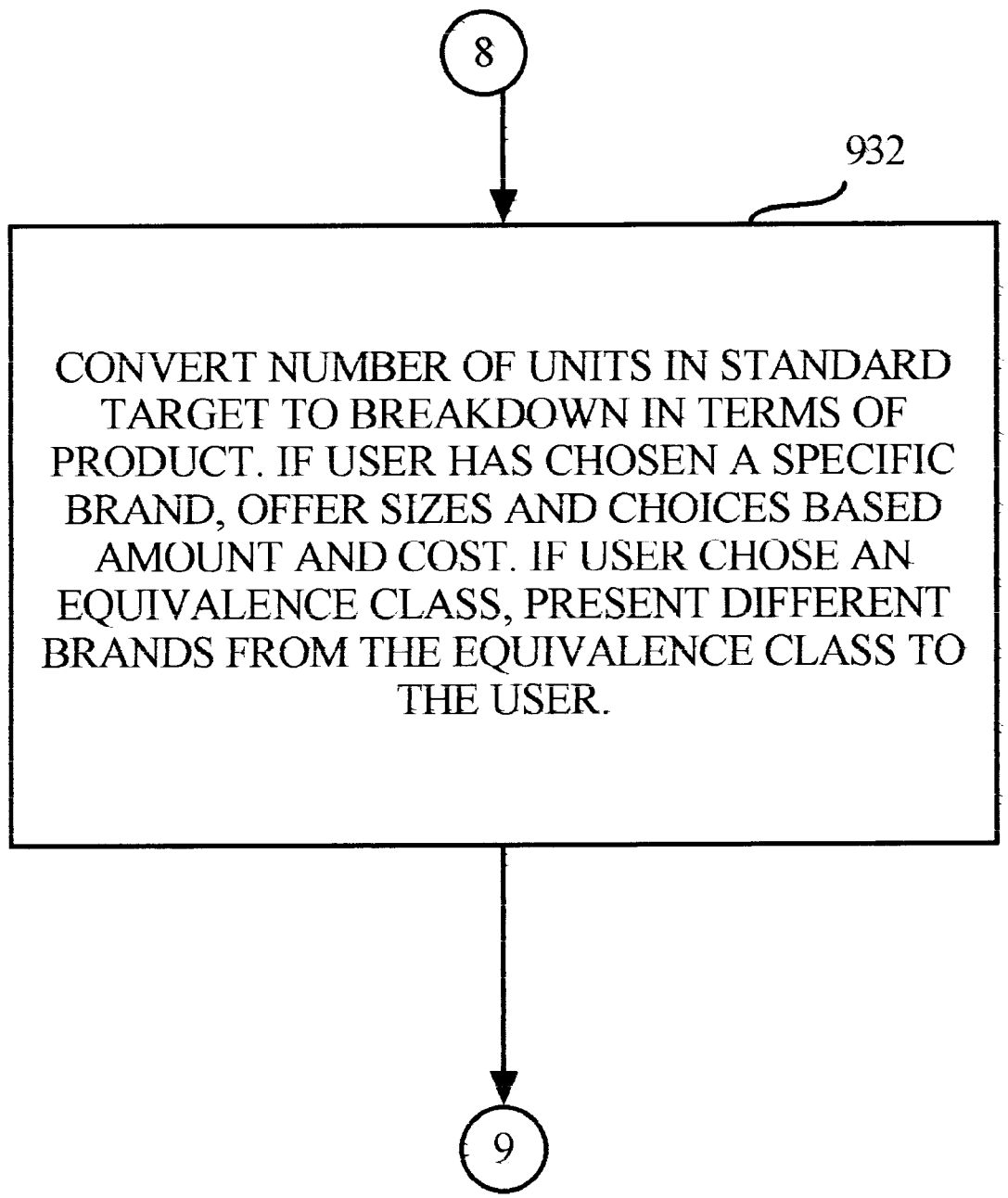

FIGS. 12A and 12B are a flow chart 700 of a preferred method of a finding the shortest quadrant path process. This preferred method comprises the following steps:

Input:
DL set, Start Lodestar S, End Lodestar E, Quadrant All Path Tables

Output:
A shortest quadrant path from start to end and covering the quadrants involved in DL set. Each quadrant will be marked with a P or a W, and will show the specific relevant lodestars. We call this the final quadrant path, FQP.

1. Create a desired quadrant set QS by converting all lodestars Li in DL to QuadrantOf(Li). Set Start and Exit quadrants to SQ=QuadrantOf(S) and EQ=QuadrantOf(E) respectively(Step 702).
2. Find shortest quadrant path QP in QuadrantAllPath-SQ-EQ that contains QS. This path constitutes the FQP. Each quadrant Qi in QP should be labeled W if it is not also in QS, otherwise P if it occurs only once in QP and PP otherwise (Steps 704, 706).
3. Run determine-ordering algorithm to convert PP quadrants to either P quadrants or W quadrants (Step 708).
4. Label each occurrence of the quadrants in FQP with desired lodestars from DL. We will refer to this set as the LodestarsNeeded set of this quadrant (Step 710).

2.3.2.2 Multiple Entrance and Exit

The multiple case is again simply a matter of running the single case multiple times, resetting S and E appropriately. If S is known, and E is open, set E to each of the possible exits in turn, and run the algorithm each time. If E is known and S isn't, set S to each possible entrance and run the algorithm each time. If neither S nor E is known, set both to each possible one, and run the algorithm with each possible pair.

FIGS. 13A through 13H are a flow chart 800 of a preferred method of a finding the shortest equivalent lodestar path process. This preferred method comprises the following steps:

Algorithm To Find The Shortest Equivalent Lodestar Path

We will generate a forest of lodestar paths which will 'match' the quadrant path, FQP, and then choose the shortest such lodestar path. We create a set of root nodes, where each describes a different, 'shortest' (i.e., obtained from the all path table within quadrant) path through the series of quadrants.

Each node will have this information: Quadrant Name; Lodestars of path start, and end, pointer to the actual path (in the relevant ALL PATH WITHIN QUADRANT table); Cost of path. Standard tree data-structures such as sibling and parent pointers between nodes may be used to ensure fast access in the algorithms described below.

Input:
FQP, DL, Lodestar tables, start quadrant, SQ, end quadrant, EQ

Output:
Tour of the structure from the start S to the end lodestar E. Each lodestar is labeled either with a P (for Purpose/Purchase) or W (for Walkthrough). Each P lodestar is also labeled with a description of the specific purpose of the stop, such as the desired activity or the set of items to be purchased at the lodestar. With each lodestar we also, if desired, specify instructions on how to reach the next lodestar.

1. Set current-quadrant to SQ. Set forest=NULL. Set frontier=NULL. Set next-quadrant to the quadrant following (i.e., adjacent to) SQ in QP (Step 802).
2. if current-quadrant=EQ, we are ready to exit, go to step 13 (Step 804).
3. if forest=NULL, then we are just starting off else go to step 8 (Step 806).
4. For each lodestar Li in current_quadrant and such that Li is in a pair in the boundary edge set labeled current-quadrant-next-quadrant, create a root node labeled by current-quadrant with all path table set to current-quadrant: S-Li (Step 808).
5. For each node, find shortest path in current-quadrant: S-Li that contains LodestarsNeeded of current-quadrant. Label each node with pointer to and cost of shortest path (Step 810).
6. Set current-quadrant=next-quadrant and next-quadrant to quadrant following current-quadrant if any, NULL otherwise (Step 812).
7. Add all created nodes to forest and frontier lists. Goto step 2 (Step 814).
8. Set new-frontier=NULL (Step 816).
8'. For each node ParentQuadrant in the frontier list with table Q: L1-L2 carry out steps 9–11. When no nodes remain goto step 12 (Step 818, 820).
9. For each lodestar Li in current_quadrant and such that Li starts an edge in boundary edge set current-quadrant-next-quadrant, create a node labeled current-quadrant with all path table set to current-quadrant: L2-Li (Step 822).
10. Find shortest path in current-quadrant: L2-Li that contains LodestarsNeeded of current-quadrant. Label node with pointer to and cost of shortest path (Step 824).
11. Attach node as child of ParentQuadrant node in the forest list. Add node to new-frontier list. Goto step 8' (Step 826).
12. Set current-quadrant=next-quadrant and next-quadrant to quadrant following current-quadrant if any, NULL otherwise. Set frontier=new-frontier and go to step 2 (Step 828).
13. For each node ParentQuadrant in the frontier list with table Q: L1-L2 carry out steps 14–16. When no nodes remain goto step 17 (Steps 830, 832).
14. Create a node labeled current-quadrant with all path table set to current-quadrant: L2-E (Step 834).
15. Find shortest path in current-quadrant : L2-E that contains LodestarsNeeded of current-quadrant. Label node with pointer to and cost of shortest path (Step 836).
16. Attach node as child of ParentQuadrant node in the forest list. Goto step 13 (Step 838).
17. Compute total cost of every path (from root node to last leaf node) in every tree in forest list by adding together cost at each node in the path. Let MinPath be the path with minimum cost. Construct lodestar sequence Q from MinPath by concatenating shortest paths at every node (Step 840).
18. Q is the desired shortest path. Using LodestarsNeeded information (as reflected by the modified DL), for each quadrant from which MinPath is derived label; each lodestar with P, PP, or W (Step 842).
    18a. If there are any PP lodestars in Q, run the determine-ordering algorithm. Note that repeats on the quadrant level have already been taken care of (Step 844).
19. Label each P lodestar with description of items to be visited or purchased at the lodestar (Step 846).
20. For each lodestar in the path Q, consult the lodestar. Instruction Database and retrieve instructions on how to reach next lodestar (Step 848).

Figure 4:
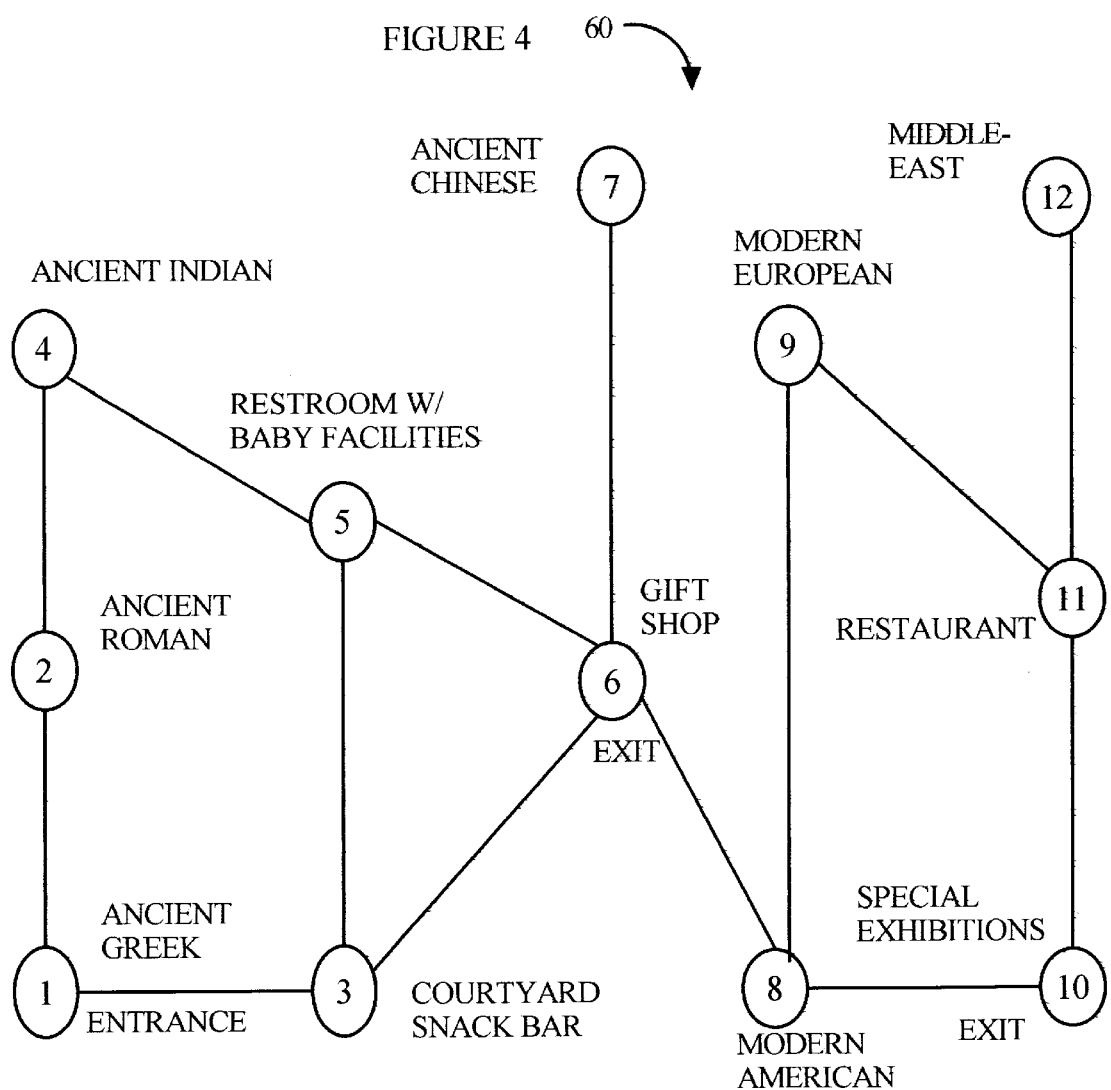
FIG. 4 is a diagram illustrating an a graphical view of a lodestar. Layout database for an example museum system according to the present invention.
Figure 5A:
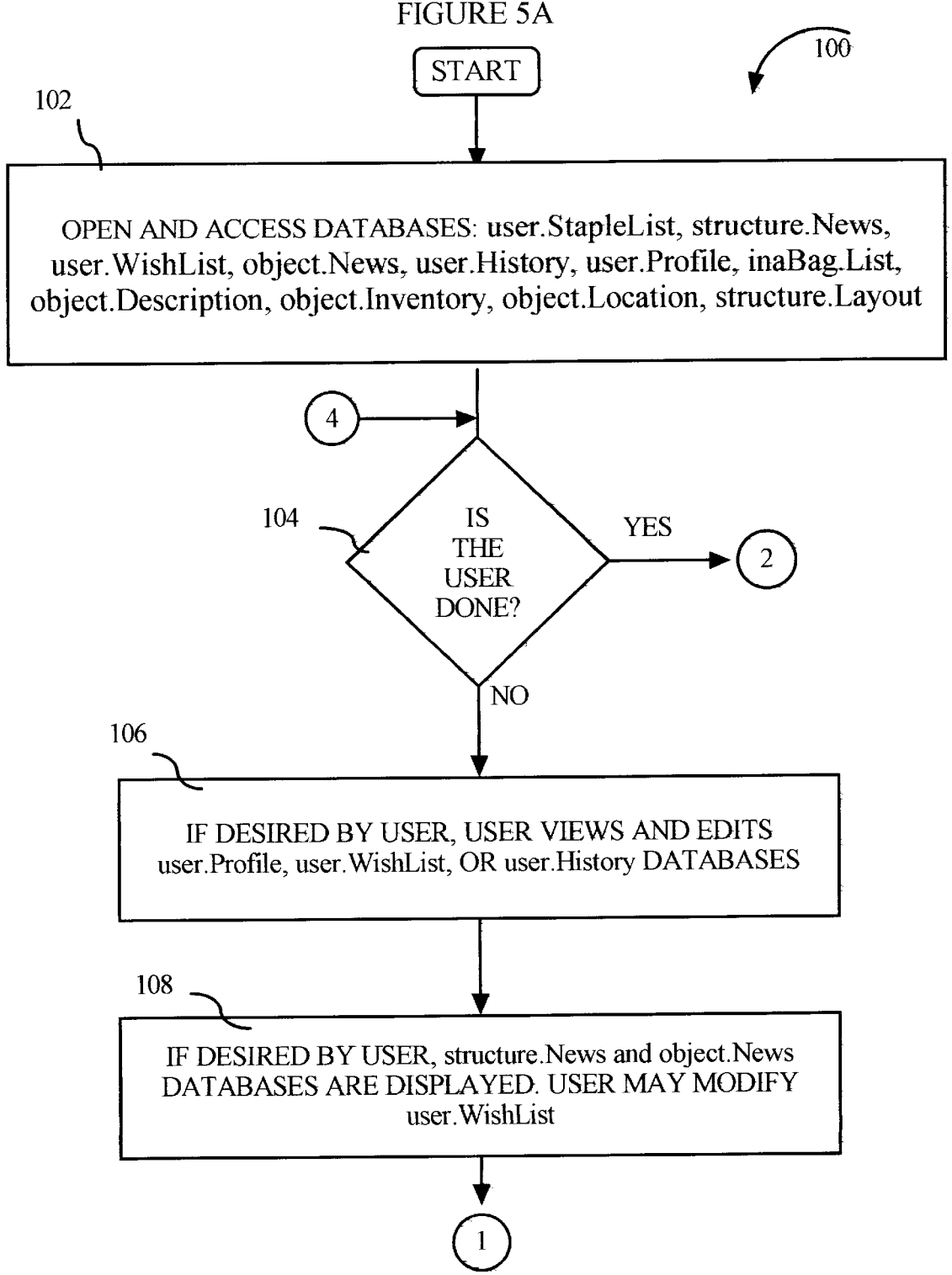
FIGS. 5A through 5F are a flow chart of a creating set of destinations process according to one embodiment of the present invention.
Figure 5B:
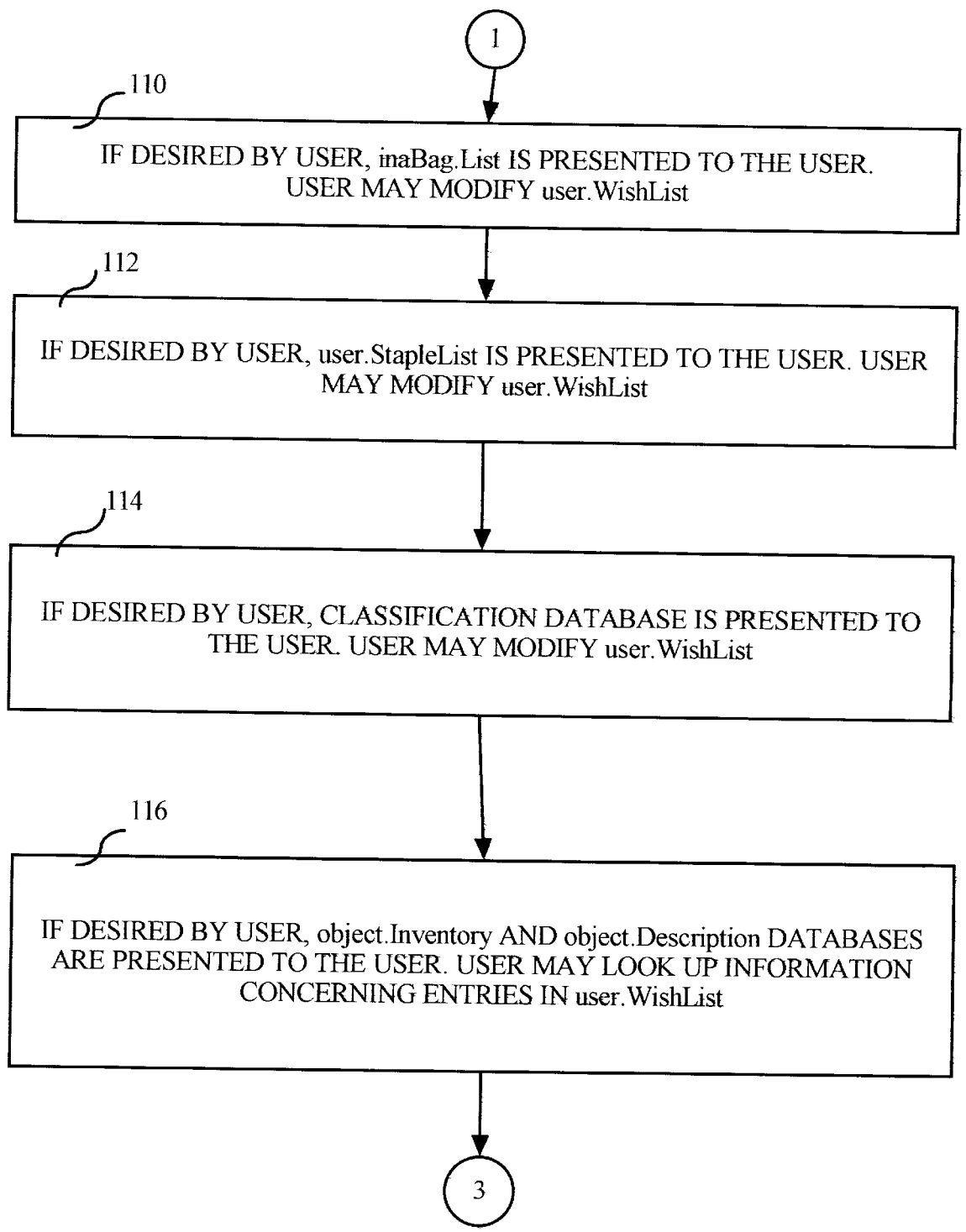
Figure 5C:
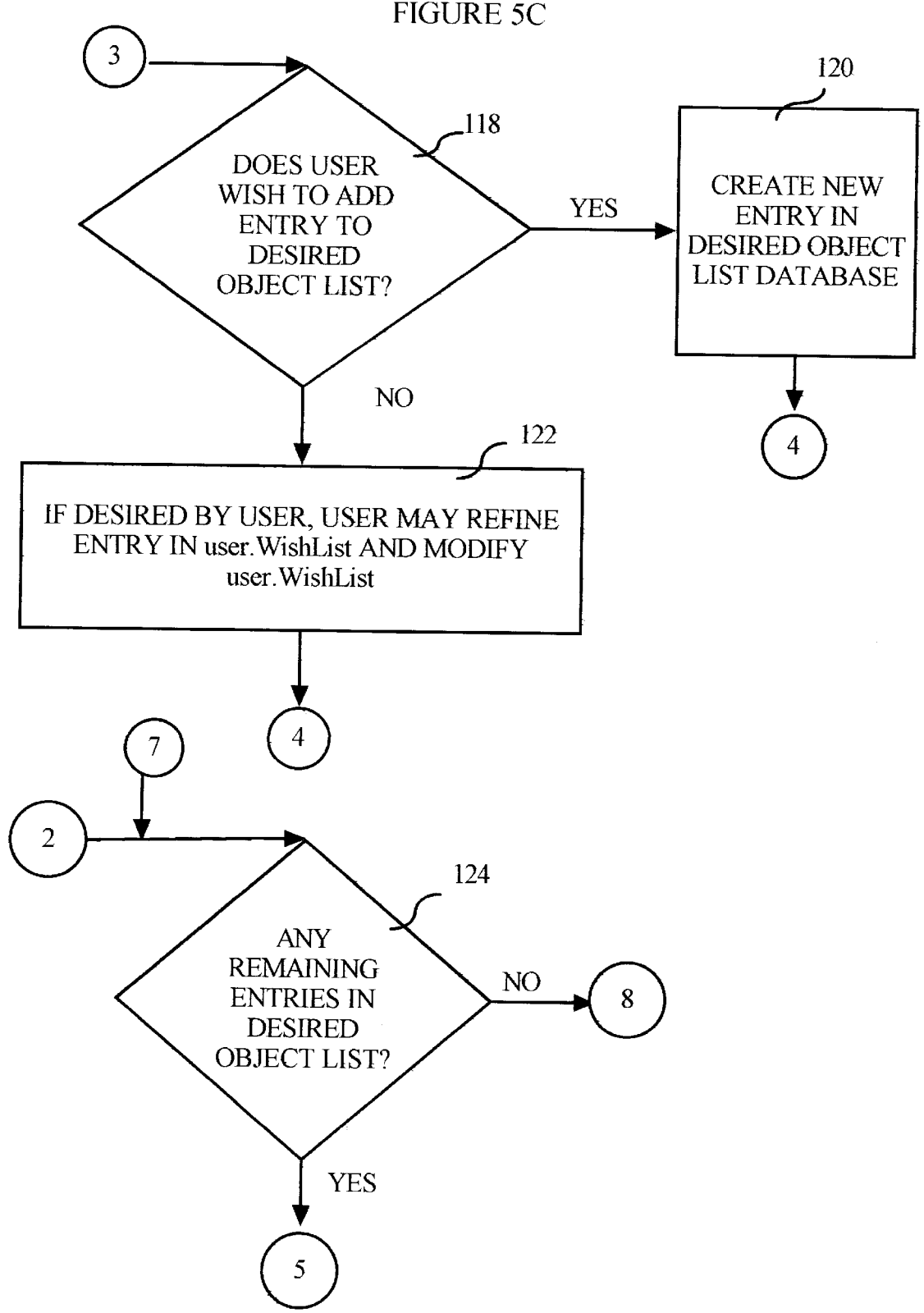
Figure 5D:
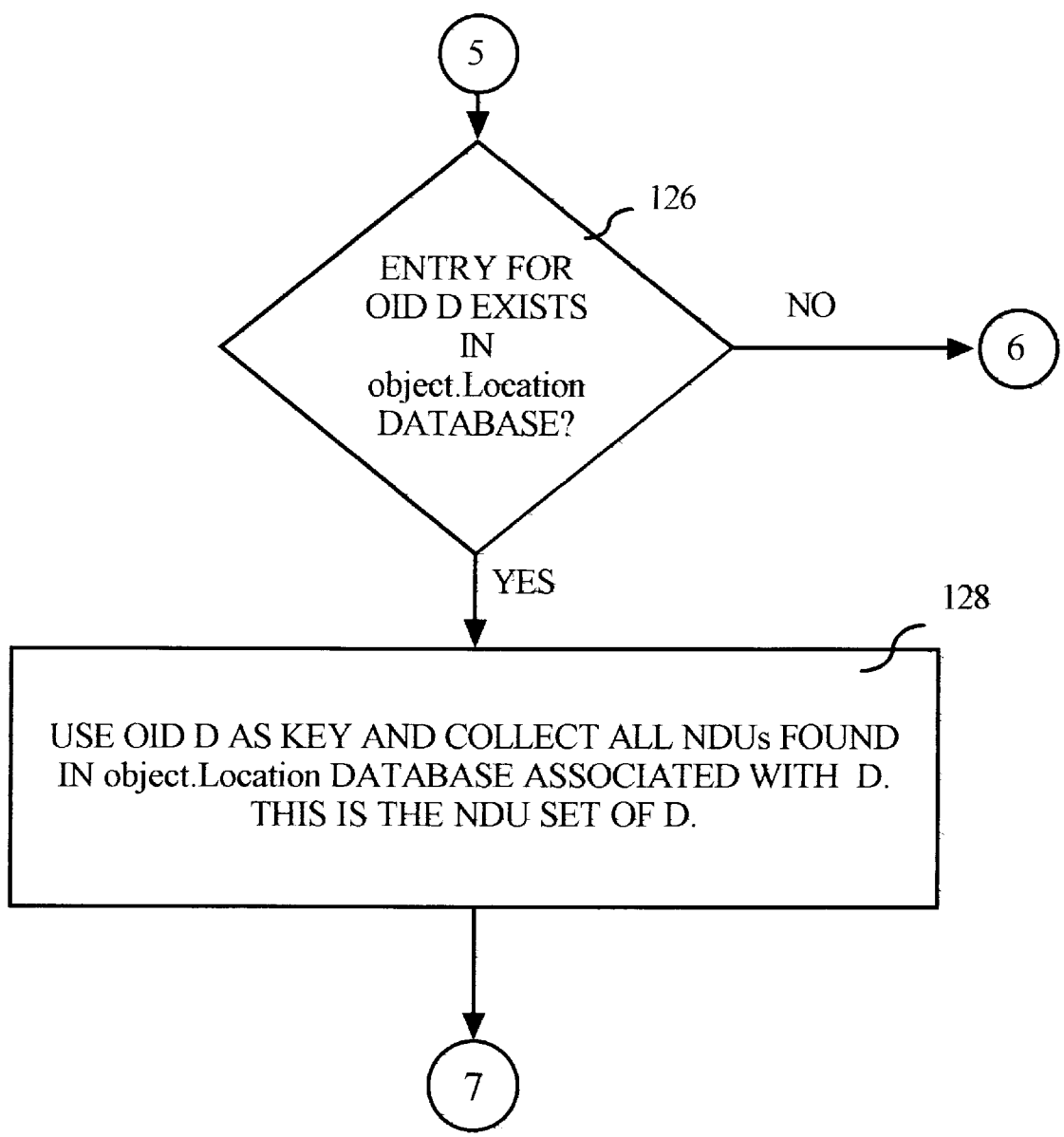
Figure 5E:
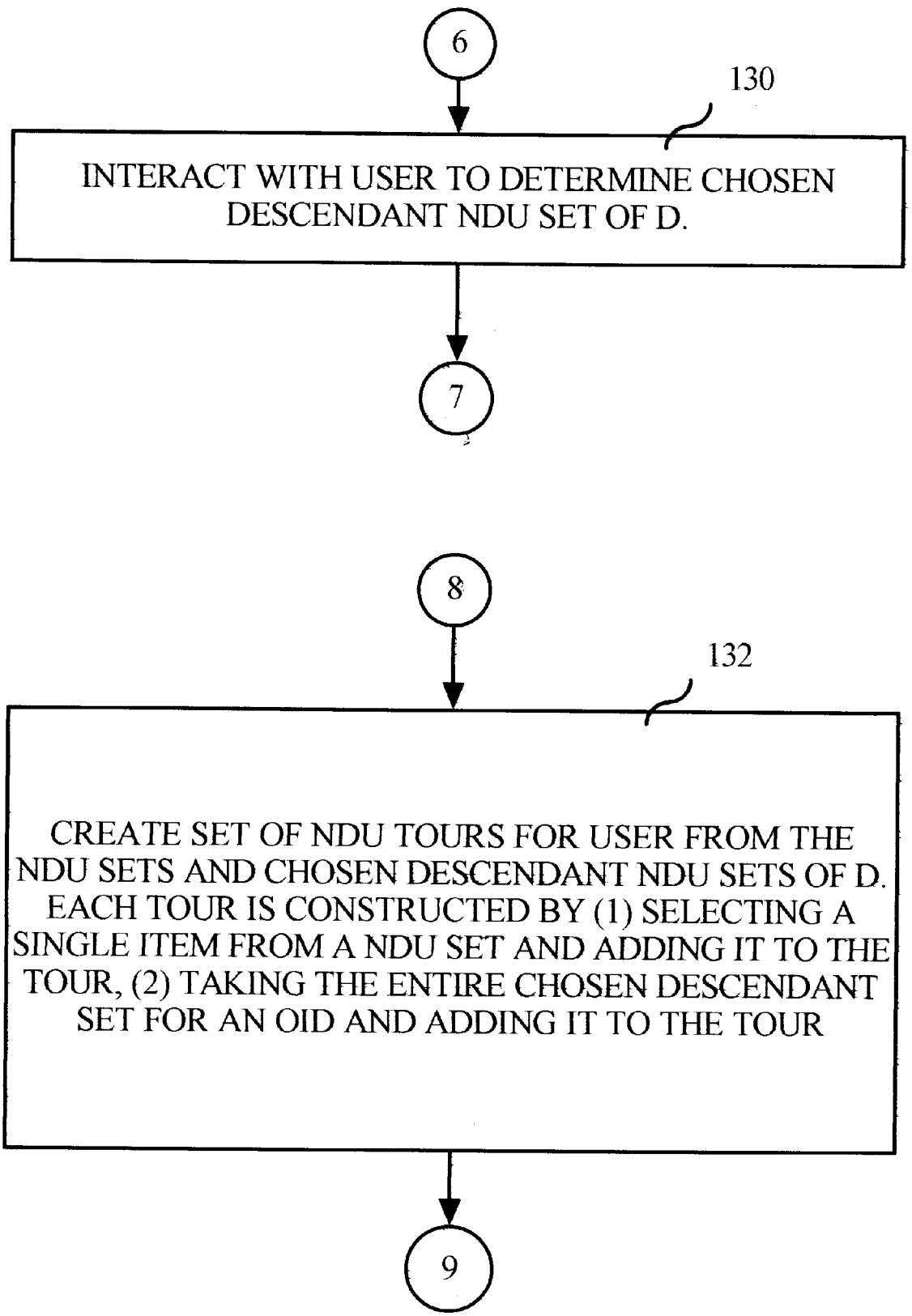
Figure 5F:
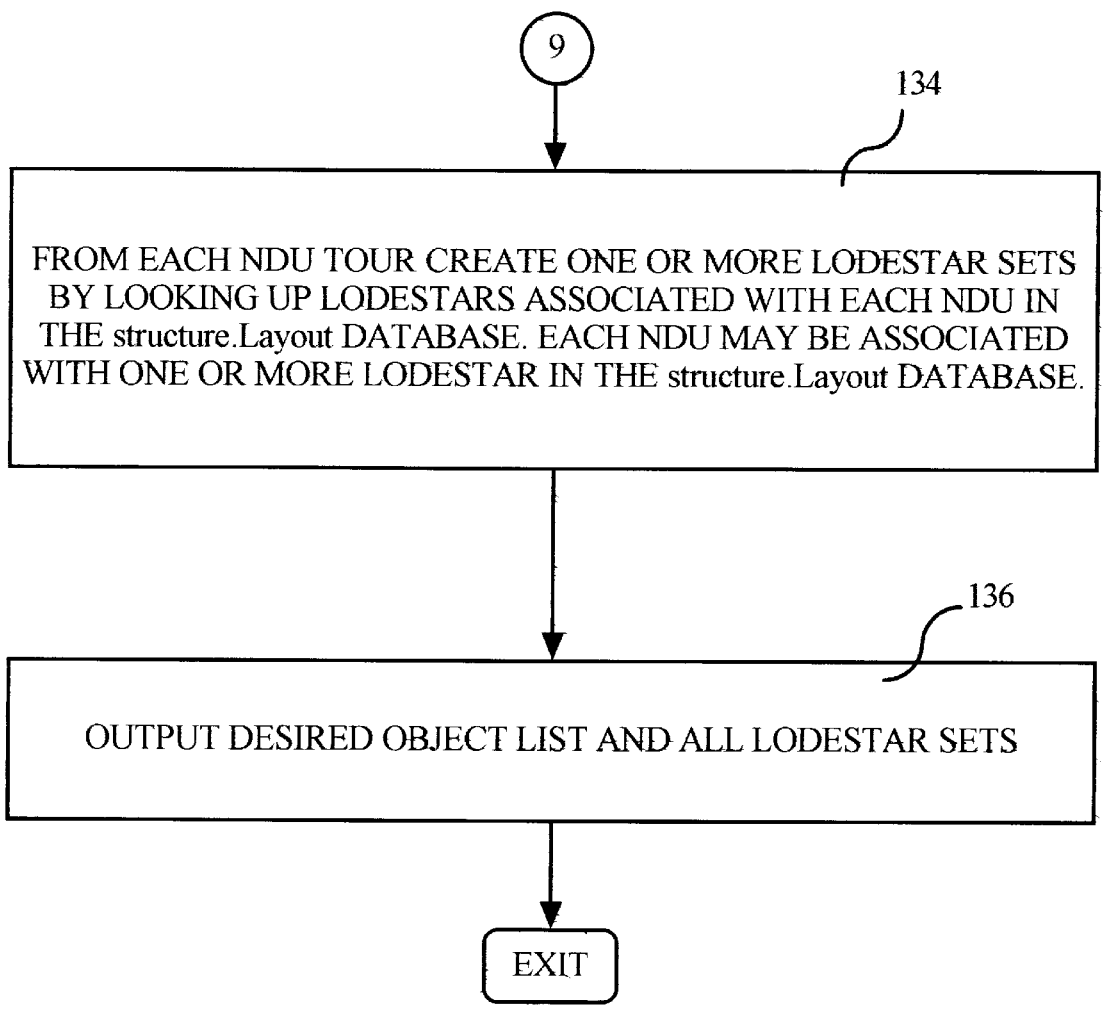
Figure 6A:
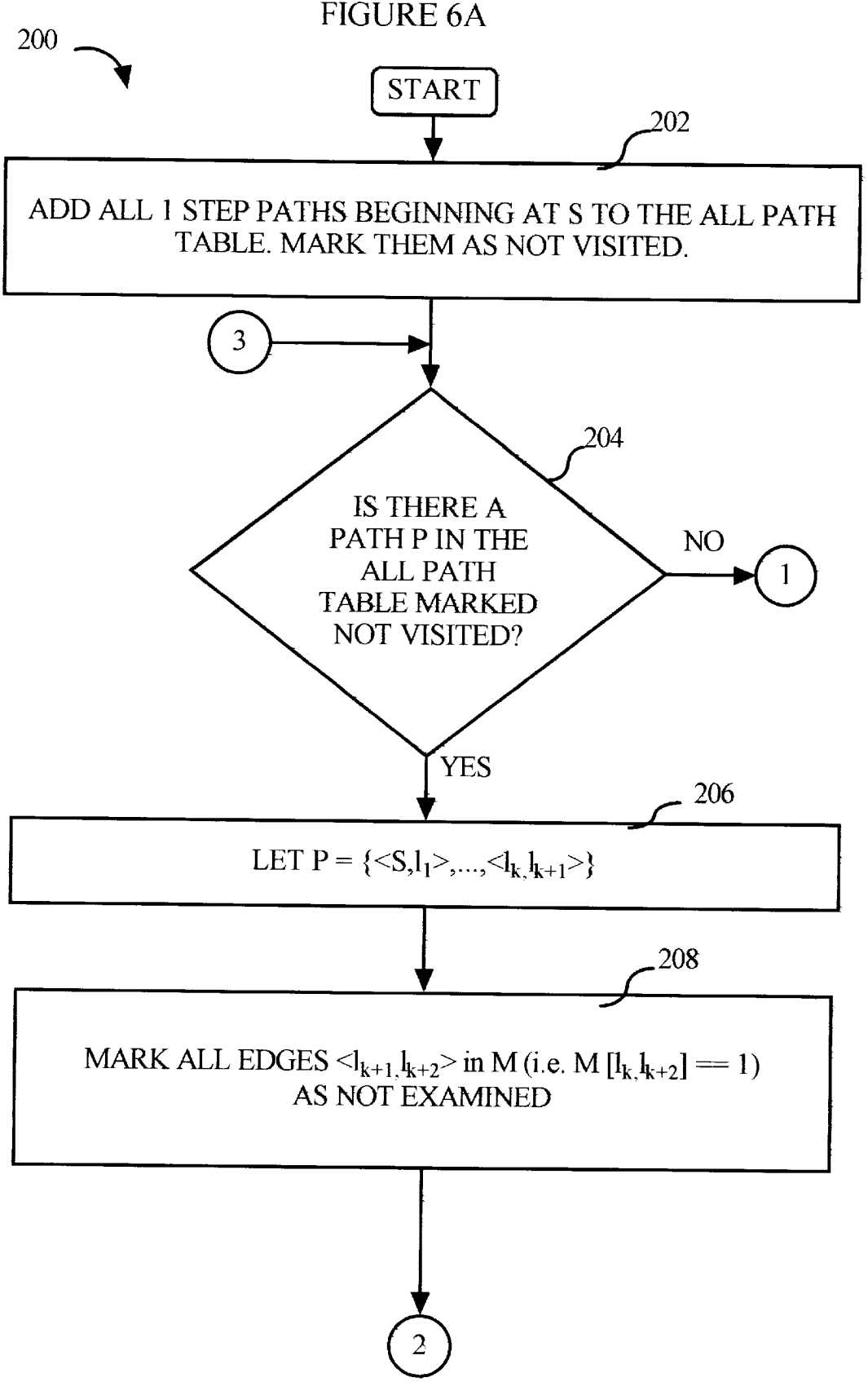
Figure 6B:
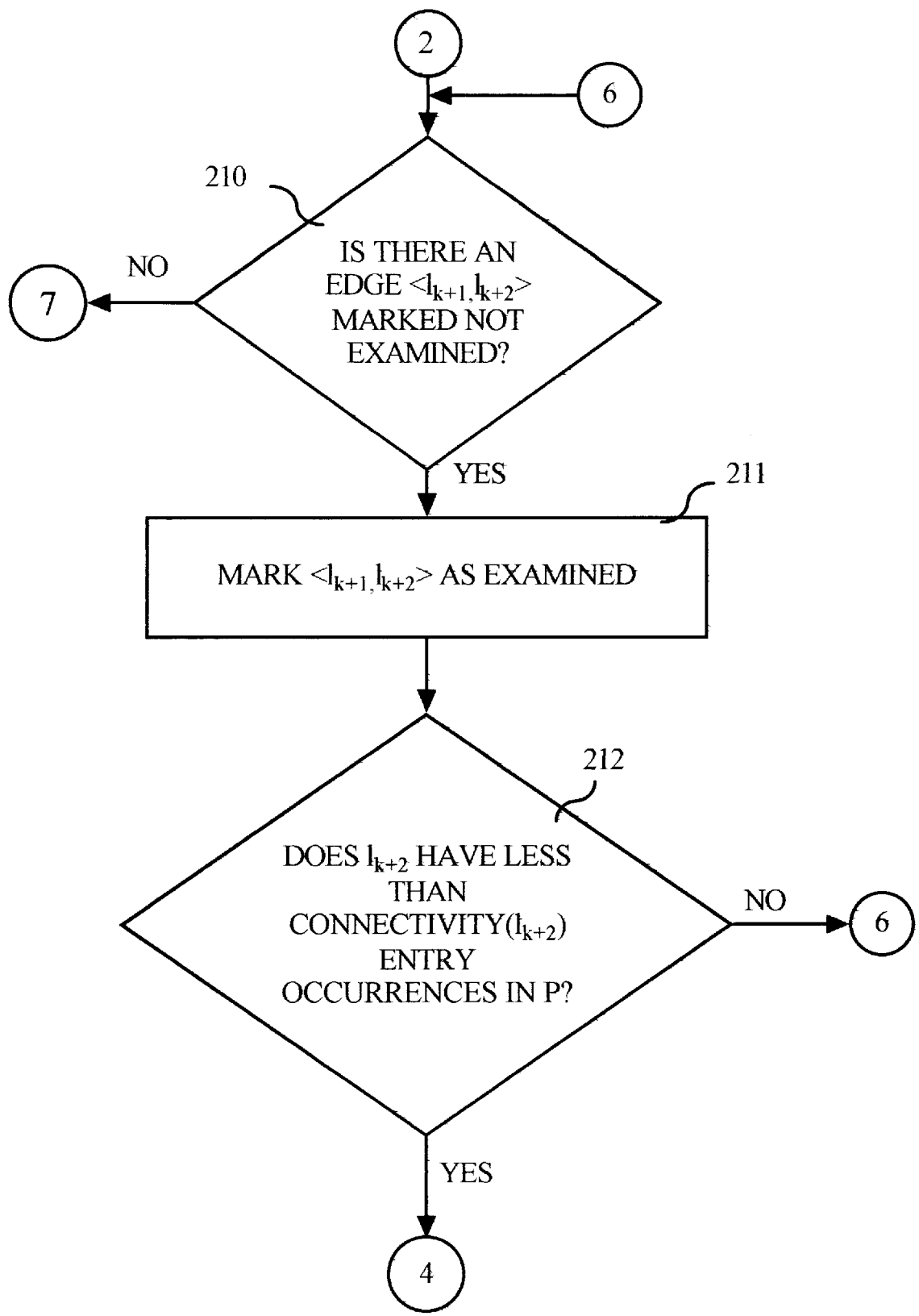
Figure 6D:
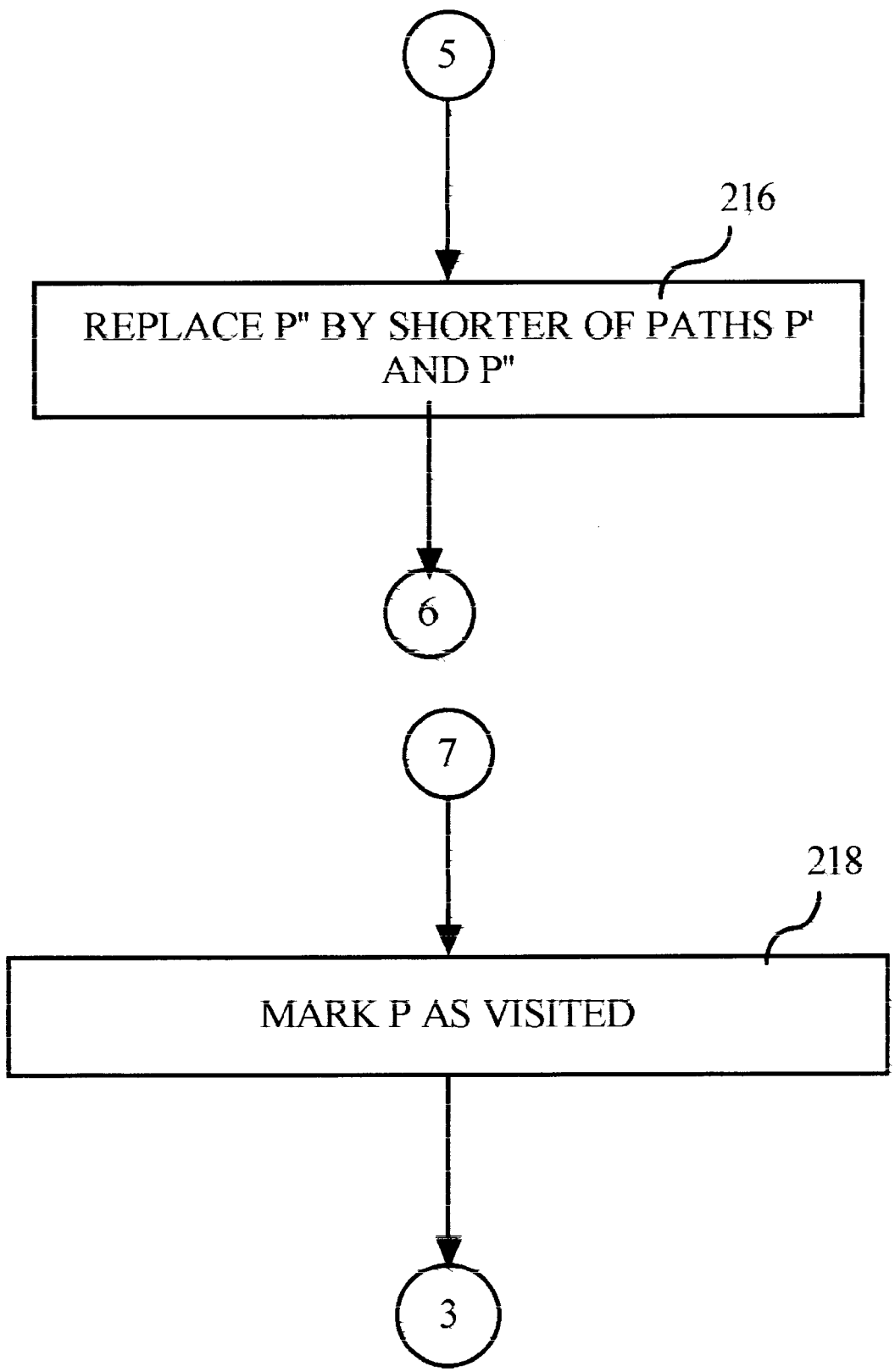
Figure 6E:
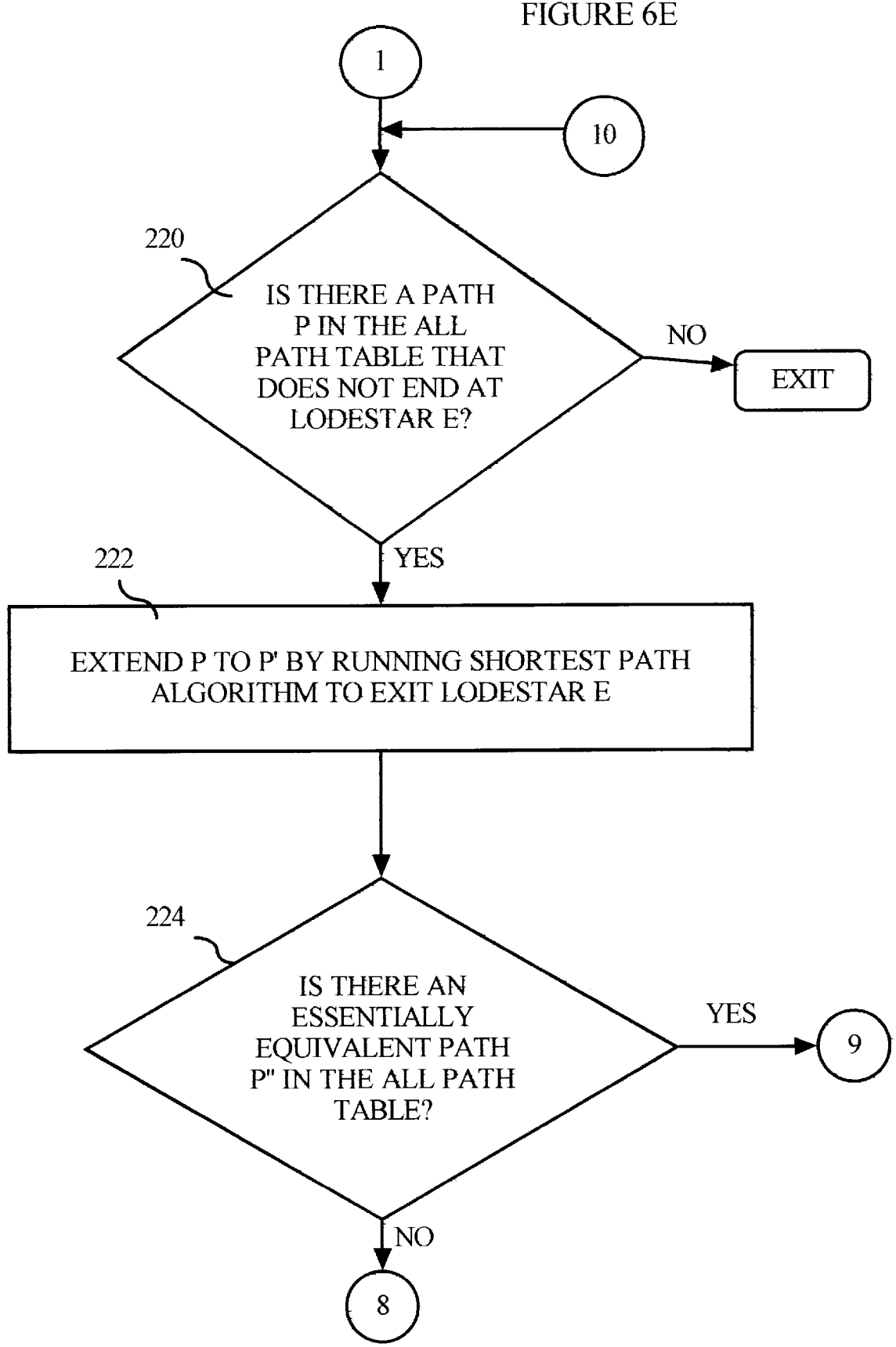
Figure 6F:
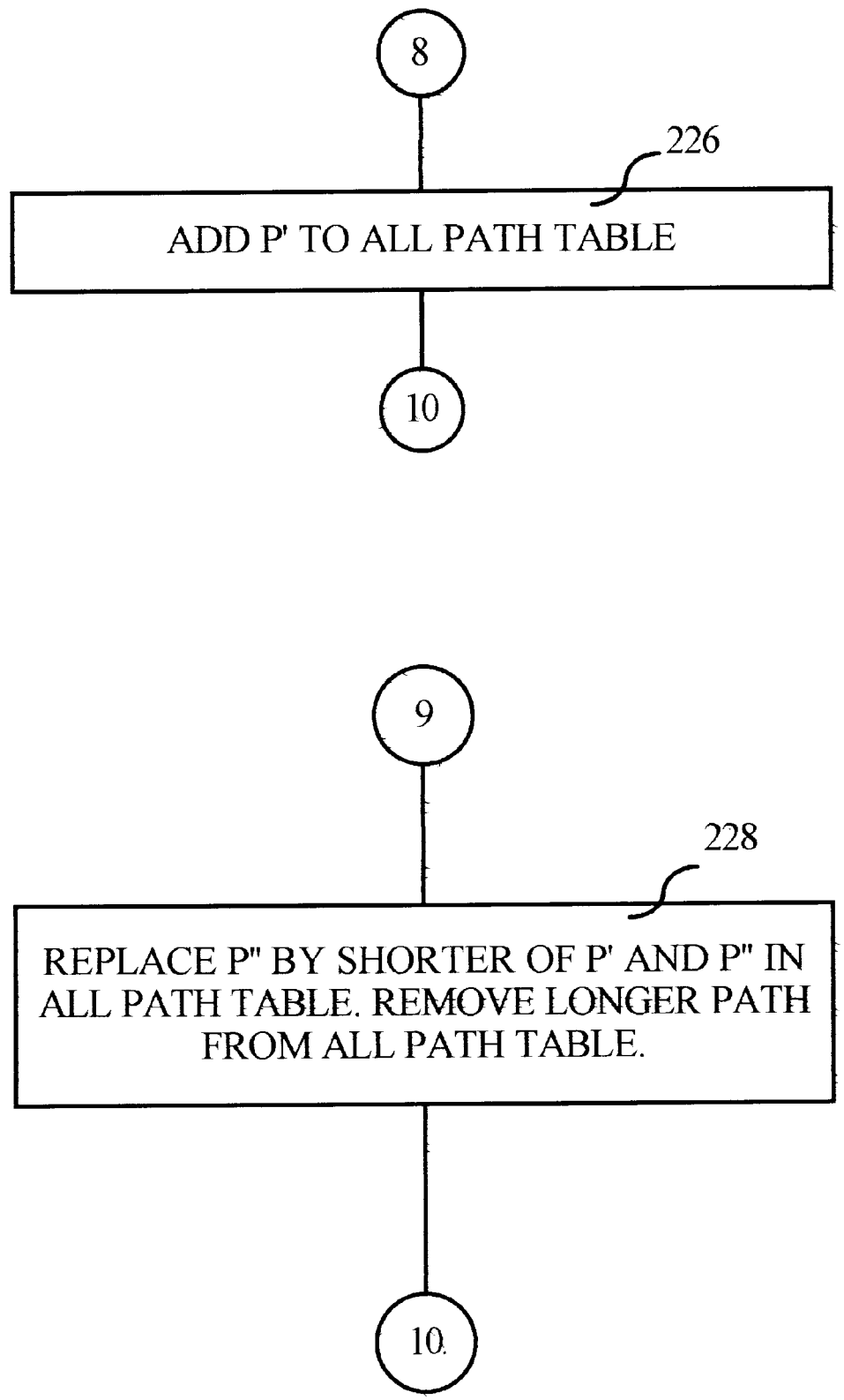

Example 15 show a museum layout with two quadrants Q1 and Q2. Q1 has 7 lodestars (1, . . . ,7) and Q2 has 5 lodestars (8, . . . ,12). There is a single starting lodestar, lodestar 1, and a single exit lodestar, lodestar 10. Each quadrant corresponds to a wing or a floor of the museum. FIG. 4 shows a graphical representation of the museum layout 60 with each lodestar labeled with the facilities available therein.

EXAMPLE 15

The Lodestar Adjacency Matrix for Q1 and Q2 is:

| |
|---|
| 0 1 1 0 0 0 0 0 0 0 0 |
| 1 0 0 1 0 0 0 0 0 0 0 |
| 1 0 0 0 1 1 0 0 0 0 0 |
| 0 1 0 0 1 0 0 0 0 0 0 |
| 0 0 1 1 0 1 0 0 0 0 0 |
| 0 0 0 0 0 1 0 0 0 0 0 |
| 0 0 0 0 0 1 0 0 1 1 0 0 |
| 0 0 0 0 0 0 0 1 0 0 1 0 |
| 0 0 0 0 0 0 0 1 0 0 1 0 |
| 0 0 0 0 0 0 0 0 1 1 0 1 |
| 0 0 0 0 0 0 0 0 0 0 1 0 |

The Quadrant Adjacency Matrix is:
01
10

The table of paths Q:1–6 is identical to that given for EXAMPLE 1. The table of paths Q2: 8–10 is given below:

| Path # | Path |
|---|---|
| 1 | 8 10 |
| 2 | 8 9 11 10 |
| 3 | 8 9 8 10 |
| 4 | 8 9 11 12 11 10 |
| 5 | 8 10 11 10 |
| 6 | 8 10 11 12 11 10 |

Figure 15:
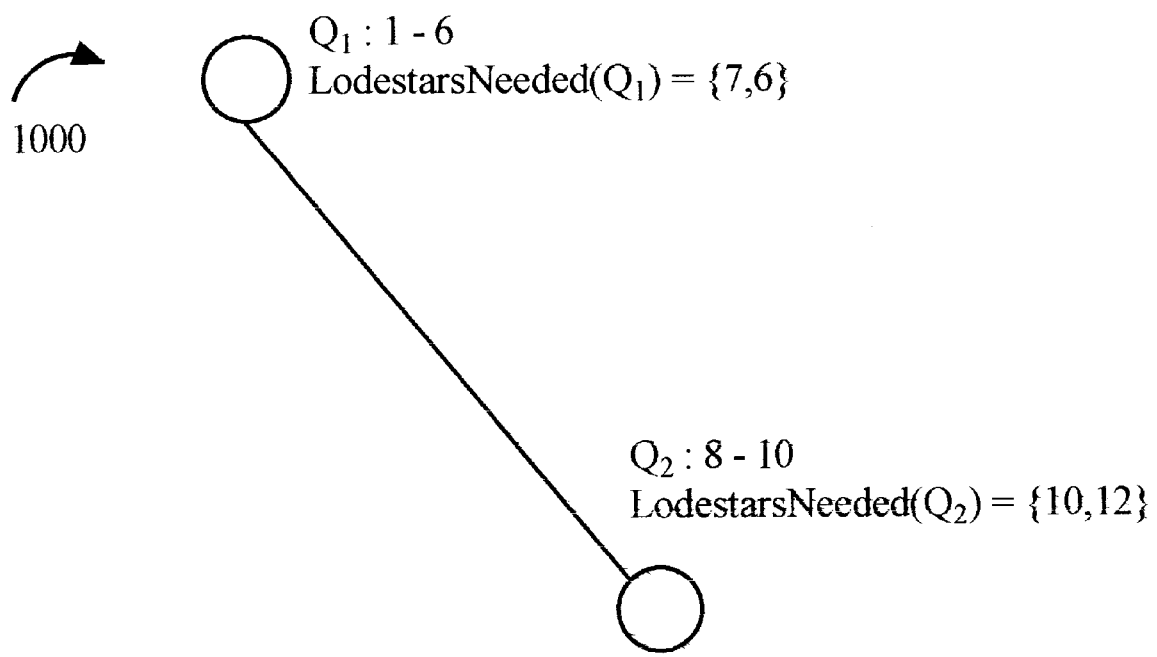
FIG. 15 is a diagram of an illustrative intermediate data-structure created by a find shortest equivalent lodestar path process according to the present invention.

There is only one set of boundary edges Q1-Q2={<6, 8>}.
If the desired set of lodestars is {7,6,10,12} the Algorithm To Find The Shortest Quadrant Path will report the quadrant path Q1 Q2 as the shortest quadrant path. Each of Q1 and Q2 are labeled with a W. LodestarsNeeded(Q1)={7, 6} and LodestarsNeeded(Q2)={10,12}. The Algorithm To Find The Shortest Equivalent Lodestar Path will create the two node tree 1000 shown in FIG. 15. The shortest path in Q1 is path number 7 from Example 1; the shortest path in Q2: 8–10 is either one of path number 4 or 6. The final path with P and W markings is:
1 (W) 3 (W) 6 (W) 7 (P) 6 (P) 8 (W) 9 (W) 11 (W) 12 (P) 11 (W) 10 (P)

This path is based on path 4, which might be chosen after interaction with the user, as it includes additional access to 9 instead of two stops at 10. The Determiine-Ordering algorithm has also been used to pick the second occurrence of 6 as a P lodestar with the first occurrence labeled with W. Again, such a choice would involve the user expressing their preferences or our system using a heuristic.

In Example 16 we show the lodestar instruction sequence generated from the lodestar.Instruction database fragment shown in Example 12.

EXAMPLE 16

LODESTAR INSTRUCTION SEQUENCE

1. From Entrance follow RED signs to Courtyard.
2. From Courtyard turn left at SnackBar and follow RED signs to Gift Shop.
3. From Gift shop continue beyond shop entrance and follow YELLOW signs to Ancient Chinese Gallery.
4. From Ancient Chinese return to Gift Shop following PURPLE signs.
5. From Gift shop at shop exit turn right and follow RED sign to Modern American gallery.
6. From Modern American at gallery entrance turn left and follow BLUE signs to Modern European Gallery.
7. From Modern European at gallery exit turn right and follow RED signs to Restaurant.
8. From Restaurant at Rest Room Area follow BLUE signs to Middle-East Gallery.
9. From Middle-East follow RED signs to Restaurant.
10. From Restaurant at restaurant entrance follow YELLOW signs to Special Exhibits and Exit.

2.3.3 Determine Ordering Algorithm

A lodestar may occur multiple times within a given path. This algorithm may be used to determine on which occurrence of a desired lodestar the user wants to do/acquire an object of interest. If there are several objects associated with such a lodestar, the algorithm allows their acquisition to be split among the different occurrences of the lodestar.

Figure 11A:
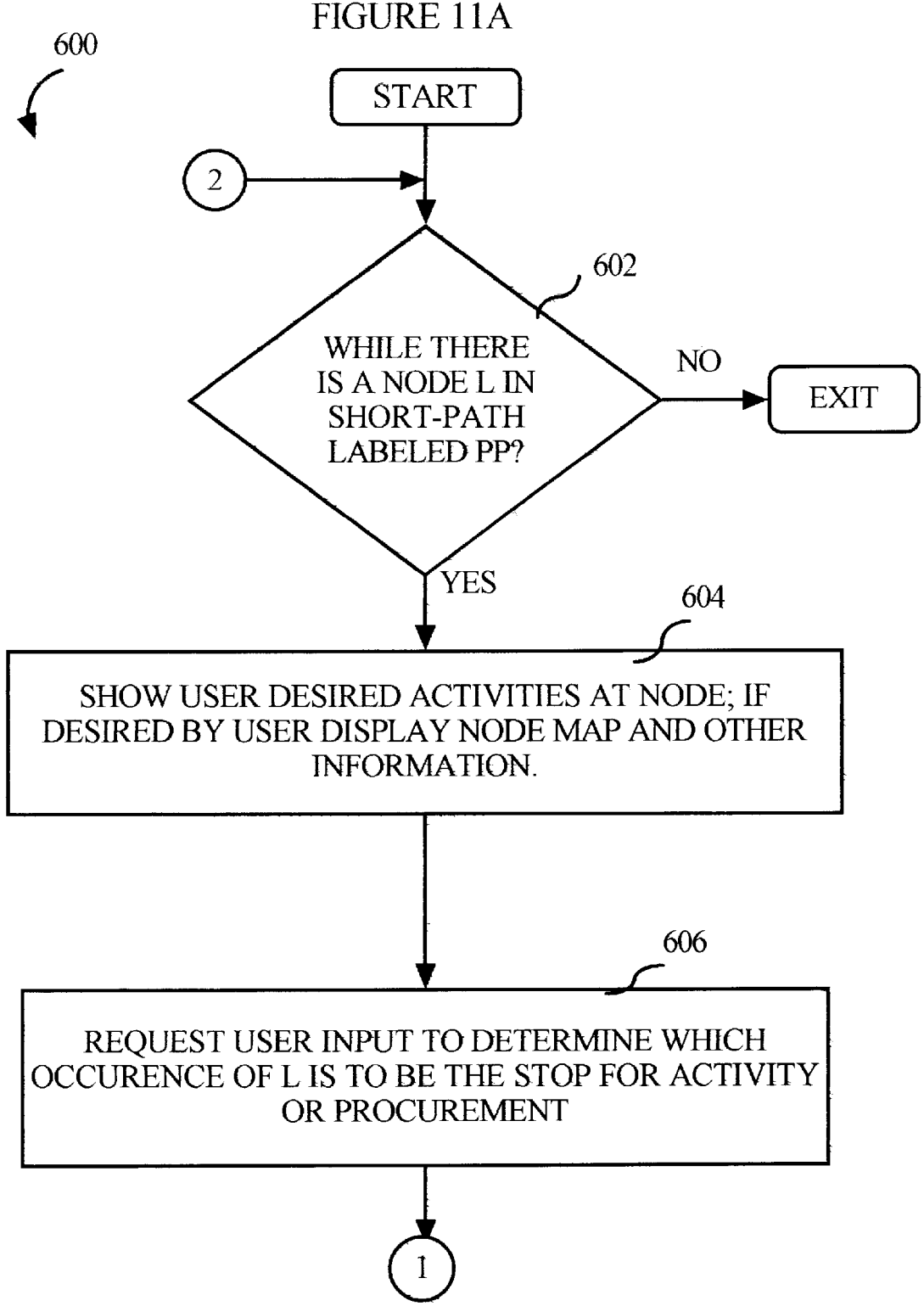
FIGS. 11A and 11B are a flow chart of a determine ordering process according to one embodiment of the present invention.
Figure 11B:
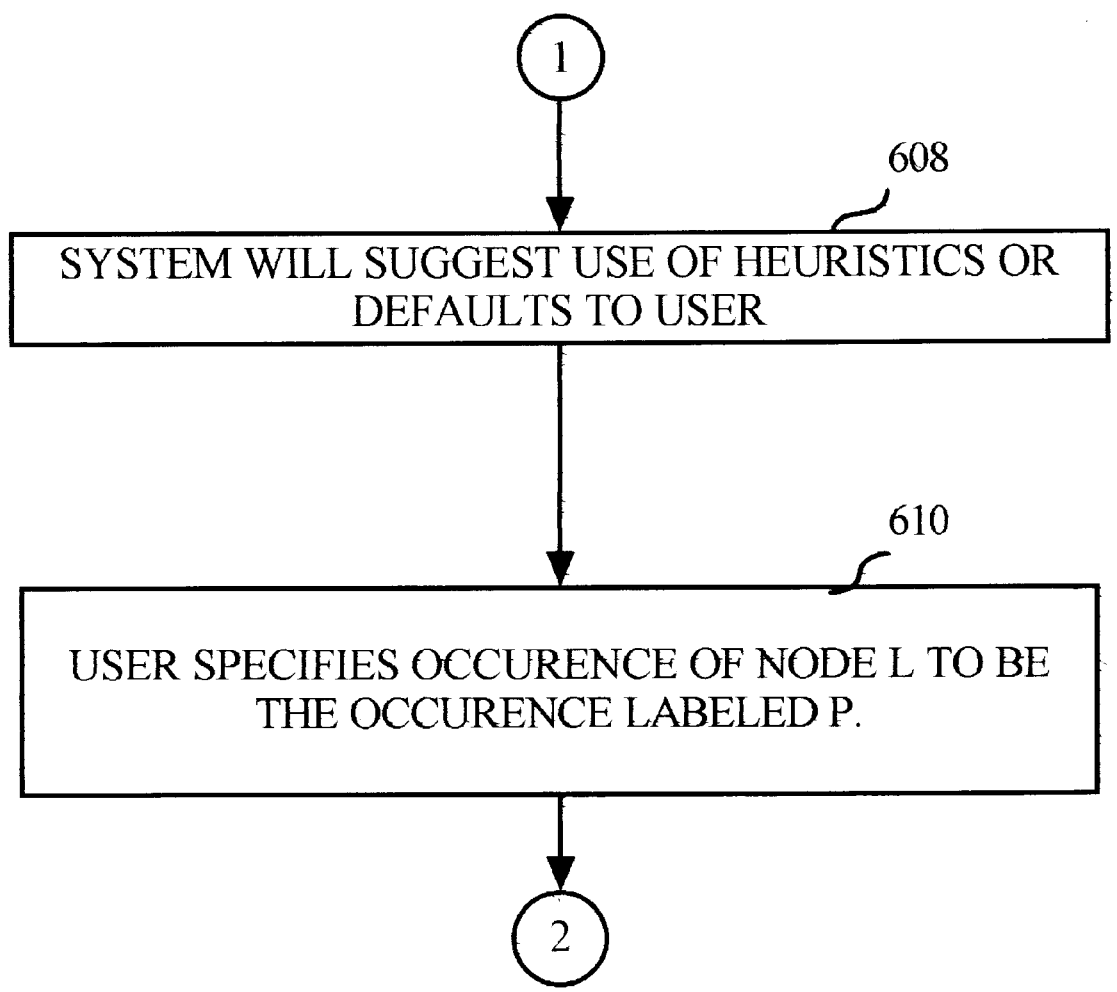

FIGS. 11A and 11B a flow chart 600 of a preferred method of a determine ordering a process. This preferred method comprises the following steps:

Input:
SHORT-PATH, labeled with P, PP and W, user input, DL. It does not matter if the nodes in the path are lodestars or quadrants.

Output:
SHORT-PATH, labeled with P, and W, a modified DL.

1. For each different node L in SHORT-PATH labeled PP (not by occurrence, but by name of node) (Step 602).
2. Show user what is to be done at that node, and if desired by user, display node path so far (as known), and state how many times the node is passed through (e.g., 2, 3 etc.) and/or highlight or color the nodes that are the same (Step 604).
3. Ask user which node occurrence is to be the stop of activity/procurement. User can be helped via (Step 606):
   3a. Make relevant suggestions based on some rules of thumb like (Step 608):
      Don't buy shoes until you've been doing some walking; Buy cold foods as late as possible.
   3b. Provide a set of defaults, such as, take the first occurrence or take the last occurrence (Step 608).
4. User specifies which occurrence of node L is the 'active' one. This node occurrence gets renamed P, the other occurrences of this node get renamed W (Step 610).

Other variations on determine-ordering algorithm are easily devised. We could also allow the user to split the activities, doing or acquiring some on one stop and some at another. In this case, each such stop get labeled P and all remaining occurrences will become W. If the user specifies which of the activities will be done at which stop, we reflect that by augmenting the DL with that information. We simply add the node occurrence number to the object as specified by the user. For example, if the user wants to pick up beer the first time they go through the aisle and ice cream the second time, we will place a 1 next to the beer and a 2 next to the ice cream.

Variations

The algorithms described above lend themselves to many variations, not all of which are described here due to space limitations. We will briefly describe a number of variations to the algorithms including the following:

(1) Omitting one or both of starting and ending lodestars so that the system can suggest an appropriate starting or ending lodestar.
(2) Preferences in terms of certain departments, items or lodestars being visited in a certain sequence or being visited last or first.
(3) A variety of timing considerations such as: producing time estimates for the user's tour of the structure, suggesting starting times to avoid peak hours and crowding, scheduling breaks at fixed times, generating a tour of the structure based on least expected in-structure time instead of distance etc.
(4) Output of the algorithm can be presented in a variety of formats including (a) printed list of lodestars to be purchased, items and directions (b) graphical maps (c) audio recordings (d) multi-media output incorporates sound, graphics, video and text.

Omitting Starting/Ending Lodestars

The user could query the system for an appropriate starting and ending lodestar. Essentially this involves running one of the above algorithms (either the Lodestar Only Case or the Facility With Quadrants case) with all possible starting and ending lodestars. For each combination of starting and ending lodestars we generate an appropriate shortest path which includes the desired lodestar set. Users can choose between the generated paths based on whether they are shortest, closest to certain parking areas, or restaurants, etc. Similar variations which allow the user to specify one of the starting or ending lodestar are also accommodated in a similar fashion.

User Preference For Lodestar, Object, Department Or 'Raw Time' Sequencing

A user may have a general preference in terms of ordering lodestars, objects or departments. For example, a user may generally wish to visit the clothing area first, before doing their other shopping chores, or last, so that they can spend as much time as remains looking for clothes. Such preferences generally reduce to having certain lodestars appear at the beginning, end, or in a certain sequence in the chosen route. These preferences can be easily incorporated into either of the Lodestar Only Case or the Facility With Quadrants algorithms and be used to constrain the routes generated by those algorithms. In other words, instead of simply generating the shortest path through the structure, we generate the shortest path that meets the user preference in terms of lodestar sequencing and placement. One example in a grocery setting is to always schedule the acquisition of cold foods last.

Raw time refers to actual wall clock time, vs. anticipated traversal time. Raw time reasoning is convenient for automatic inclusion of lodestars based on clock time. In this way we can accommodate user rules such as: If it is near lunch time (expressed as some range of time), send me to the lunch counter first; or, if my flight time will not intersect with a meal time (user can specify range or some default can be provided), then also schedule a stop at a hot dog stand.

Timing Considerations

A variety of timing issues can also be addressed by our algorithms. For example, a user may wish to optimize a trip in the grocery store on likely busy-ness vs. absolute distance. In this way, the system may produce a schedule which works around the busiest areas in the store. Or a user may want to design the tour so that it is convenient for them to eat lunch at 12 in a given spot.

On the lodestar level, we would need to generate a time database that maintains time based weights for each edge in the matrix. This would represent the estimated length of time of time it takes to traverse the edge. Then, when our algorithms compute the shortest or best path, they would do so in terms of time, and each node can labeled with 'approximate time so far.' If the user needs to be at some specific place at 12 noon, the algorithms would compute two sets of paths, one which ends at the desired location at 12, and another, which starts from there, at a suitable later time later. Between the two pieces, all other needed lodestars will be covered. The algorithm would then choose the shortest pair from the set of such path pairs.

Generating a time database may require empirical study at the facility of interest of the time taken by individuals to travel through different sections of the facility while browsing, shopping, walking through etc. Depending upon the relative sophistication of the database, the information contained therein could range from a rough estimate of minimum time to more sophisticated measures that take into account time of day—traversing parts of the facility take a certain time at 8 am and more time at 12 PM.

Multi-Media Paths And Navigation Aids

The output of our algorithms can be presented as a customized path to the user in a variety of different formats. The simplest form of this is a printed list of lodestars or, directions to lodestars or orientation hints describing how to access NDUs associated with objects, or object lists and descriptions. This can be augmented with images of lodestars, reference points or products. Another approach would be to show a kind of structure schematic to the user, and highlight in some way the areas corresponding to the items of interest. Audio recordings with a voice description of the tour of the facility and description of the lodestars and objects could also be produced. This is similar to the recordings often available in museums or parks, except that our recordings are customized to the user's needs instead of being a single fixed recording. Such recordings can be personalized to reflect user name, and prior history. For example, the recording for someone seeing a special exhibit of 20th century art could reflect whether or not they had seen an earlier exhibit on the Impressionists. If 'way stations' had been a part of the earlier exhibit, an even finer grain of personalization is possible, since now the history can reflect more exactly where in the exhibit the user had gone. Video screens throughout the display can also be used to show users relevant, personalized information (such as other paintings of interest). Output could also take a hypertext form. More sophisticated multi-media navigation aids that combine any or all of audio, video, graphics, text, including active on-line location sensing for lodestars could also be used as navigation guides as well as information points that incorporate our algorithm outputs.

The present invention is not limited to the disclosed embodiment, but rather various modifications, substitutions, and structures may be used without departing from the scope of the present invention.

APPENDIX

A specific and important embodiment relates to the area of shopping planning, and grocery shopping in particular. Grocery stores are often crowded at peak time, and understocked at other times, leaving the user with not many options in terms of arranging a quick, fruitful trip. People also like to examine different product varieties (for example, the many pastas brands and shapes) as well as to do price comparisions, and read the nutrition analysis on the labels. However, they often find themselves in the way of other shoppers when they attempt to do so. In addition, in some cases, such as when shopping with young children, it is simply not feasible to stop to do either activity. And since sale items are not always known in advance, people find that they can't always take advantage of the sale, having planned their shopping without this information. However, all of these activities can be done via this invention, some automatically (e.g., find me the cheapest linguine), and without blocking anyone's way.

Further, grocery is particularly suited to pre-planning, as it can involve the steps of recipe selection, daily menu planning, conversion of menus to items lists, and finally from item lists to the appropriate tour of the store to collect the items. To accommodate this, our system could optionally interface to a menu planner, with a set of recipes which leads to a list of items expressed, via appropriate conversion, in units relevant to the specific store's stock on hand (e.g., the recipe's 4 tablespoons of butter gets converted to ounces, a standard measure for selling butter, and then into a one pound package, which is the smallest the store happens to have one hand). The menu planner can even be extended into a home component that reminds the user to defrost the chicken. With time an ever pressing concern in American households, this kind of automation would be welcome relief to shoppers. Other types of help can be provided within or instead of such a menu/recipe system, such as providing video demonstrations of different techniques needed for a recipe (e.g., show user how to fold beaten egg whites into batter ) on-line information about ingredients (e.g., the kind of information provided by cookbooks like "Joy of Cooking." [*Joy of Cooking*, by Irma and Marion S. Rombauer, Bobbs-Merrill Company, Indianapolis and New York]), as well as phone hookups to nutritionists, home economists, cooks and potentially even government employees (e.g., U.S.D.A.) to answer questions about food and its correct and safe preparation; email also may be used to this end.

Similarly, for the super store: the algorithms used to convert from recipes to a Desired Object List, which we can simply call the shopping list, are similar to those needed to convert from in-a-bag formulations to shopping lists. For example, the store may put together a list of items a beginning gardener would need and call it "Beginning Gardening-In-a-bag." This could be expanded to include pages of information about gardening, terms, how to care for the tools, etc., representing a kind of specialized, on-line encyclopedia. Such a system allows the store to quickly and efficiently provide truly expert advice to a customer that is beyond the knowledge of the in-store personnel at the time of the shop. Chain stores may hire a number of experts, and over time, the customer can determine which one best fits his/her own predilections, and choose accordingly. Also, this feature can be expanded by email correspondence, including an estimated answer time (your answer will be available in one hour, 1 day, etc.). Remote book-ups can also provide for more immediate question and answer sessions, if desired.

In what follows, we will give specific examples of how the invention could work for the grocery store case. As in the general case, there are two major steps. The first is to specify the objects desired, the Creating Set of Destinations step. In this case, we can think of this as Shopping List Specification. These desired objects are then translated into locations (if necessary), and lodestars. Note that in a shopping embodiment, there can be a value to allowing the list to be divided into parts, such as a part to be gathered by store personnel, and a part which the individual user will personally shop for.

In the second step, the Creating Quick-Trip Tour step, a customized tour which covers the lodestars, and is optimized by desired user chosen characteristics (e.g., least distance to traverse; schedule most crowded areas first/last, etc.; schedule in lunch/dinner/food break; visit dairy and frozen foods last; etc.) is designed. In this case, we can refer to this as the Shopping List Tour Generator Algorithm.

I. The Shopping List Specification Algorithm (Creating Set of Destinations)

The goal of the Shopping List Specification Algorithm is to help the user create quickly a shopping list that both reflects their needs and the most current relevant information regarding products and store specials. This can be done on an item by item basis, or via in-a-bag formulations. In addition, spots to be visited can be added via querying the user or via the personal tour information in the user.Profile Database (e.g., user wants to stop for coffee). This information is also converted to Lodestar Id(s) using the structure .Layout Database and further processed by the Creating Quick-Trip algorithm to create a variety of paths based on options such as shortest distance, or avoid most crowded areas, or get frozen foods last (these and other options have been discussed above).

Issues in grocery shopping lists which are generated by recipes, and possibly other shopping based on in-a-bag formulations, include 1) converting from the units in the recipe/bag to units in which the item is actually sold, and 2) aggregating occurrences of an item. For example, butter is a common ingredient. If this appears five times on the shopping list, because five recipes use it, that can be confusing. Further, many recipes specify so-many tablespoons or teaspoons of butter, but the packages of butter do not state how many tablespoons or teaspoons are therein. We will aggregate the butter and report the smallest unit in the store which can be bought that will cover the aggregated amount. We present this in the Conversion and Aggregation Algorithm below. We note that to handle this, either extend the desired Object List to a 7-tuple, with the new field a toggle for "generated by in-a-bag" yes/no, or use the comment field to include this.

An optional feature which is handy where aggregation and certain limited kind of substitutions may take place, is the use of equivalence class markings on the categories. For example, if the store is out of a user's favorite kind of butter, the equivalence class marking can be used to offer the user substitute brands to purchase. Aggregation may also involve brand unification (e.g., 2 teaspoons of 2 different baking sodas, as directed by 2 different manufacturer's recipe databases could be resolved into a single purchase). One way to do this is to add an equivalence class number to each item. We would anticipate that expert knowledge derived from home economists, chefs and cookbook authors would be required to create some of the equivalence classes of items. For example, in this way, all unsalted butter objects would be given the same equivalence class number. An alternative implementation would be to place equivalence class numbers on each category that forms a 'partition,' and then individual objects would find their equivalence class number by going up to the parent modes in the Classification Database DAG.

Examples Of Standard.Unit.Database

Standard.unit.database contains both unit equalities (hence conversions) and some weight information, the like of which is obtainable from many good cookbooks. This includes information like the following (notice that a wet oz. is a different unit from a dry oz.):

3 teaspoons = 1 tablespooon   16 tablespoons = 1 cup 32 fluid oz = 1 pound (wet oz.)   16 dry. oz = 1 pound (dry oz.)

This can be stored in quadruples:
(quantity, unit-type, quantity, unit-type).

Another kind of information is based on the properties of individual ingredients, like:

4 cups of flour = 1 pound   2 cups of sugar = 1 pound 2 cups of butter = 1 pound and even 1 large egg = 1 wet oz.   1 banana = 1/2 cup (mashed)

1 lemon = 4 teaspoons

These are expressed in a 6 tuple. We need only to reflect this information once for the type of item (i.e., category). For example, it is always true that 2 cups of stick butter=1 pound. The exact brand is irrelevant. Hence we use the OID for the overall category:
(quantity, unit-type, OID, quantity, unit-type, comment).

Note that we can also make a set of hierarchy of units, reflecting increasingly coarse grain of measurement. For example
teaspoon<Tablespoon<cup<pint<quart<gallon
or
oz<cup<pint<quart<gallon We can express each hierarchy in a list of variable length:
(hierarchy name, least unit, next least unit, etc.)

An alternative (or supplemental) approach is to convert every unit type that occurs in a recipe/in-a-bag to an (approximate) measure of a "smallest" unit. For example, this unit could be ounces, and we could record the equivalence of 1 (liquid) teaspoon to 1 wet oz., and 1 (dry) teaspoon to 1 dry oz, and so on. Note that the use of a wet and a dry smallest measure may well be necessary. Another system might convert to grams and milliliters, or simply grams (itself a kind of wet measure as well as a dry measure). We refer to this as the 'micro-measure' approach. Note that if the exact conversion information is not known right now, it can easily be measured and recorded (e.g., 1 dry tablespoon=(approximately) Y grams. Also, depending on the degree of accuracy required, this can be implemented either by taking an average, or by reflecting the exact ingredient type. In the former, for example, a single fact representing the average equivalence of 1 dry tablespoon of flour, sugar, cornstarch, butter, etc. to grams would be used. In the latter, we would use a series of facts, 1 dry tablespoon butter=Y grams, 1 dry tablespoon sugar=X grams, and so on. The system administrators can make this choice, depending on the degree of accuracy required by the system (often an average is sufficient). Note too that some hybridization is possible. For example, since we know an integral way of converting from teaspoons to tablespoons to cups, it may be enough to record only teaspoon conversions to the micromeasure, and do the rest via the standard rules of measure conversion.

This leads to tuples like:
(recipe Unit, micro-measure conversion factor) or (recipe Unit, micro-measure conversion factor, ingredient).

Once we know how to convert to the micro-measure, we must also know how to convert from the micro-measure to the different target measures. Similar to the above, one issue is how exact it needs to be, that is, whether or not to parameterized by specific ingredient.

This would lead to another table of tuples, to convert from the (understood) micro-measure:
(target Unit, conversion factor) or (target Unit, conversion factor, ingredient).

This database also includes standard target measures for the different equivalence classes. For example, butter is usually sold in pound units, so the target here could be pounds.

Juices are usually sold in terms of ounces. And so on. (A slower approach would be to look relevant objects up in the Classification database.)

Target measures:

| | | |
|---|---|---|
| Butter: pounds | Flour: dry oz or pounds | Sugar: dry oz or pounds |
| Juice: wet oz | Canned Fruit: wet oz | |

As above, target measures work for an entire categories, not just individual brands. So in storing this information, we use the OID for the overall category. There may be more than one unit-type, as we reflect:
(OID, (unit-type)$^+$, comment).

It is even possible to store 'semantic substitutions' in this database. We call them 'semantic substitutions' in that they are substitutions that some 'expert' has declared acceptable in most, or many, recipes. For example, 1 cup of lowfat yogurt may be substituted for 1 cup of regular yogurt if 1 tablespoon cornstarch is first stirred into the latter. As this example illustrates, a single item may need a set of replacement items (plus some instructions). This can be expressed in tuples like:
(OID, unit, [(OID, unit)*], comment)

Refined Example

Example 17 presents a more refined instance of this type of database and the kind of reasoning that could be used to obtain the desired information. Goal oriented, deductive reasoning technologies, such as logic or rule based ones [R. A. Kowalski, Logic For Problem Solving, Elsevier North Holland, 1979] would be well suited to this task, and we couch this example in Prolog [Clocksin, W. F. and Mellish, C. S., Programming in Prolog, Springer-Verlag, 1987] terms:

EXAMPLE 17

If the database had sets of base facts like:
target(ingredient1, unit1).
conversion_factor(unit1, unit2, factor).
we could write rules like the following, which would find the conversion factor between two different units, as well as to the specified target unit:
convert(Unit1, Unit2, Factor):-conversion_factor(Unit1, Unit2, Factor).
convert(Unit1, Unit2, Factor):-conversion_factor(Unit1, Unit3, Factor3),
    convert(Unit3, Unit2, Factor2),
    Factor is Factor3 * Factor2.
convertToTarget(Ingredient, Unit, StartAmt, FinalAmt):-
    target(Ingredient, Unit1),
    convert(Unit, Unit1, Factor),
    FinalAmt is StartAmt * Factor.

Conversion And Aggregation Algorithm

FIGS. 14A–14F are a flow chart 900 of a preferred method of a conversion and aggregation process. This preferred method comprises the following steps:
Input: standard.unit.database, object.Inventory and desired Object List (with duplicate item types).
Output: desired Object List (with no duplicate item types).
1. open the standard.unit.database, object.Inventory, desired Object List, and Classification Database (Step 902).
2. For each object Ob in the desired Object List for which the user desires conversion or aggregation (e.g., it has been generated by a recipe/in-a-bag interface) (Step 904):
3. Find Type of Ob in Classification Database DAG. Set targetUnit to the appropriate unit as found in standard.unit.database for this Type (Step 905).
3'. If the Ob is a leaf node in the Classification Database DAG, and references a specific brand, ask the user if they definitely want to buy that brand (e.g., what the recipe specifies in brand names may not be what the user desires) (Step 906). If yes, goto 4, if no, goto 5.
4. Create a list, <Ob, (quantity1, unit1), . . . , (quantityk, unitk)> by collecting all other occurences of this object, and picking up required quantities and units (Step 908). Goto 7.
5. Does the user want a specific other brand? If yes, create a list (as in step 4) labeled with the name or OID of the other brand, reflecting units involved or add it to such a list if already created (Step 910, 912). Goto 7.
6. If no, create a list (as in step 4) labeled by equivalence class name or OID, or add this objects quantity and units to such a list that is already created (e.g., equivalence class butter vs. any specific brand) (Step 914).
7. For each list <Name, (quantity1, unit1), . . . , (quantityk, unitk)> carry out steps 8, 9 and 10 (Step 916). At end goto 11.
8. We must now find or create a common unit, which we call common-unit, from among the unit_I in order to do the conversion to the targetUnit (in the database). There are a number of ways to find common-unit, which may effect the degree of precision of the final answer. We list them below in the order of least impact (hence, most desirable). As we create common-unit, we also create a concomitant finalSum, the sum of the quantity_I after normalization to common-unit.

Each of the four options below is realizable via the kind of goal-directed, deductive reasoning technologies that we mentioned above, in Example 17:
  a) if all of the entries have units of the same type t (Steps 920, 922), common-unit=t, finalSum=the sum of the quantity_I
  b) if all of the unit-I participate in a single hierarchy in the standard.unit.database (Steps 924, 926), common-unit= the least of the unit-I as expressed by the hierarchy finalSum=the sum of (conversion factor for unit_I to common-unit)
     * quantity_I
  c) We choose from one of the two following rules, based on empirical experience in mapping to the targetUnit (Step 928):
     i. common-unit=targetUnit, finalSum=the sum of (conversion factor for unit_I to common-unit) * quantity_I
     ii. common-unit=micro-measure unit finalSum=the sum of (conversion factor for unit_I to common-unit) * quantity_I.

9. We now find the equivalent target amount by this equation (Step 930): target amount=finalSum * (conversion factor for common-unit to targetUnit).
10. If the user already has this item on the desired Object List (i.e., from another source, like the staple list), offer to combine the two entries (Step 931). If the user says yes, target amount=target amount+amount from the other entry.
10'. Convert the target amount to a breakdown of how the user could buy the product (Step 932). If it is a specific brand, offer sizes supported by that brand. Show ways to get the requisite amount, or simply the cheapest ways. The user can specify these choices in the user.profile, or choose on-line. If not a specific brand, find combinations within the equivalence class. Goto 7.
11. Output: desired Object List without any duplicates (Step 918).

Example Of Aggregration And Conversion Algorithm

Consider the following example, where the user has selected the following items (often through a recipe interface) in the desired object list: 4 Tablespoons Butter Unsalted GoodButter Brand; 2 Teaspoons Butter Unsalted At steps 3 and 4 user decides, whether to use brand name (in this case yes) and thusly generates list of items:
<GoodButter, 4, Tablespoons, 2, Teaspoons>

All of the units participate in a single hierarchy, so we can convert into Teaspoons:
4 * 3+2=14 Teaspoons The target type here is pounds of butter. The standard.unit.database provides rules such as 2 Cups of Butter=1 pound. As noted above, a standard conversion is 3 teaspoons=1 tablespoon. We use these two rules together to derive the conversion:
14 Teaspoons=14/3 Tablespoons=14/48 Cups=14/96 pounds Finally, the user can be offered different choices of GoodButter Brand butter (½ pound, 1 pound, etc.) with their prices and can then make a final choice based on her current and future needs.

Staple Management

In the case of grocery, superstore and chain-store shopping, another issue which takes on perhaps greater importance is that of staples. There are a large number of potential staple items in a grocery store, including food, paper products, and cleaning products. Managing these, and taking into account deliberate over-buying (such as could occur during sales) as well as properly adjusting for 'spike' periods (e.g., buying more staples to make cookies at Xmas, or because visitors are coming, but the user still needs the usual supply for everyday). This can potentially be handled by querying the user and setting a flag to have an item 'count' as a staple or not. Personal 'inventory control' could include things like advising the user to freeze items, whether from overbuying or otherwise, that have a short refrigerator life.

Users can also specify brands of staples, even if they do not specify the exact size of the item. Thus, a user can indicate that ketchup must be Brand H, and determine the size to buy dynamically. Users can also list brands NOT to buy. 'Generic' can also be used, either as a kind to buy, or kind not to buy. file: user.StapleList

Other Features

The Shopping List Specification Algorithm can also optionally include features such as price guarantees, by which a user is guaranteed a maximum price for the items on a list, if bought within a specified time period, and on-line couponing, whereby a user view relevant virtual coupons (both manufacturer's and in-store) and have them appropriately credited against their shopping list. A related feature is automatic rebating, where a rebate is automatically electronically applied for.

An additional optional component, if offered by the store, is to mark items to be collected and packed by store employees, to await customer arrival, at which time the customer will select the rest of the items. An example of this is when the customer has a store employee pick up all canned and dry goods, and chooses only meat and produce personally. This component also can extend to having the entire order pre-packed, and possibly delivered.

As a final example, we elaborate on a possible front end to the Shopping List Specification (Creating Set of Destinations) for a grocery shopping system. It could include the display of these types of information, each of which is further elaborated below:

Display of Categories
Alphabetic Choice
String Input
Personal History
Staples List
User Wish List
Coupons/Rebates/Specials
Recipe or "In-a-bag" Interface Display of categories: We display the Classification Database, to the depth desired by the user (e.g., Brand X Rice 32 oz or White Rice). The user can stop at any point, and refine the choice to a specific item later (possibly by applying specials to it, see below) or can continue to a leaf, in which case they have chosen a specific item.

May be presented textually; textually in a tree-like picture; via icons or actual pictures, also in a tree-like manner. A large picture with one sample item type of each item in a department can be a remarkably quick way of informing the user. Pictures may also be presented in a matrix to guide sub-class selection. In this method, the user could select oven mitts by clicking on housewares picture/text/icon, then the next grouping of cooking supplies, until finally choosing an oven mitt. If the cooking supplies class is displayed via a picture matrix, the user may click directly on the picture of an oven mitt.

Alphabetic Choice: Either single letters or groups of letters are presented. User clicks on the box containing the first letter of the word for the item of interest (here, o). The box is replaced by a more detailed box (e.g., if it was the single letter o, it may be replaced by (O a–e, O f–k, etc.); if a grouping containing o, then the solo box for each letter in the grouping (m–p box becomes m, n, o and p boxes).

User continues choosing until he has 'spelled' the appropriate word (or reaches a recognizable string, like 'oven-mitts for').

String Input: A user may enter a string, or part thereof. All items with product description containing that (part of) string will be retrieved and shown to the user. This is an on-line process, i.e., the user can continue to enter letters as the answers appear. The string can also be automatically spell checked to prevent totally fruitless searches.

Personal History: The user may use their own shopping history to remind themselves of desired items. Access may be 'brute force,' as in, show consecutive shopping lists until I see the one I want (in either forward or backward time order), or searching on time: Show last, last K times, last in April, etc. Searching on content is also available: show the list when I had bought duck, etc. Projection on class is also available: Show only produce section of when I had bought duck. These methods can also be combined, such as: show produce of the last N shopping trips.

Personal history can also be combined with the above approaches, such as the string input or the categorization system, so that what the user is presented is pruned to fit the categories of the user's actual purchases, within a given time span, or 'ever.' That way, for example, the user who has never bought lawn products will not see that class, or its contents (e.g. garden tools) while doing a string search. We refer to this combination as 'personal pruning.' file: user.History Staples List: The Staples List can be displayed outright, and with hi-lighting of items that are due to be bought, and with details of last purchase of the item type (e.g., date, brand, size). The user can also choose, in addition or instead, to have the Reminder Program (above) add needed staples to the shopping list (in the case of fully specified items) or prompt the user with an item class for further item specification (e.g. safflower oil is needed).

User Wish List: Here, the user has indicated some things they would buy "if the price were right." User can either be notified and have items added, be queried ('are you sure you want to buy this'), or have items added automatically. In addition, or instead, a list of matches can be made available for user perusal. file: user.WishList Coupons/Rebates/Specials: Assuming the system has access to manufacturer's databases of on-line coupons and/or rebate information, the situation is similar as to the specials, above. Different users will use coupons differently, and the databases will be accessed as needed.

Customers use Specials in different ways. Some will consider purchasing items because they are on sale, though they had not previously intended on buying that type of item. Some will use such sale information to choose between different brands of an item type to determine their final selection.

In keeping with these different styles, users can choose to see specials as a separate class, to see specials as a separate category but 'personally pruned' to what the user has bought, or to see specials only on types of items of interest. Orthogonally, dollar amounts or percents can be involved, such as: show items that are reduced at least twenty percent, or at least $2 off. Both styles can be used in one session, where, for example, a user might wish to see all items at least 50% off, and specials on types of items of interest. The structure.News Database is consulted to determine specials and other promotional information. file: object.News and structure.News Recipe And In-A-Bag Interface: The most obvious situation here is a food recipe. In such a system, the user picks a recipe, and this generates a number of item types which have to then be resolved to specific items. However, stores will also design their own recipe systems. For example, there could be a recipe for the paper products for a children's party (hats, cloth, plates, cups, cutlery, etc.), or a recipe to get started gardening (or some specific kind of gardening, like vegetable gardens or some fancy shrubs). In either case, a list of types of item is offered to the user. User can choose to place all, or some of these items in the bag on their shopping list. A recipe system can also be embedded within a menu planning system. file: inaBag.List All of the above methods can be combined, as mentioned briefly above, where we discussed how personal history can also be combined with string input or the categorization system. Many additional combinations are possible. For example, Input String can always be used, on a filtered basis (if desired), within another approach. In this way, a user can first choose a class, and then start typing, and be shown matches only within that class. Similarly, a user could chose a class and then ask to see the specials, or coupons, within that class. Or the user could "apply" their staples list to the specials (or coupons) and find out which of their staples are on sale (or have a coupon).

We claim:

1. A method that enables an end-user to select a set of desired objects available within an arbitrary physical structure and generates a path through said structure, utilizing a digital computer equipped with memory, and input and output peripherals, wherein said path consists of a sequence of instructions that enable said end-user to physically travel through said structure, and wherein said path has been customized for said end-user such that each item in said set of desired objects is available in at least one physical location contained in said path, and wherein said path optimizes characteristics of interest to said end-user, including shortest time or distance, the method comprising the steps of:

(a) selection of a plurality of easily identifiable physical markers or other visible structural components, including doors, signs, or escalators, said markers or other visible components being referred to as lodestars, (b) selection of a plurality of display units within said physical structure, small enough to be easily examined by a customer or client, wherein objects may be displayed, advertised or physically stored, said display units being referred to as Navigable Display Units (NDUs), (c) construction and storage of an object description database, wherein attributes of objects available within said structure are described using a variety of different media, (d) construction and storage of an object location database relating each NDU to a plurality of objects available at said NDU, (e) construction and storage of a structure layout database relating each NDU to a plurality of lodestars, optionally including distance or direction information from each said lodestar to said NDU, referred to as an Orientation Hint, (f) construction and storage of a lodestar layout database describing the adjacency relationship between lodestars, (g) construction and storage of a lodestar instruction database containing instructions describing travel from one lodestar to another, (h) creation of said path through said structure based on interaction with said end-user.

2. The method of claim 1, wherein the creation of said path through said structure based on interaction with said end-user, comprises the steps of:

(a) selection of a plurality of desired objects available within said structure by said end-user, (b) generation of a plurality of corresponding lodestars within said structure, such that each said desired object may be found at least one lodestar within said plurality of corresponding lodestars, (c) generation of said path for said corresponding plurality of lodestars, where said path comprises a sequence of adjacent lodestars as found within said structure, and where said path further contains every lodestar in said plurality of corresponding lodestars.

3. The method of claim 2, wherein the step of selection of a plurality of desired objects comprises the steps of selecting a desired object from said object description database by said end-user.

4. The method of claim 3, further comprising the step of said end-user selecting a desired object after viewing an object inventory database describing availability of objects within said structure.

5. The method of claim 4, further comprising the step of said end-user selecting a desired object after viewing a user history database describing objects said end-user has previously encountered, acquired, or visited within said structure.

6. The method of claim 5, further comprising the step of said end-user selecting a desired object after viewing an object classification database describing relationships between objects available within said structure.

7. The method of claim 2, wherein generation of a plurality of corresponding lodestars within said structure, comprises the steps of:
 (a) for each object in said plurality of desired objects selecting an NDU such that said NDU is related to said object in said object location database,
 (b) retrieving a lodestar id from said structure layout database, such that said NDU is related to said lodestar id,
 (c) collecting said lodestar ids to form said plurality of corresponding lodestars.

8. The method of claim 2, wherein the step of generation of said path for said plurality of corresponding lodestars, comprises the steps of:
 (a) choosing an initial lodestar (lodestar id) corresponding to an entrance to said structure,
 (b) choosing an final lodestar (lodestar id) corresponding to an exit from said structure,
 (c) utilizing said lodestar layout database to generate said path consisting of a sequence of lodestars (lodestar ids) containing every lodestar id in said plurality of corresponding lodestars, such that said end-user can physically travel from structure entrance to structure exit by passing through each lodestar (lodestar id) listed in said path, in the order in which they appear.

9. The method of claim 7, further comprising the steps of annotating or marking each lodestar (lodestar id) occurring in said generated path with:
 (a) a plurality of said desired objects available at each lodestar; if no said desired objects are available the lodestar is labeled "alkthrough,"
 (b) an orientation hint explaining how to access each said desired object in terms of said NDU related to said desired object, as retrieved from said object location database,
 (c) instructions on travel to the next lodestar in said path, obtained from said lodestar instruction database.

10. The method of claim 8, wherein the step of utilizing said lodestar layout database to generate said path consisting of a sequence of lodestars, comprises the steps of
 (a) pre-computation of a plurality of paths between said entrance lodestar id and said exit lodestar id,
 (b) selection of said path such that said path includes every lodestar id contained in the said plurality of corresponding lodestars.

11. The method of claim 8, further comprising the generation of said path based on a plurality of different possible characteristics, as chosen by said end-user, including shortest distance, choice of specific entrance or exit, least time, passing through a specific lodestar (lodestar id) at a specific time.

12. The method of claim 10, wherein the step of pre-computation of a plurality of paths between said entrance and said exit lodestar id comprises the construction and storage of an All Path Table, listing all paths within said structure leading from said entrance lodestar id to said exit lodestar id.

13. The method of claim 12, wherein the construction and storage of an All Path Table comprises the steps of:
 (a) finding all paths of length 1, beginning at said entrance lodestar id, in said lodestar layout database and adding them to said All Path Table and marking them as not visited,
 (b) selecting a not visited path P from said All Path Table and marking it as visited,
 (c) if said P ends in some lodestar q1; constructing a new path P' by adding edge <q1,q2> to P provided:
  1. Edge <q1,q2> can be found in said lodestar layout database,
  2. Entry occurrences of q 1 in P is less than Connectivity(q1),
  3. There is no essentially equivalent path to P' already present in said All Path Table,
 (d) Adding P' to said All Path Table and marking it as not visited,
 (e) Repeating steps (b) through (c) until all paths in said All Path Table are marked as visited,
 (f) extending each path in said All Path Table to include a final part leading to the said exit lodestar.

14. The method of claim 8, wherein the step of utilizing said lodestar layout database to generate said path consisting of a sequence of lodestars, comprises the steps of:
 (a) classification of each lodestar occurring in said lodestar layout database into a plurality of lodestar sets called quadrants, such that each said quadrant corresponds to an easily navigable sub-part of said physical structure,
 (b) construction and storage of a Quadrant Adjacency Matrix, wherein two quadrants are adjacent if and only if each quadrant has a lodestar within it such that said lodestars are adjacent in said lodestar layout database,
 (c) computation, utilizing the Quadrant Adjacency Matrix, and storage of a plurality of paths between said quadrants in a Quadrant All Path table,
 (d) selection of a quadrant path Q from said Quadrant All Path table wherein each lodestar in said plurality of corresponding lodestars is present in some quadrant within said Q,
 (e) construction of a lodestar sub-path within each quadrant contained in said Q, utilizing said lodestar layout database, such that each lodestar in said plurality of corresponding lodestars is found within said lodestar sub-path within some quadrant contained in said Q,
 (f) construction of a path by combining together, in sequence, said lodestar sub-paths from each quadrant contained in said Q.

15. The method of claim 2, further comprising the step of presenting said generated path to said end-user, utilizing a variety of media and technologies, including print, CD-ROM, audio and video-tape, or remotely over the World Wide Web.

* * * * *